(12) United States Patent
Aguilera et al.

(10) Patent No.: US 8,705,892 B2
(45) Date of Patent: Apr. 22, 2014

(54) GENERATING THREE-DIMENSIONAL VIRTUAL TOURS FROM TWO-DIMENSIONAL IMAGES

(75) Inventors: Jaime Aguilera, San Sebastian (ES); Fernando Alonso, San Sebastian (ES); Juan Bautista Gomez, Barcelona (ES)

(73) Assignee: 3Ditize SL, San Sebastian (ES)

( * ) Notice: Subject to any disclaimer, the term of this patent is extended or adjusted under 35 U.S.C. 154(b) by 288 days.

(21) Appl. No.: 13/226,695

(22) Filed: Sep. 7, 2011

(65) Prior Publication Data

US 2012/0099804 A1 Apr. 26, 2012

Related U.S. Application Data

(60) Provisional application No. 61/406,940, filed on Oct. 26, 2010.

(51) Int. Cl.
*G06K 9/00* (2006.01)
*G06K 9/36* (2006.01)
*G06T 15/00* (2011.01)
*G09G 5/00* (2006.01)

(52) U.S. Cl.
USPC ............ 382/285; 382/154; 345/419; 345/629

(58) Field of Classification Search
CPC .............................................. G06K 2009/2045
USPC ......... 382/154, 174, 274, 284, 294, 298–300, 382/303; 345/158, 419, 426, 629, 634
See application file for complete search history.

(56) References Cited

U.S. PATENT DOCUMENTS

2006/0066612 A1* 3/2006 Yang et al. .................... 345/419
2010/0315412 A1* 12/2010 Sinha et al. .................... 345/419
2012/0050525 A1* 3/2012 Rinner et al. ................. 348/117

OTHER PUBLICATIONS

Uyttendaele, M.; Criminisi, Antonio; Sing Bing Kang; Winder, S.; Szeliski, R.; Hartley, R., "Image-based interactive exploration of real-world environments," Computer Graphics and Applications, IEEE , vol. 24, No. 3, pp. 52,63, May-Jun. 2004.*
Geng, Weidong et al., "Picture-Based Virtual Touring", The International Journal of Virtual Reality, vol. 4, No. 3, 2000, pp. 1-13.*
Qiushuang Zhang; Kan Zhao; Zhiqing Cao; Jiaoying Shi, "An efficient image-based virtual tour system," Multi-Agent Security and Survivability, 2004 IEEE First Symposium on , vol., No., pp. 511,514, Dec. 18-20, 2004.*
Henrichsen, Arne, "3D Reconstruction and Camera Calibration from 2D Images", University of Cape Town, Dec. 2000, pp. 1-109.

(Continued)

*Primary Examiner* — Andrae S Allison
(74) *Attorney, Agent, or Firm* — Raubvogel Law Office

(57) ABSTRACT

Interactive three-dimensional (3D) virtual tours are generated from ordinary two-dimensional (2D) still images such as photographs. Two or more 2D images are combined to form a 3D scene, which defines a relationship among the 2D images in 3D space. 3D pipes connect the 2D images with one another according to defined spatial relationships and for guiding virtual camera movement from one image to the next. A user can then take a 3D virtual tour by traversing images within the 3D scene, for example by moving from one image to another, either in response to user input or automatically. In various embodiments, some or all of the 2D images can be selectively distorted to enhance the 3D effect, and thereby reinforce the impression that the user is moving within a 3D space. Transitions from one image to the next can take place automatically without requiring explicit user interaction.

48 Claims, 49 Drawing Sheets

(56) References Cited

OTHER PUBLICATIONS

Cipolla, R., et al., "Camera Calibration From Vanishing Points in Images of Architectural Scenes", University of Cambridge, Cambridge, UK, 1999, pp. 382-391.

Fangi, Gabriele, et al., "Photointerpretation and Small Scale Stereoplotting With Digitally Rectified Photographs With Geometrical Constraints", University of Ancona, Ancona, Italy, pp. 1-8, 2001.

Guillou, E., et al., "Using Vanishing Points for Camera Calibration and Coarse 3D Reconstruction from a Single Image", The Visual Computer, vol. 16, No. 7, 2000, pp. 396-410.

Chen, Shenchang Eric, "QuickTime VR—An Image-Based Approach to Virtual Environment Navigation", SIGGRAPH '95 Proceedings of the 22nd Annual Conference on Computer Graphics and Interactive Techniques, 1995, pp. 29-38.

* cited by examiner

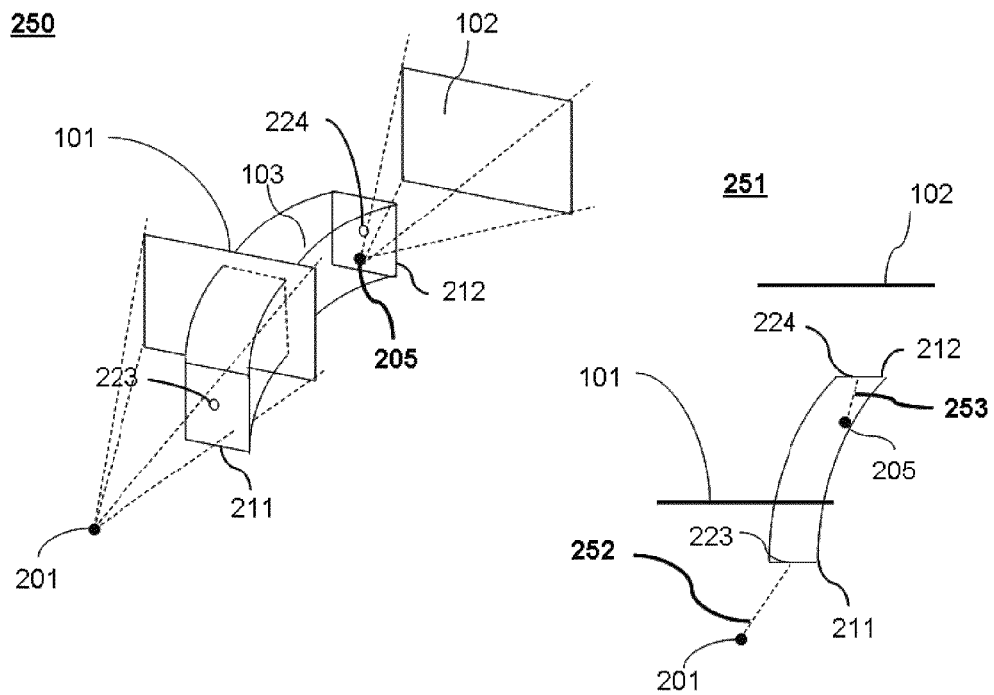
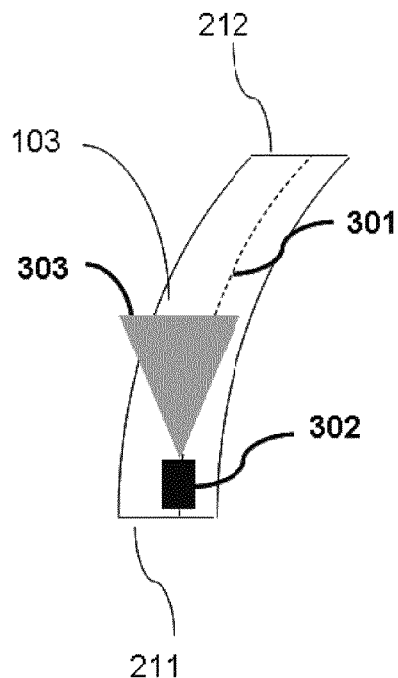
Fig. 2B
Fig. 3

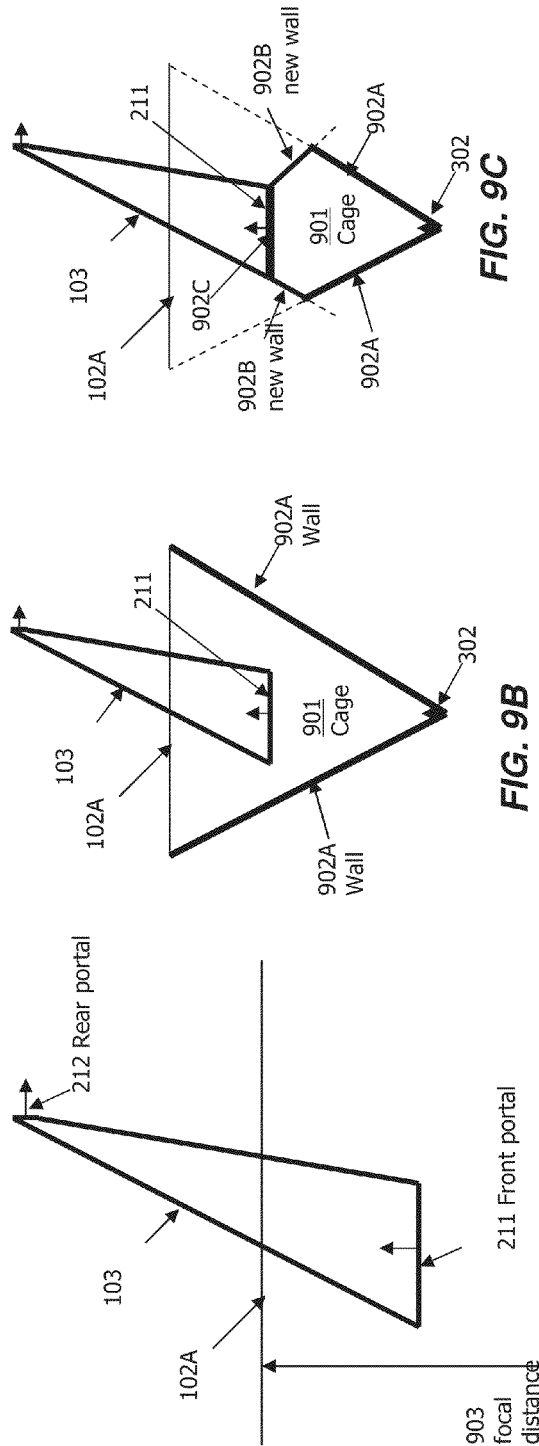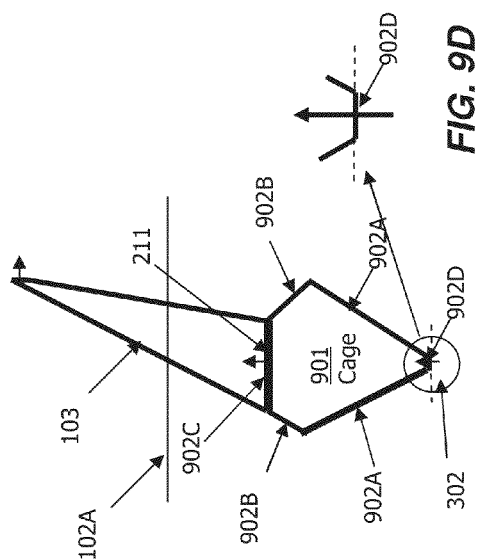

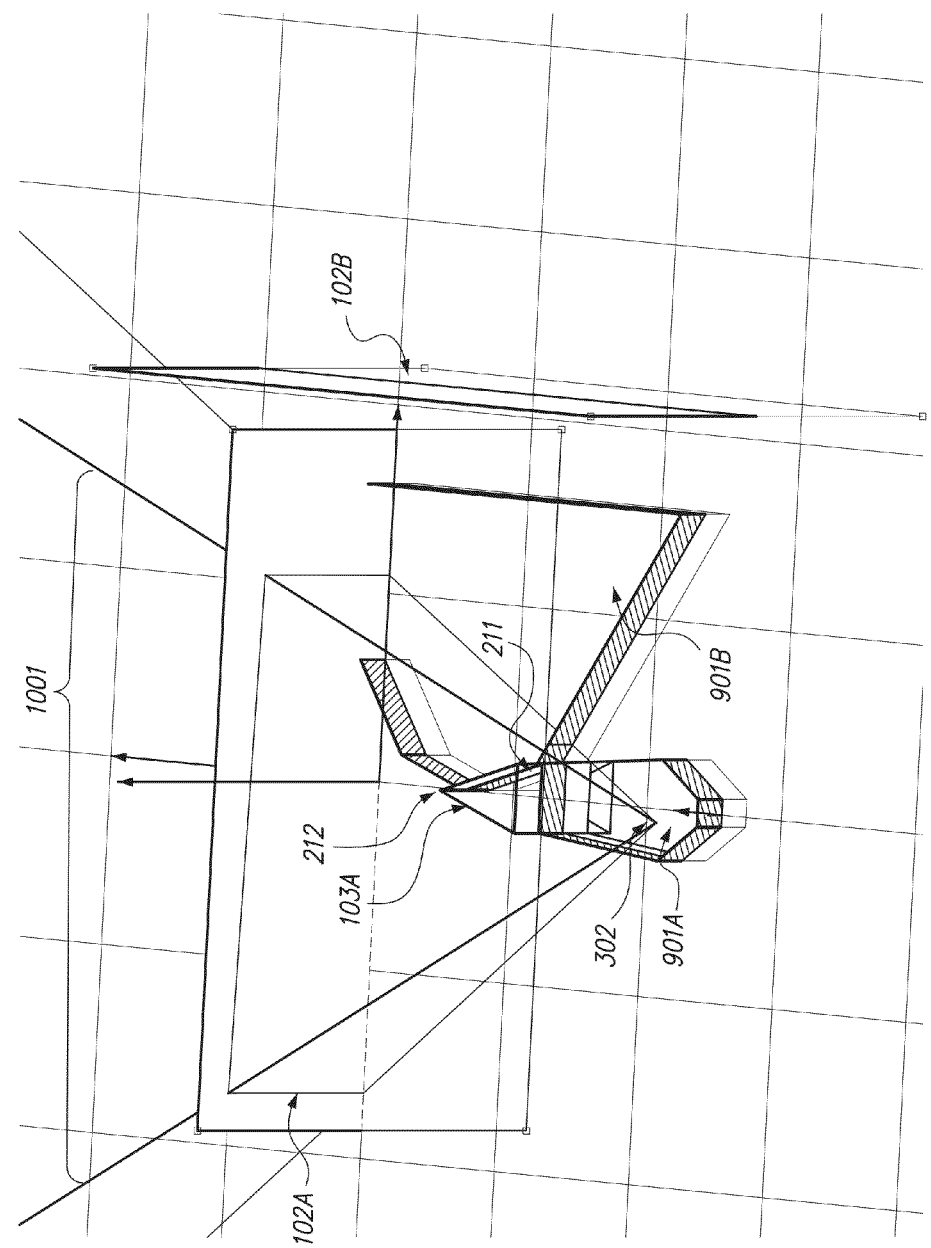

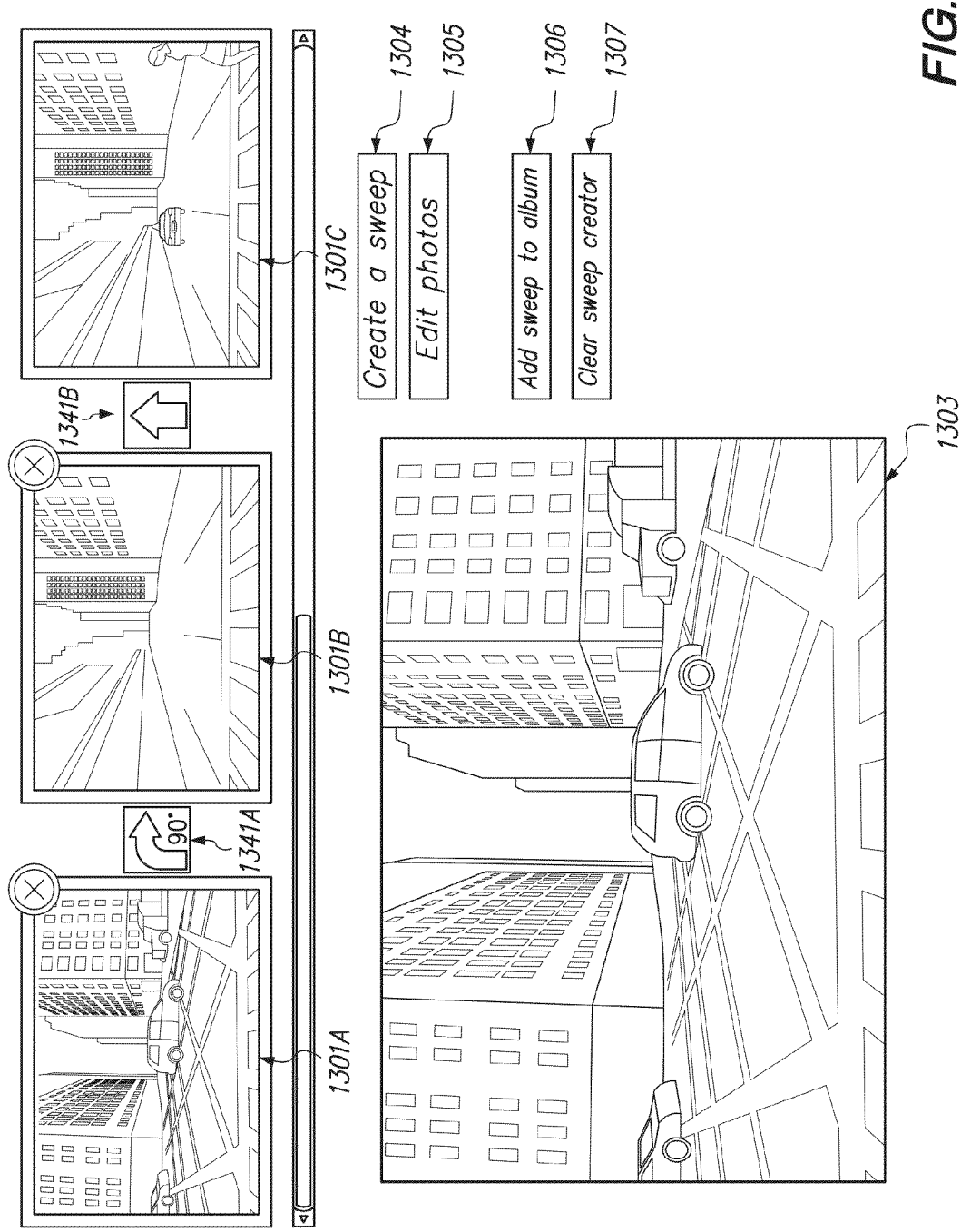

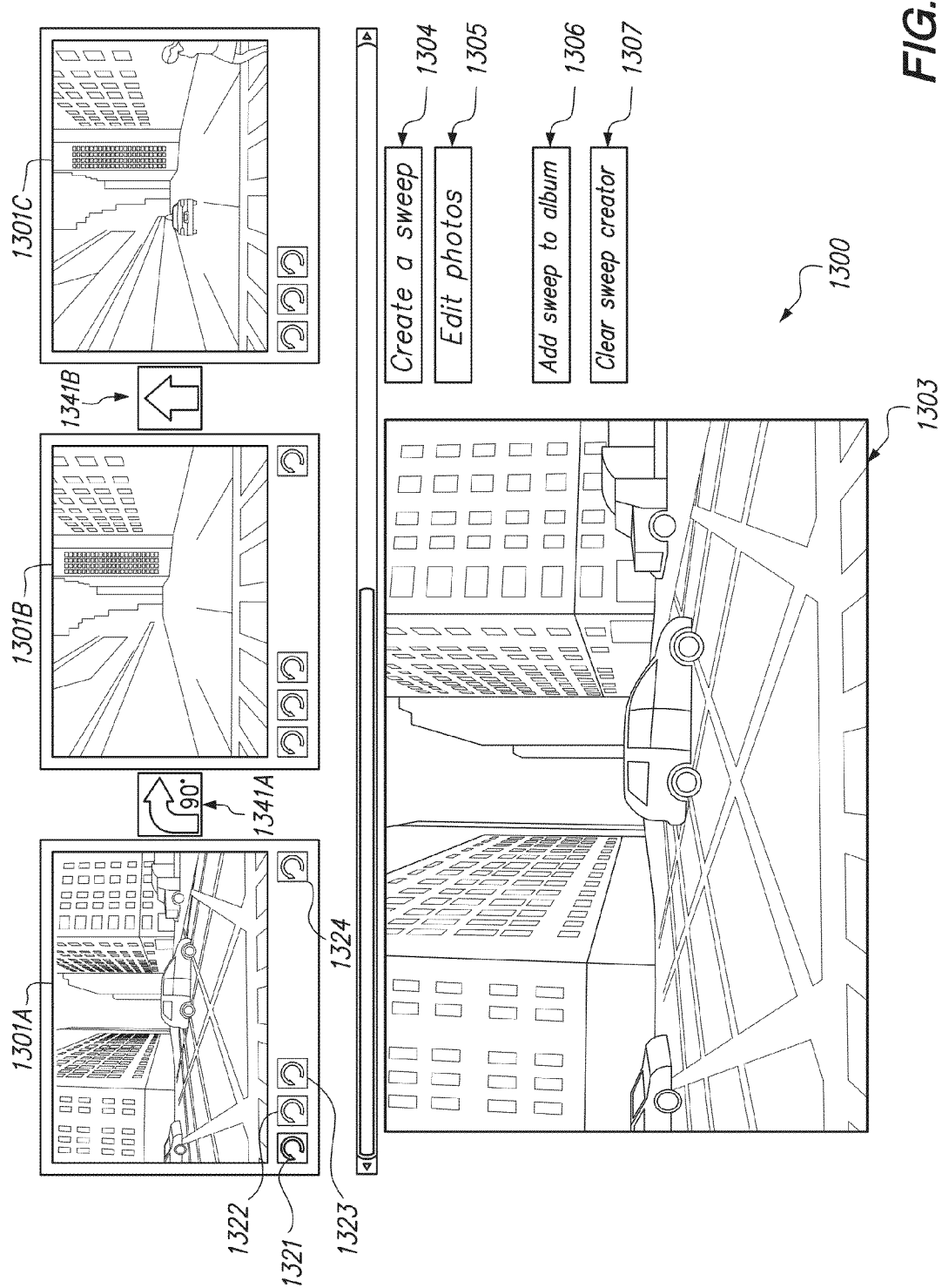

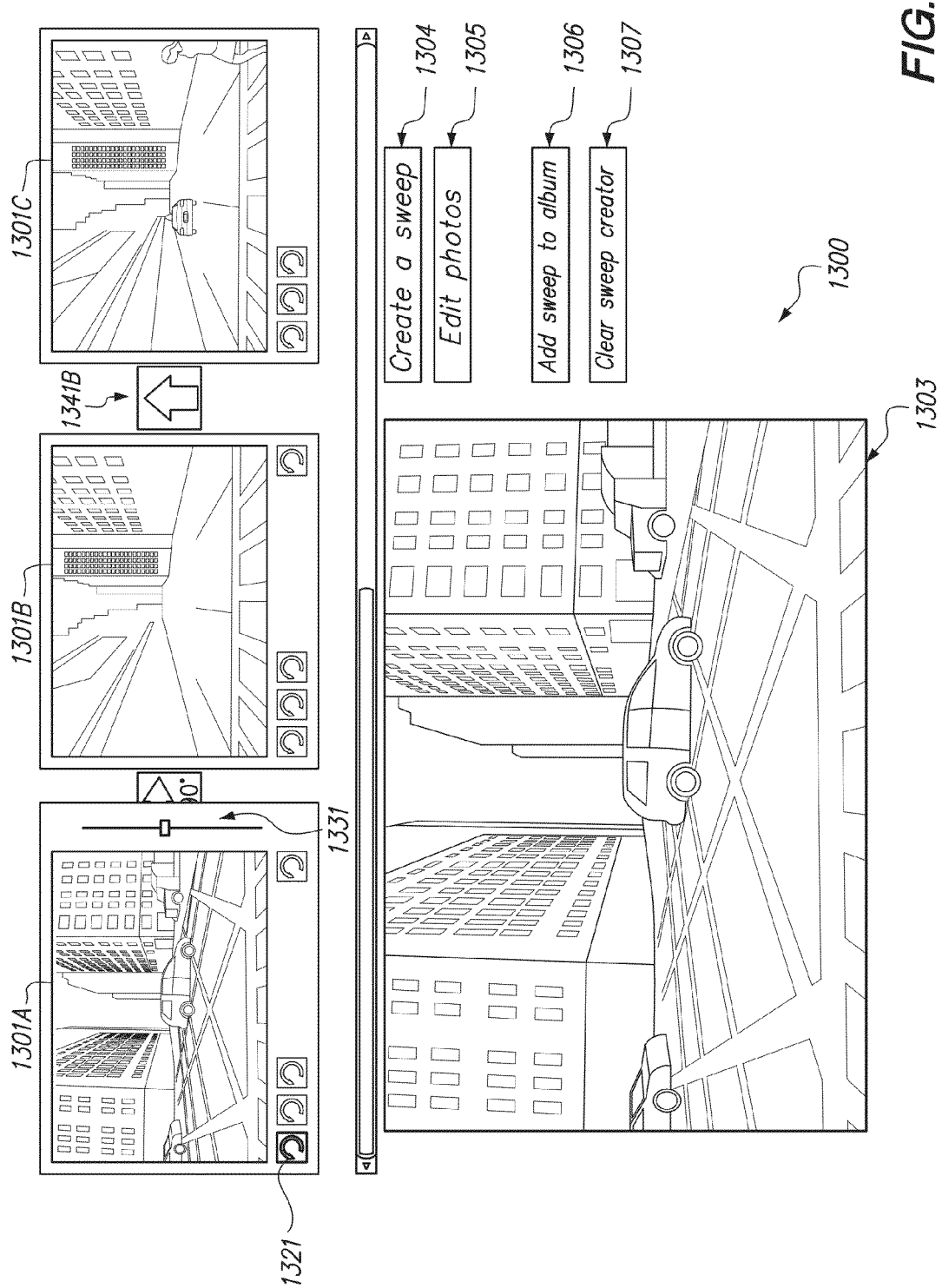

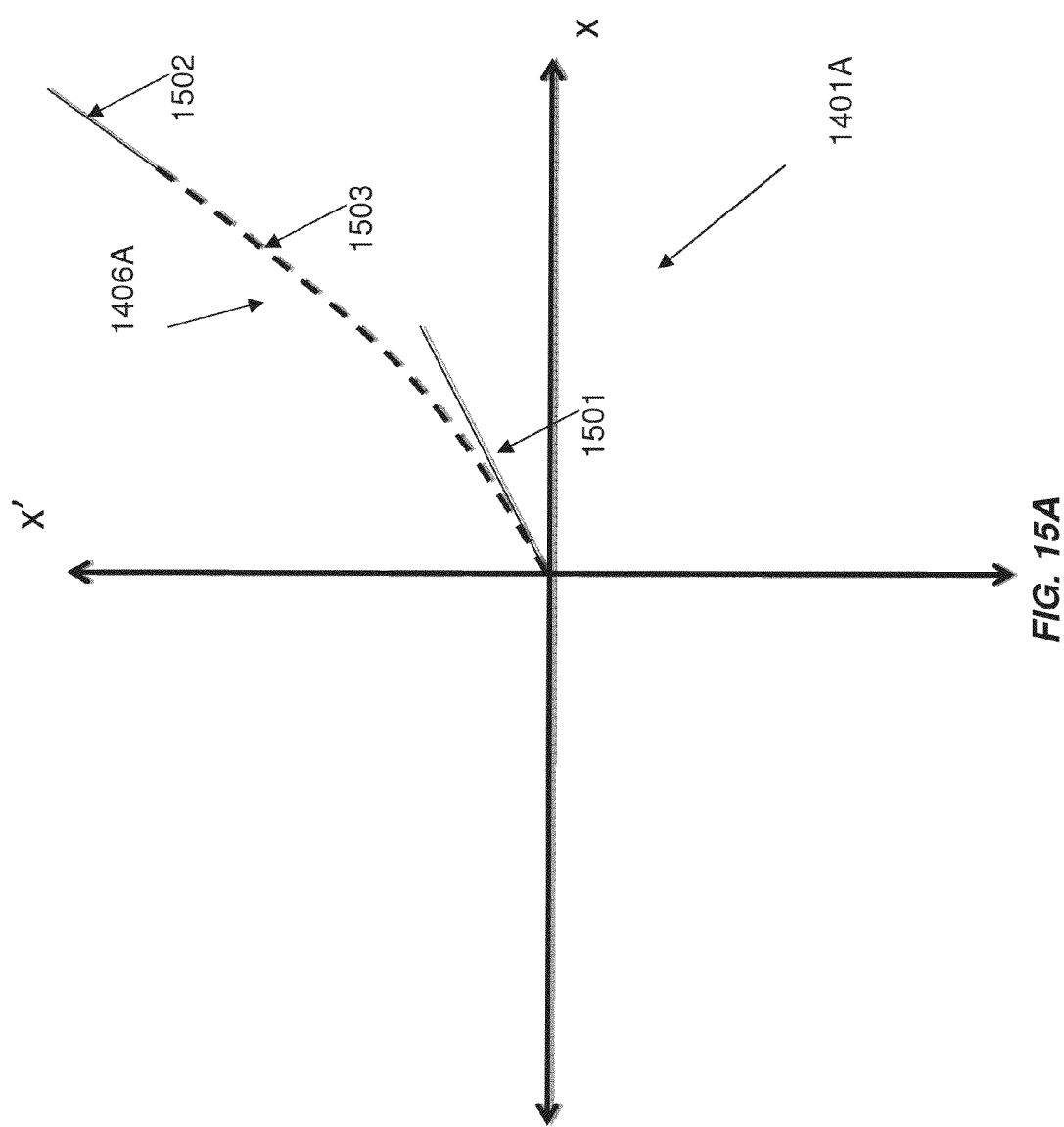

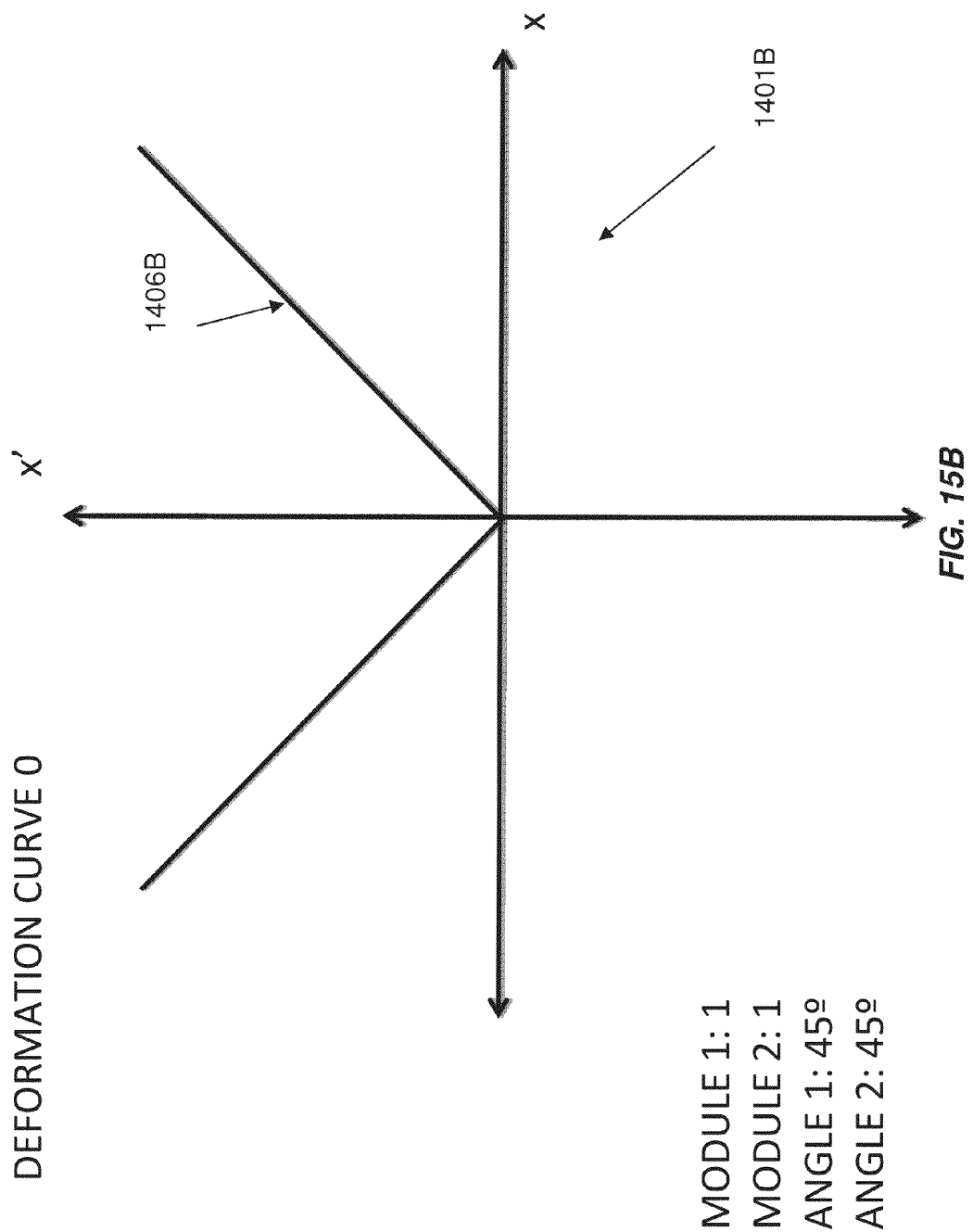

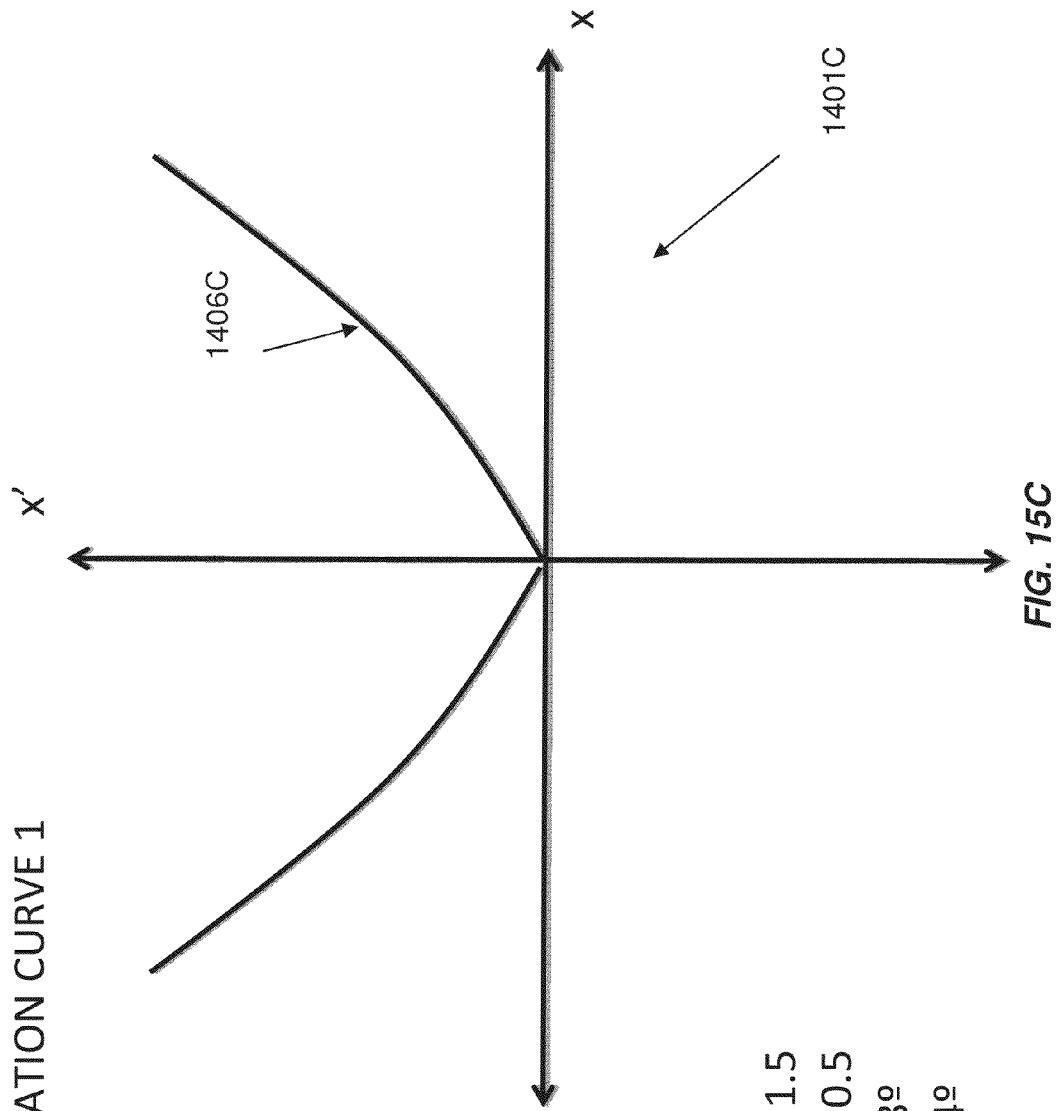

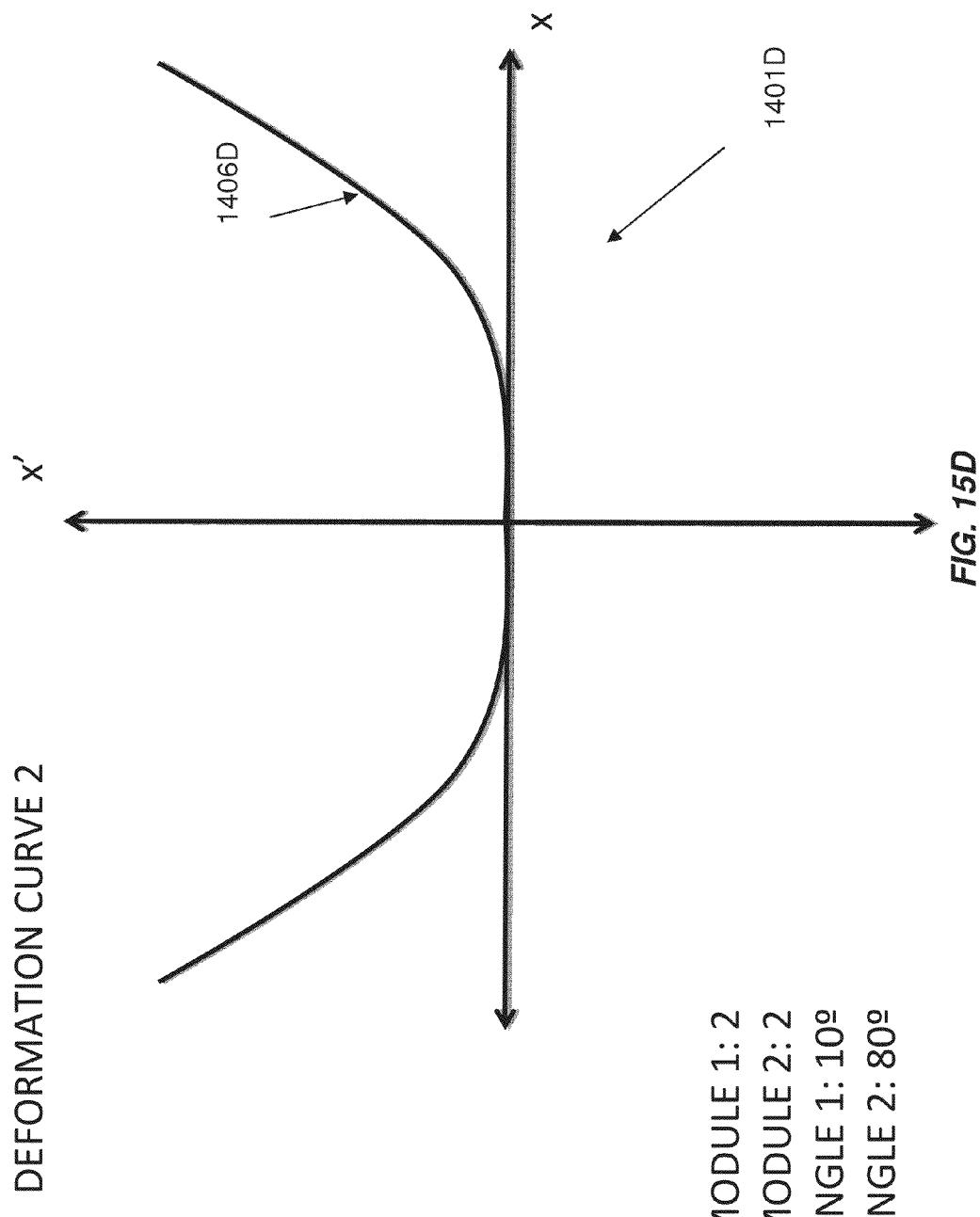

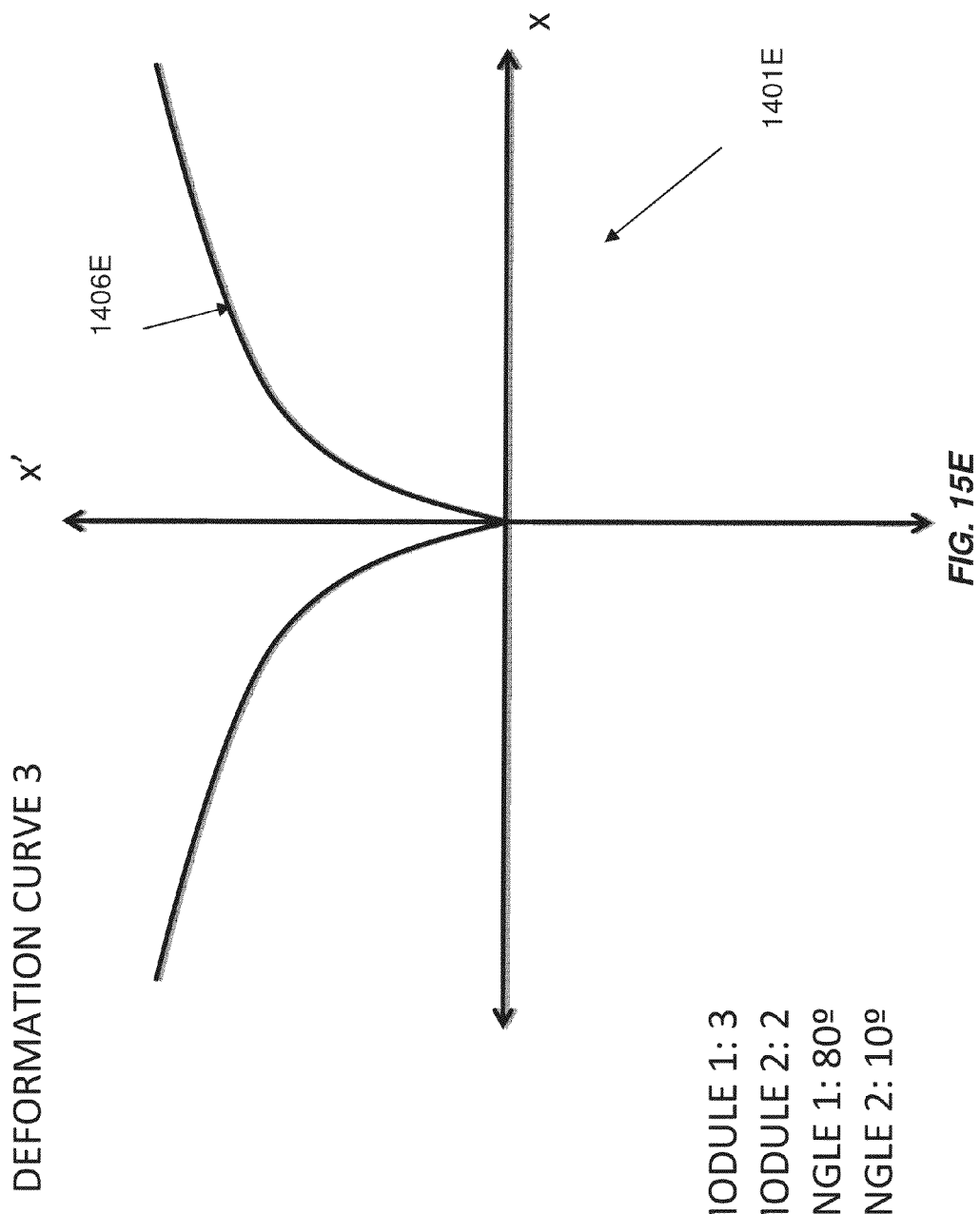

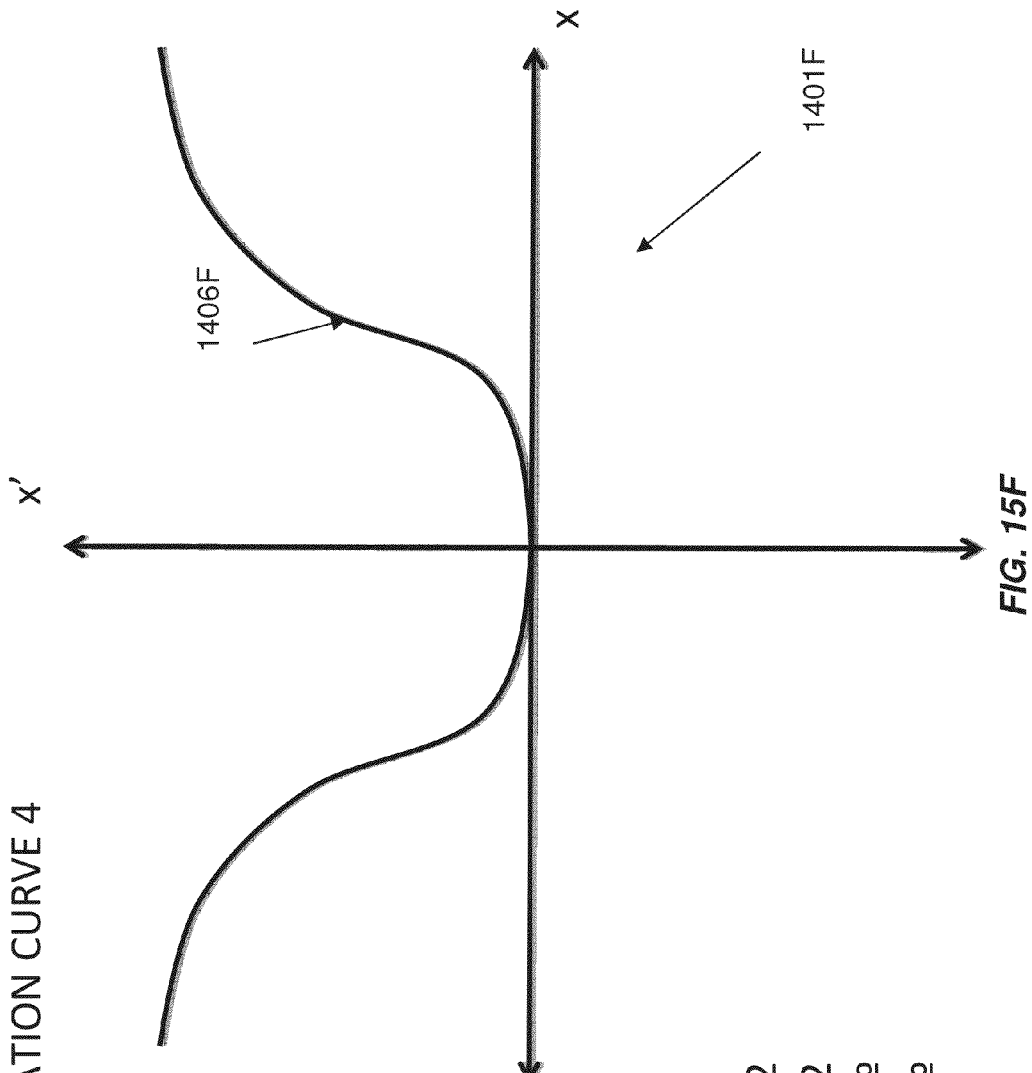

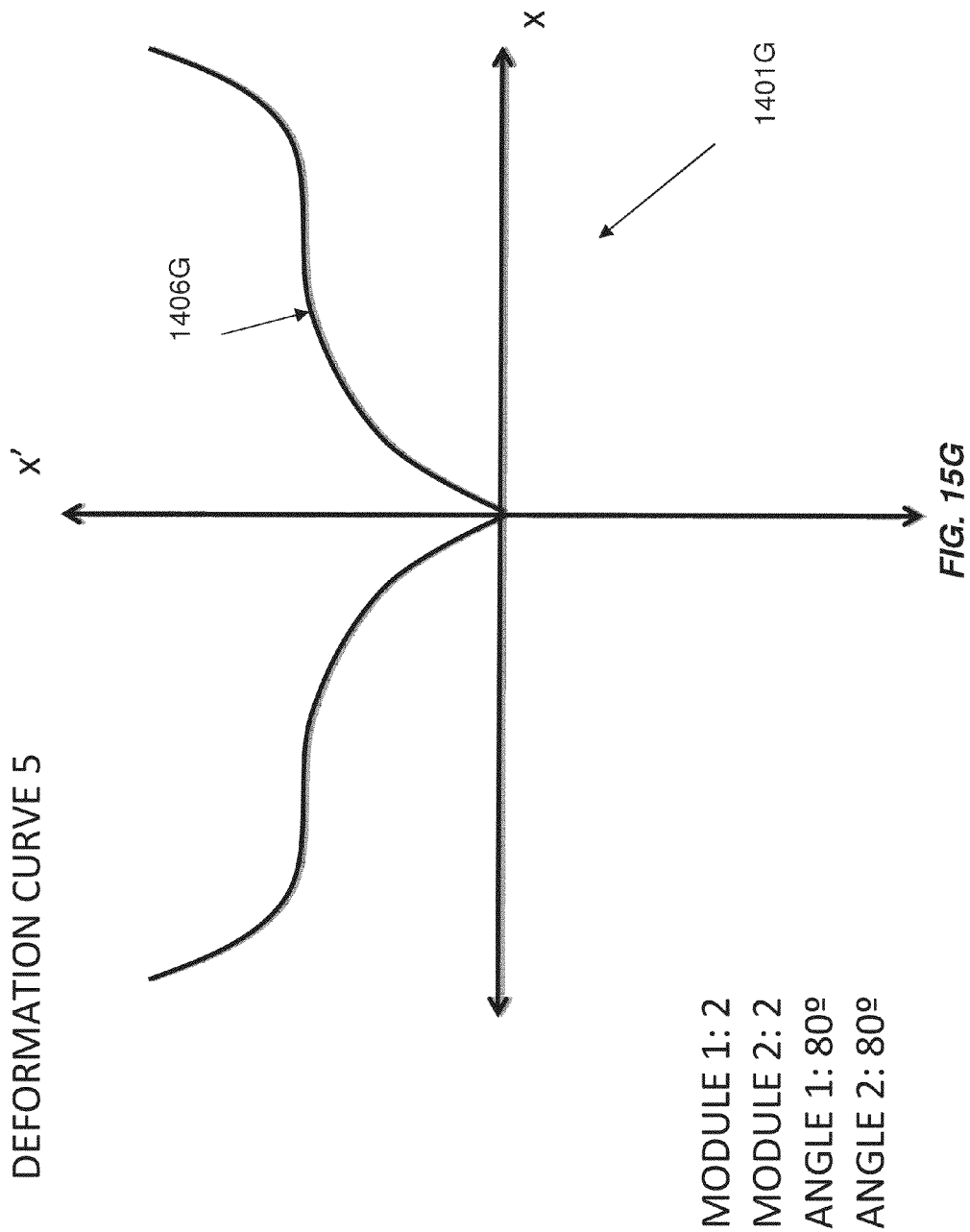

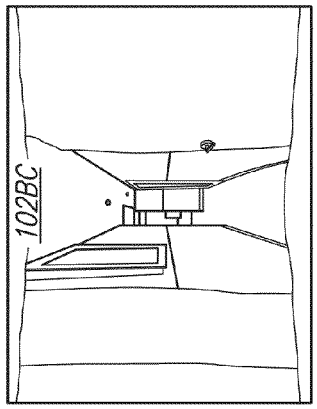
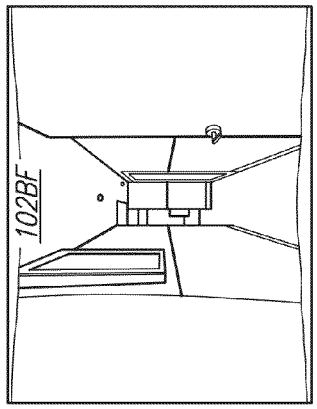
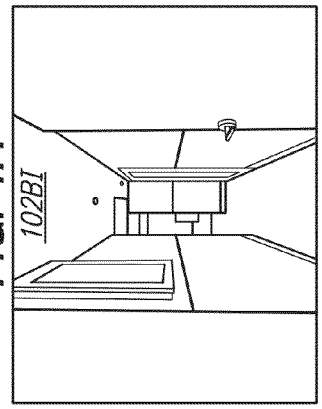
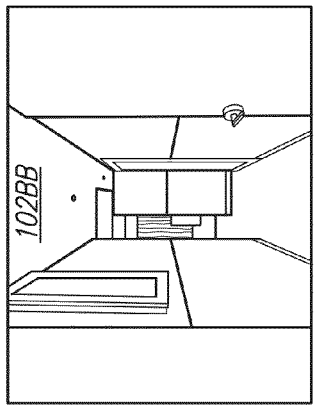
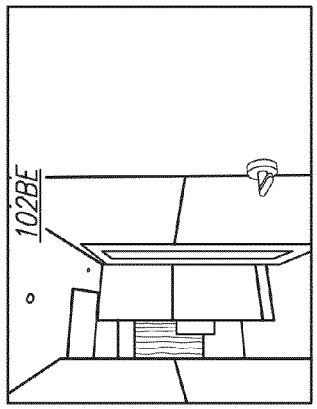
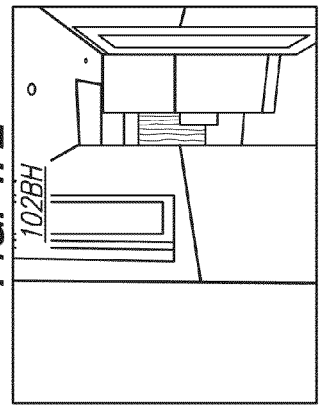
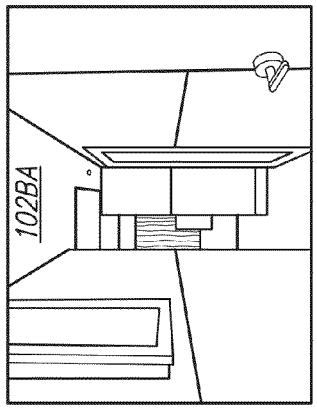
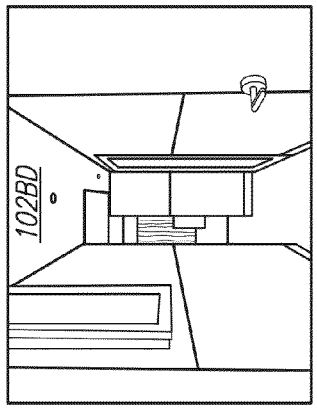
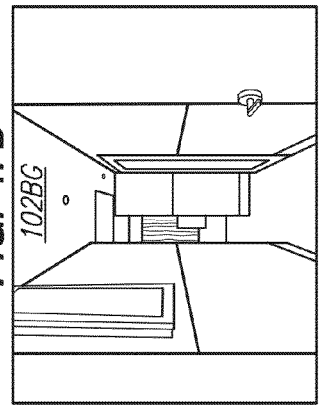

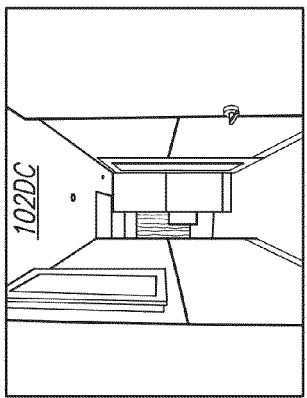
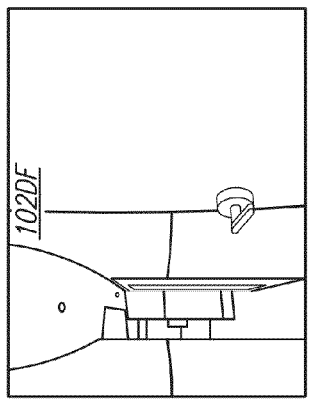
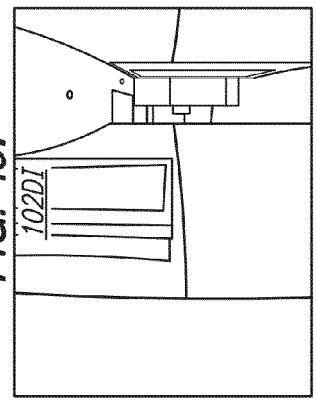
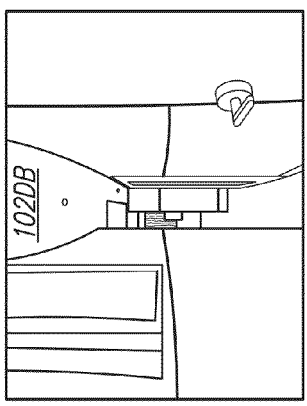
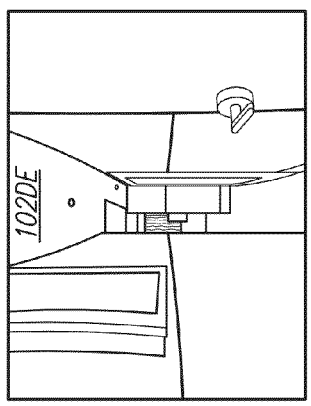
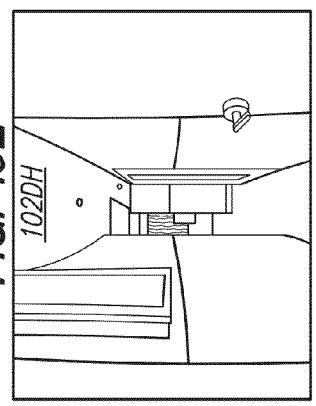
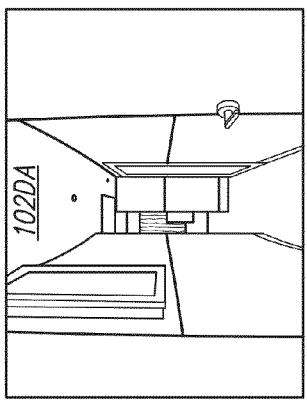
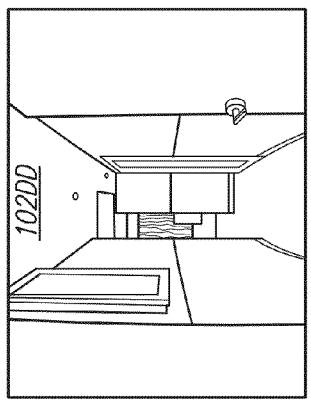

GENERATING THREE-DIMENSIONAL VIRTUAL TOURS FROM TWO-DIMENSIONAL IMAGES

CROSS-REFERENCE TO RELATED APPLICATIONS

The present application claims priority from U.S. Provisional Application Ser. No. 61/406,940 for "Generating Three-Dimensional Virtual Tours from Two-Dimensional Images," filed Oct. 26, 2010, which is incorporated herein by reference.

FIELD OF THE INVENTION

The present invention relates to generation and presentation of virtual tours representing physical locations.

BACKGROUND

Virtual tours provide a mechanism for a user to view different parts of a physical location or site from different perspectives and in different directions. A virtual camera moves from room to room, turns to present the view in different directions from a particular point in space, and performs other operations that allow a user to engage in a virtual tour. In some cases, users can control the movement, orientation, and focal length of the virtual camera.

Such virtual tours are useful in many different contexts where it may be advantageous for a user to see a physical site from different angles and points of view. Examples of physical sites that can be presented in a virtual tour include:
  a house or other property for sale;
  a hotel room or cruise ship stateroom;
  a museum, art gallery, or other sightseeing destination;
  a nuclear plant for training purposes;
  a street view.

Virtual tours are often provided over the World Wide Web, via a website. Such web-based virtual tours may be presented via any suitable format, such as for example Adobe Flash.

Virtual tours are often created by stitching together a number of digital photographs. A digital camera may be rotated to various positions, so that images can be captured in various orientations. In some cases, specialized equipment may be used, such as a fish eye lens to enable floor-to-ceiling views of the physical location. In either case, the creation of the virtual tour requires that a specific set of images be captured, and that the captured images have a defined spatial relationship with one another that can be exploited in creating the virtual tour.

However, even with a complete set of digital photographs covering a location or scene, most existing technologies are unable to provide an immersive three-dimensional virtual tour. To the contrary, in general such tours can be generated only if specialized equipment is used to create a three-dimensional model of the environment; such equipment may be costly, difficult to use, and not readily available to an ordinary user. Accordingly, high-quality virtual tours are, in general, only possible for physical locations where such equipment can be installed and used. Without the ability to capture a three-dimensional model of the physical location, conventional methods for generating virtual tours fail to provide a mechanism for generating satisfactorily immersive tours.

Furthermore, existing techniques for providing virtual tours generally consume large amounts of bandwidth, since significant amounts of data must be transmitted in order to provide a satisfactory user experience.

Furthermore, it is often difficult to make changes to a virtual tour, since changing one aspect or portion of the tour generally requires re-rendering the entire tour.

Furthermore, existing techniques for providing virtual tours generally require that a user navigate through a scene by dragging a mouse or pressing keys on a keyboard. Transitions from one image to the next take place in response to user action. Conventional mechanisms generally provide no technique by which transitions from one image to the next take place automatically without requiring user input.

Furthermore, many existing techniques for providing virtual tours introduce discontinuities when transitioning from one image to the next, which can cause the user to lose his or her spatial reference.

SUMMARY OF THE INVENTION

According to various embodiments of the present invention, interactive three-dimensional (3D) virtual tours are generated from ordinary two-dimensional (2D) still images such as photographs. Two or more 2D images are combined to form a 3D scene, which defines a relationship among the 2D images in 3D space. 3D pipes are defined, for connecting the 2D images with one another according to defined spatial relationships and for guiding virtual camera movement from one image to the next. Once the 3D pipes have been defined, a user can take a 3D virtual tour by traversing images within the 3D scene, for example by moving along the 3D pipes from one image to another.

In various embodiments, some or all of the 2D images can be selectively distorted or otherwise transformed to enhance the 3D effect, and thereby reinforce the impression that the user is moving within a 3D space.

In various embodiments, different mechanisms can be provided for navigating through a 3D virtual tour. The user can be given an opportunity to control virtual movement through the scene. Alternatively, an interface can be provided wherein navigation through the scene takes place automatically without requiring user interaction. In one embodiment, navigation is achieved by automatically moving through pipes and photos, and initiating transitions between 2D images as the pipes are traversed. Transitions from one image to the next can thus take place automatically without requiring user input.

According to various embodiments, a file format for encoding and storing the 3D scene is defined, as described herein. Also described are a method and user interface for generating a 3D interactive virtual tour from the 3D scene file.

According to various embodiments, data can be embedded within two or more image files, to describe 3D spatial relationships among the image files.

According to various embodiments, the system and method of the present invention provide several advantages over other techniques for providing panoramic views, such as Google Street View and Bing StreetSide, which are based on 360° panoramic photos geo-located on a map. For example, in one embodiment, the system and method of the present invention allow a user to move within a virtual 3D environment created using 2D images. In one embodiment, transitions from one image to the next take place when a user crosses a front door of a pipe; the user does not need to execute any explicit command in order to initiate such transitions. This technique is referred to as "Navigation without Clicks" (NWC)).

In addition, in one embodiment, the system and method of the present invention allow 3D virtual tours to be generated from 2D images taken with ordinary digital cameras, without the need for panoramic images that may require special equipment to generate. A 3D virtual tour can be generated from still images, without requiring video source files. Furthermore, the 3D virtual tours generated by the present invention can be provided in a client/server environment using less bandwidth than is consumed by streaming video, and using less bandwidth than many existing virtual tour systems. The size of a 3D virtual tour can be significantly smaller than a video covering the same physical area. Furthermore, changes can be easily made, since a 2D image can be replaced by a new image, and a new virtual tour can then be generated using the new image.

According to various embodiments, the system and method of the present invention can be used to generate 3D virtual tours for many different applications. Examples include: real estate, travel, education, online shopping, greeting cards, people, museums, university campuses, stadiums, cruises, hotels, resorts, industrial facilities, restaurants, cafes, shops, classrooms, games, virtual training and the like. Any of these can be configured in any known architecture, whether networked, distributed, web-enabled and/or standalone, and may be accessed using personal computers, mobile devices, kiosks, and/or any electronic devices. One skilled in the art will recognize that this list is merely exemplary, and that the techniques of the present invention can be implemented in any context where it may be useful to generate 3D virtual tours.

BRIEF DESCRIPTION OF THE IMAGES

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

FIG. 2B depicts a 3D scene in more detail, according to one embodiment of the present invention.

FIG. 3 depicts guided camera movement inside a 3D pipe, according to one embodiment of the present invention.

FIGS. 9A through 9D depict an example of creating and configuring a cage for controlling camera movement and a pipe for guiding the camera from one image to the next, according to one embodiment of the present invention.

FIGS. 10A through 10D depict an example wherein two images 102A, 102B are positioned in 3D space, and wherein cages and pipes have been established to control camera movement, according to one embodiment of the present invention.

FIG. 15A depicts an example of a parameterized deformation curve for movement mapping according to one embodiment of the present invention.

FIGS. 15B through 15G depict additional examples of deformation curves for movement mapping according to one embodiment of the present invention.

FIGS. 16A through 16I, 17A through 17I, 18A through 18I, 19A through 19I, and 20A through 20F depict various examples of images that have been deformed using deformation curves having different parameters.

Figure 21:
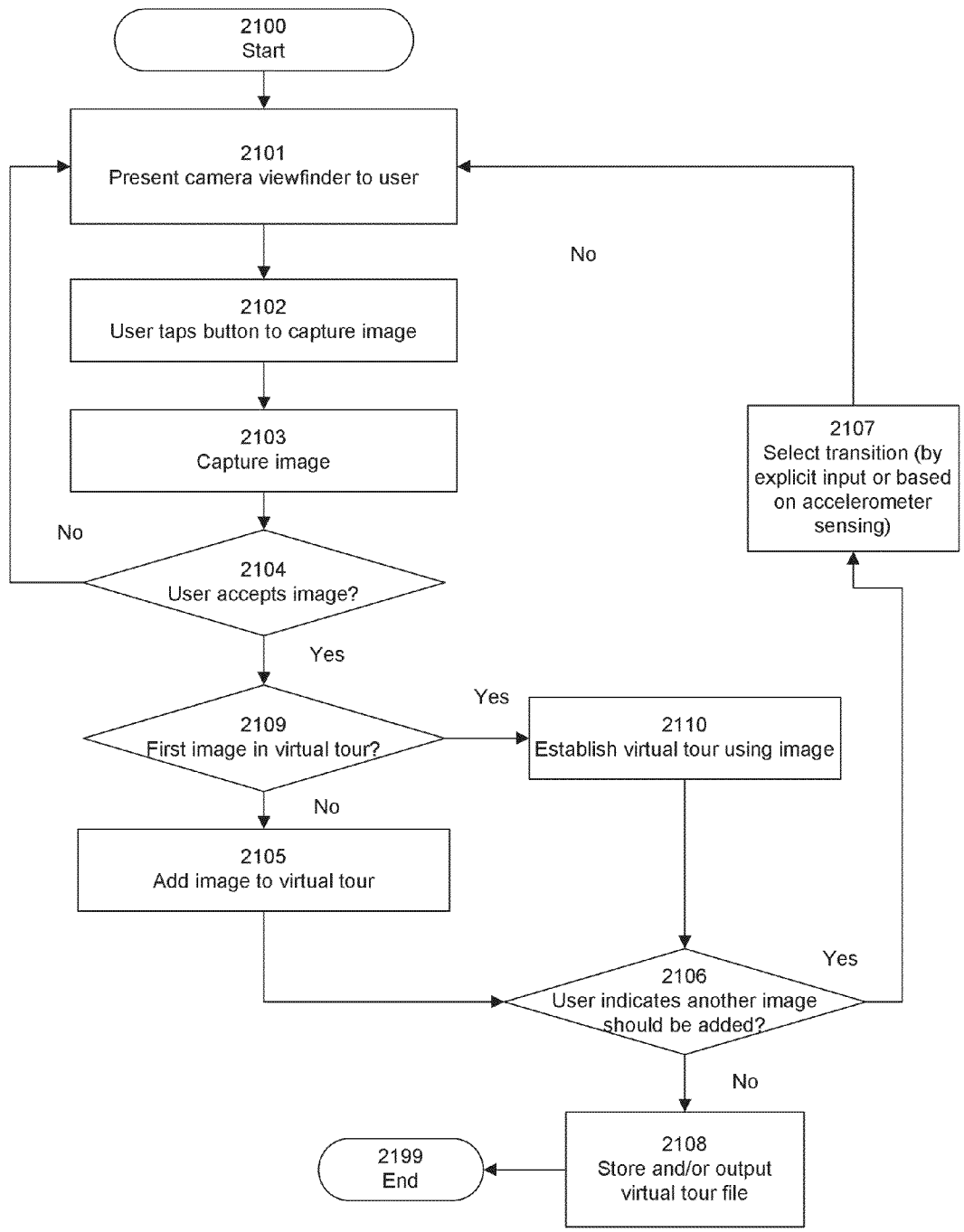

FIG. 21 is a flowchart depicting a method for on-the-fly generation of a 3D interactive virtual tour from successively captured images, according to one embodiment of the present invention.

FIGS. 22A through 22E depict a series of screen shots for on-the-fly creation of a 3D interactive virtual tour, according to one embodiment of the present invention.

DETAILED DESCRIPTION

According to various embodiments of the present invention, a 3D interactive virtual tour is generated from two or more still images such as photographs. Throughout the following description, the terms "image", "photo", "photograph", and "photographic image" are used; however, one skilled in the art will recognize that the present invention can be implemented using any still images and is not limited to photographs. Thus, references to "image", "photo", "photograph", and "photographic image" should be considered to include any still images, pictures, photographs, sketches, and the like.

In the description provided herein, the following terms are used:

- A 2D image is any image, such as a photograph, that is encoded in a digital image file.
- A 3D scene is a construct that defines positions and relationships, in 3D space, among two or more 2D images.
- A camera is a virtual camera defined in terms of a focal length, position and orientation within the 3D scene. A screen image for the user is generated based on the position and orientation of the camera, and one or more 2D images that are currently within the field of view of the camera.
- A cage is a construct in 3D space that defines the range of permissible movement of the camera while viewing a 2D image.
- A 3D pipe, or "pipe", is a defined path that is traversed by the virtual camera in moving from a view of one 2D image to a view of another 2D image.

A 3D interactive virtual tour, or "3D virtual tour" is a traversal through a 3D scene, which traversal may be user-controlled or automated.

In one embodiment, a 3D scene is generated by establishing one or more relationships between 2D photos in 3D space. Movement from one 2D photo to another is specified in terms of 3D pipes. In one embodiment, the 3D scene is generated as a file including the photos along with information describing the 3D relationship. The 3D scene is then used to implement the virtual tour. In other embodiments, the definition file of the 3D scene can be separated from the photos itself.

System Architecture

According to various embodiments, the present invention can be implemented on any electronic device or on an electronic network comprising any number of electronic devices. Each such electronic device may be, for example, a desktop computer, laptop computer, personal digital assistant (PDA), cellular telephone, smartphone, music player, handheld computer, tablet computer, kiosk, game system, or the like. As described below, the present invention can be implemented in a stand-alone computing system or other electronic device, or in a client/server environment implemented across an electronic network. An electronic network enabling communication among two or more electronic devices may be implemented using well-known network protocols such as Hypertext Transfer Protocol (HTTP), Secure Hypertext Transfer Protocol (SHTTP), Transmission Control Protocol/Internet Protocol (TCP/IP), and/or the like. Such a network may be, for example, the Internet or an Intranet. Secure access to the network may be facilitated via well-known techniques such as a Virtual Private Network (VPN).

Although the invention is described herein in the context of presentation of a 3D interactive virtual tour, for example via the Internet, one skilled in the art will recognize that the techniques of the present invention can be implemented in other contexts, and indeed in any system where it is desirable to generate a 3D representation of a scene from 2D images. Accordingly, the following description is intended to illustrate various embodiments of the invention by way of example, rather than to limit the scope of the claimed invention.

In one embodiment, the present invention is implemented as a software application running on a computing device. In another embodiment, the present invention is implemented as a software application running in a client/server environment comprising at least one server and at least one client machine. For example, the invention can be implemented as part of a website for presenting 3D interactive virtual tours, by transmitting a set of web pages from a server to a computing device; such web pages may include dynamic content presented via Adobe Flash, QuickTime, Dynamic HTML (DHTML), and/or the like. The user may view and interact with the 3D interactive virtual tours via a browser or other software application running on a computer, mobile device (such as a smartphone), tablet computer, or other computing device. Alternatively, the techniques described herein can be implemented on any other type of computing device, combination of devices, or platform.

Figure 7:
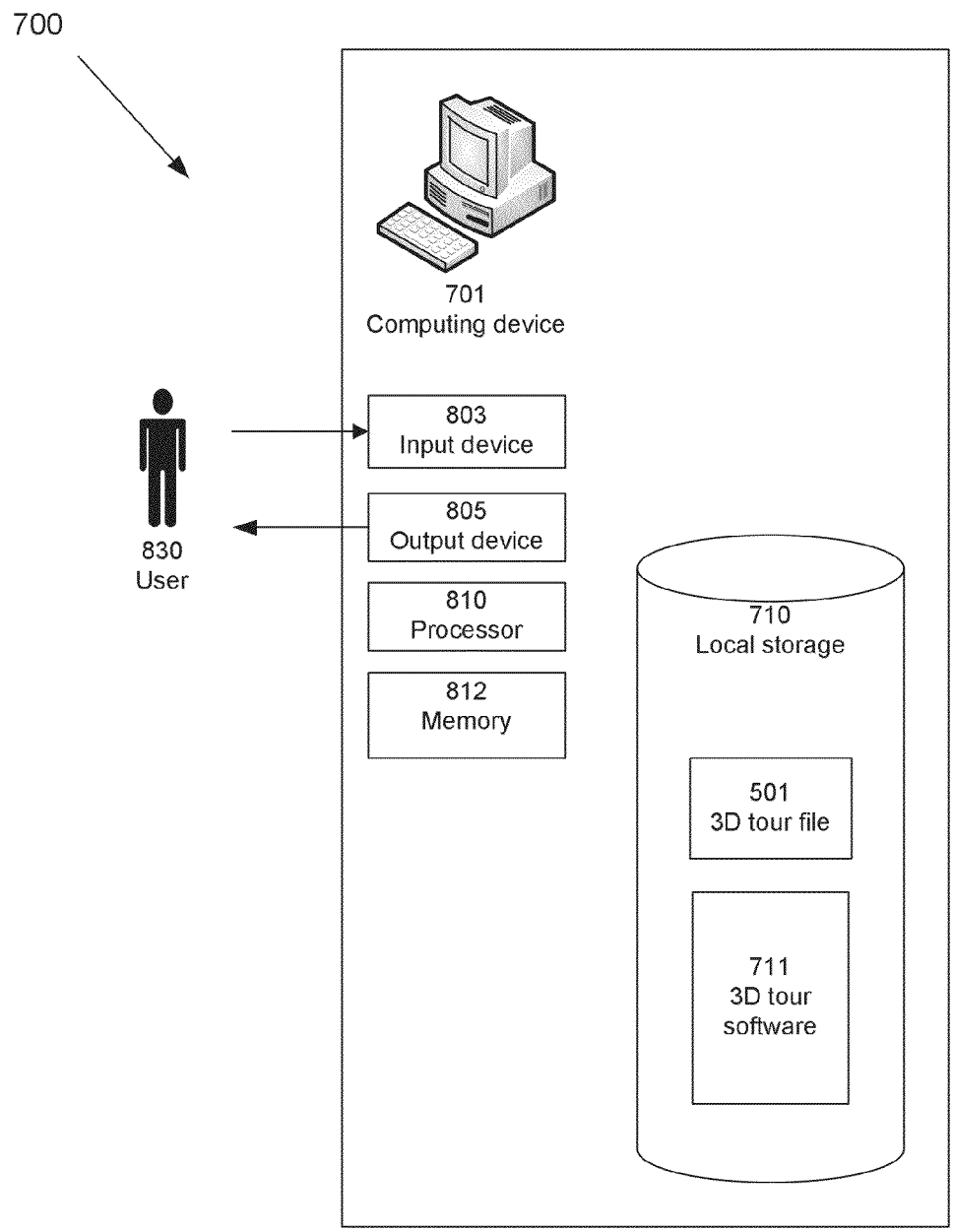
FIG. 7 is a block diagram depicting a hardware architecture for a system for generating a 3D interactive virtual tour in a stand-alone computing device according to one embodiment of the present invention.

Referring now to FIG. 7, there is shown a block diagram depicting a hardware architecture for a system 700 for generating a 3D interactive virtual tour from a 3D interactive scene virtual tour file 501 in a stand-alone computing device 701, according to one embodiment.

System 700 includes a computing device 701 having processor 810 for executing a 3D interactive virtual tour viewer 711, which may be implemented as software for performing the steps described herein. Computing device 701 includes local storage 710, such as a hard disk drive, for storing 3D interactive scene virtual tour file 501.

Computing device 701 may be any electronic device adapted to run software; for example, computing device 701 may be a desktop computer, laptop computer, personal digital assistant (PDA), cellular telephone, smartphone, music player, handheld computer, tablet computer, kiosk, game system, or the like. In one embodiment, computing device 701 is a desktop computer or mobile computing device running an operating system such as Microsoft Windows, available from Microsoft Corporation of Redmond, Wash., or Mac OS X, available from Apple Inc. of Cupertino, Calif., or iOS, available from Apple Inc. of Cupertino, Calif., or Android, available from Google, Inc. of Mountain View, Calif. In one embodiment, computing device 701 may be an iPhone or iPad available from Apple Inc. of Cupertino, Calif. An example of an implementation particularly suited to a mobile platform is described herein.

The techniques of the present invention can be implemented in a software application running on computing device 701 according to well-known techniques. For example, the software application may be a stand-alone software application or a web-based application or website that is accessible via a browser such as Microsoft Internet Explorer, available from Microsoft Corporation of Redmond, Wash., or by specialized web-based client software.

In one embodiment, computing device 701 comprises a number of hardware components as are well known to those skilled in the art. Input device 803 can be a keyboard, mouse, touchscreen, trackball, trackpad, five-way switch, voice input device, joystick, and/or any combination thereof, with which user 830 can provide input to the 3D tour software 711. Output device 805 can be a display screen for displaying information to user 830, including visual aspects of the 3D tour, and/or can include a speaker, printer, and/or any combination thereof. Output device 805 can be a 2D or 3D output device. Computing device 701 can be programmed to provide a graphical user interface through which software 711 interacts with user 830 and vice versa.

Processor 810 can be a conventional microprocessor for performing operations on data under the direction of software, according to well-known techniques. Memory 812 can be random-access memory having a structure and architecture as are known in the art, for use by processor 810 in the course of running software. Local storage 710 can be any magnetic, optical, and/or electrical storage device for storage of data in digital form; examples include flash memory, magnetic hard drive, CD-ROM, and/or the like. In one embodiment, local storage 710 includes 3D tour file 510 containing data to be used in presenting a virtual tour, and/or 3D tour software 711 which is run by processor 810 in the course of presenting a virtual tour.

One skilled in the art will recognize that the particular arrangement of hardware elements shown in FIG. 7 is merely exemplary, and that invention can be implemented using different hardware elements configured in any of a number of different ways. Thus, the particular architecture shown in FIG. 7 is merely illustrative and is not intended to limit the scope of the invention in any way.

Figure 8:
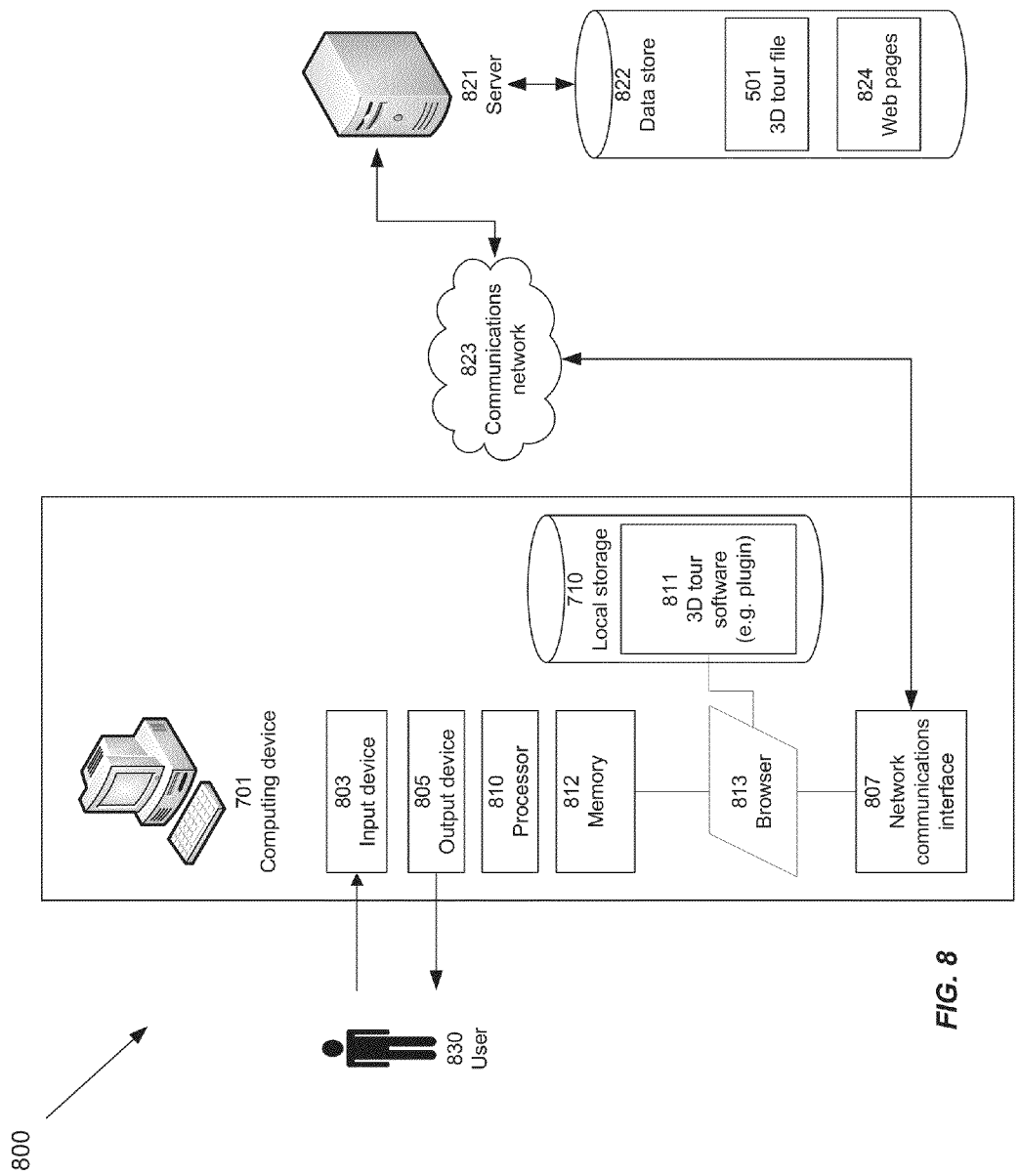
FIG. 8 is a block diagram depicting a hardware architecture for a system for generating a 3D interactive virtual tour in a client/server environment according to one embodiment of the present invention.

Referring now to FIG. 8, there is shown a block diagram depicting a hardware architecture for practicing the present invention in a client/server environment according to one embodiment of the present invention. Such an architecture can be used, for example, for implementing the techniques of the present invention in connection with a web page or web-based 3D tour application. Processor 810 runs browser 813 software according to well-known mechanisms. Browser 813 may be any conventional browser, such as Microsoft Internet Explorer, available from Microsoft Corporation of Redmond, Wash.

Network communications interface 807 is an electronic component that facilitates communication of data to and from other computing devices over communications network 823. Communications network 823 can be the Internet or any other electronic communications network. For example, communications can be implemented using the TCP/IP and HTTP protocols over the Internet.

Server 821 communicates with computing device 701 over network 823, and in one embodiment can be located remotely or locally with respect to computing device 701. In one embodiment, server 821 is associated with data store 822, which can act as a repository for web-based resources such as web pages 824 and/or 3D tour file 501. Alternatively, 3D tour file 501 can reside in local storage 710 of computing device 701.

In one embodiment, in response to requests from computing device 701, server 821 transmits web pages 824 to computing device 701 over network 823. Any or all of such web pages 824 may contain code for execution on computing device 701, in order to implement some or all of the techniques of the present invention via browser 813. Alternatively, the software code for implementing the techniques of the present invention may reside at computing device 801. For example, 3D tour software 811 can be implemented as a plug-in for browser 813, or it can reside at data store 822 and can run there in response to a request from computing device 701.

One skilled in the art will recognize that the present invention may be implemented using a distributed software architecture if appropriate. One skilled in the art will further recognize that the client/server architecture shown in FIG. 8 is merely exemplary, and that other architectures can be used to implement the present invention, including architectures that may or may not be web-based. Thus, the particular architecture shown in FIG. 8 is merely illustrative and is not intended to limit the scope of the invention in any way.

3D Space Generated from Single Image

In one embodiment, the present invention provides an interactive 3D virtual tour by moving a virtual camera in a virtual 3D space created from a single 2D image such as a photograph. The 2D image may be of any scene, such as for example a room, landscape, historic site, or the like. Thus, the 2D image may be a flat representation of a real-world three-dimensional space. By moving the virtual camera in 3D space while the 2D image is being viewed, the system of the present invention is able to simulate movement within the underlying real-world three-dimensional space (or an approximation thereof), even if the 2D image does not actually contain any 3D representations of the real-world three-dimensional space. On the user's screen, the 2D image is distorted, resized, and/or otherwise transformed in a manner that simulates movement within the real-world three-dimensional space. In one embodiment, the virtual camera moves in response to user input; in another embodiment, it moves automatically without requiring user input.

In one embodiment, the simulation can be enhanced by adding 3D positional information to the 2D image. The 3D space is generated from the 2D image by extracted vanishing points from the 2D image (either automatically or based on human input). A 3D model is constructed using the vanishing points using known photogrammetric techniques and rendering routines. Alternatively, vanishing points can be assumed to be at certain locations, particularly in applications where it may not be feasible or possible to extract actual vanishing points.

3D Space Generated from Two or More Images

In another embodiment, the present invention provides an interactive 3D virtual tour by moving a virtual camera in a virtual 3D space created from two or more 2D images, by defining relationships in 3D space among the 2D images. Thus, a virtual camera moves while one of the 2D images is being viewed, and can move from a position where one 2D image is being viewed to another position where another 2D image is being viewed. In one embodiment, such movement takes place along a 3D transition path defined in terms of a 3D pipe. The camera can also move within a defined "cage" while viewing any of the 2D images, so as to simulate 3D movement in the manner described above. To improve the realism of the 3D movement, vanishing points can be extracted or assumed to create a 3D model, in the same manner as described above for the single-image implementation. Any number of 2D images can be positioned in 3D space, with 3D pipes leading from one to the next, to define a 3D scene that can be traversed by a user. In one embodiment, the virtual camera moves in response to user input; in another embodiment, it moves automatically without requiring user input. Movement may be constrained by the defined cages. These various forms of travels and movement thus form a 3D interactive virtual tour.

3D Scene Components

Figure 1:
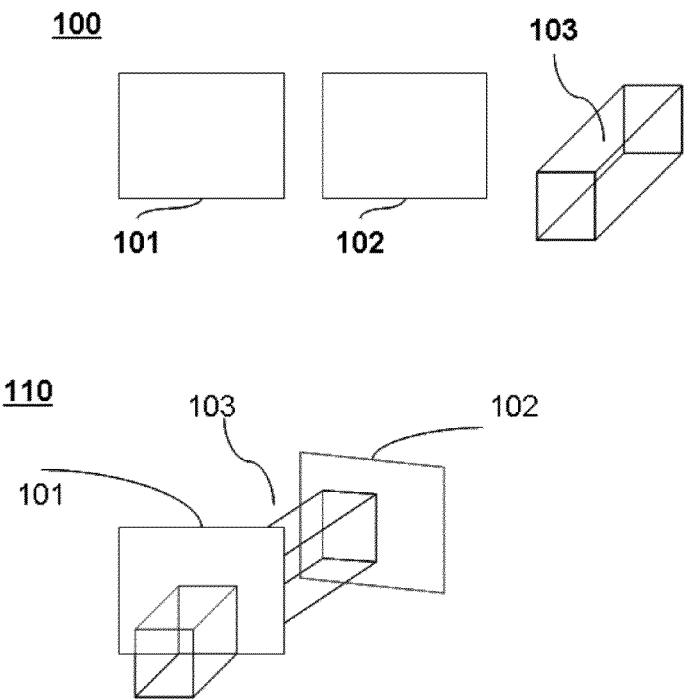
FIG. 1 depicts an example of a 3D scene for generating a 3D interactive virtual tour, according to one embodiment of the present invention.

Referring now to FIG. 1, there is shown an example 100 of a 3D scene for generating a 3D interactive virtual tour, according to one embodiment of the present invention. Example 100 includes two images 101 and 102 (which may be photographs or any other type of images), along with pipe 103 defined in three-dimensional space 103. As shown in 110, in one embodiment, a spatial relationship is defined between images 101 and 102 in three-dimensional space; this spatial relationship is defined by 3D pipe 103.

Figure 2A:
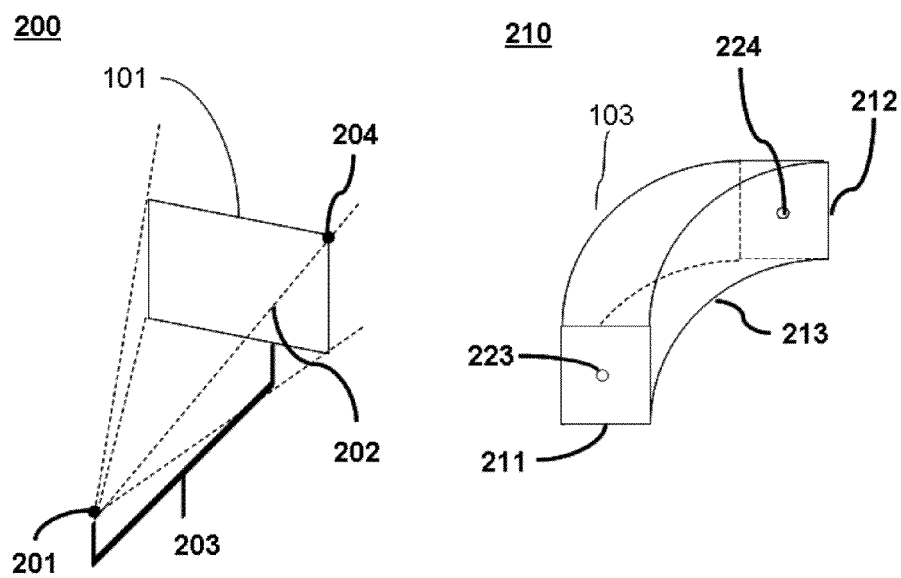
FIG. 2A depicts components of a 3D scene, according to one embodiment of the present invention.

Referring now also to FIGS. 2A and 2B, there is shown, in greater detail, an example of a 3D scene for generation of an interactive virtual tour according to one embodiment of the present invention.

In FIG. 2A, an example of a three-dimensional representation 200 of image 101 is shown. In this example, camera viewpoint 201 is placed at the focal length 203 of the camera used to take the image. Rays, such as ray 202, are determined by the camera viewpoint 201 and a selected point 204 in the image 101. Illustration 210 depicts a 3D pipe 103 as defined in three-dimensional space. In this example, pipe 103 is defined by front portal 211 and rear portal 212 (also referred to as a front door and a rear door, respectively) that represent the entrance and exit, respectively, of a camera path through 3D pipe 103. Walls, such as wall 213, are determined by portal 211 and portal 212.

FIG. 2B depicts an example 250 of a 3D scene in more detail, according to one embodiment of the present invention. Image 101 and image 102 are positioned in a three-dimensional space relative to 3D pipe 103. Pipe 103 is located in a three-dimensional space; its geometry, may, for example, be defined by a set of coordinates. Illustration 251 depicts a top view showing the relative positioning of image 101 with respect to front portal 211 according to the depicted example. The location of image 101 can be described, for instance, by a 3D transformation 252 (translation and rotation) matrix between the camera viewpoint 201 and the center of the front portal 223. Image 102 is positioned relative to the rear portal. Its location can be described for instance, by a 3D transformation 253 (translation and rotation) matrix between the camera viewpoint 205 and the center of the rear portal 224.

FIG. 3 depicts an example 300 of a mechanism for defining guided camera movement along 3D pipe 103. In one embodiment, paths, such as path 301, are determined based on a traversal from a center point in front portal 211 to a center point in rear portal 212. A virtual camera 302 with a given frustum angle 303 moves along such paths with a determined frame rate. In one embodiment, virtual camera 302 is associated with a frame buffer that includes a representation of images 101 as seen from the position and viewing angle of virtual camera 302. The contents of frame buffer of virtual camera 302, also referred to as a "camera view" of the scene, can be sent to output device 805 to be displayed to user 830. Alternatively, successive frames depicting contents of the frame buffer can be stored for later viewing (for example as a video file) and/or transmitted (for example via an electronic network).

3D Scene Creation

Figure 4:
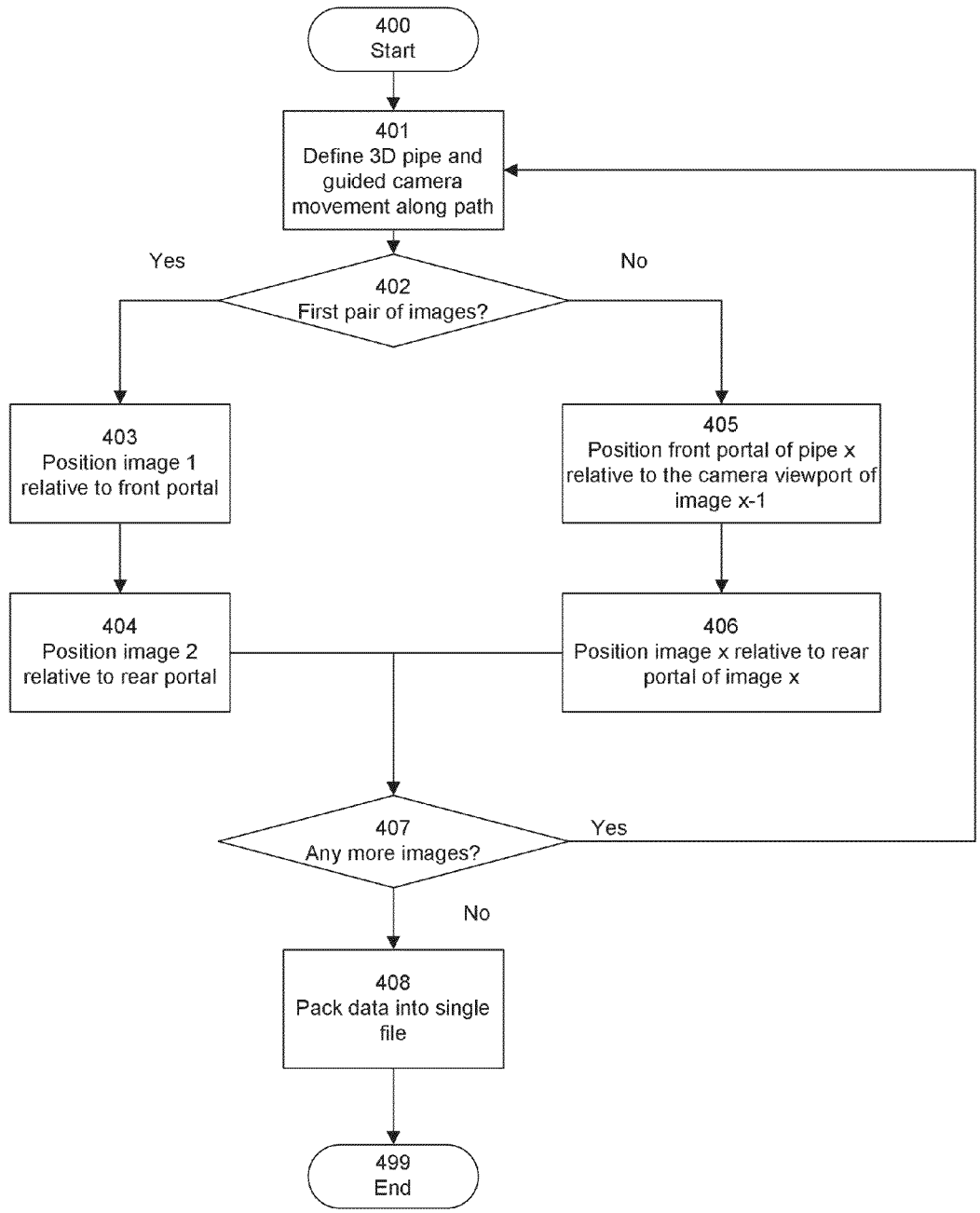
FIG. 4 is a flowchart depicting a method for creating and generating a 3D scene, according to one embodiment of the present invention.

Referring now to FIG. 4, there is shown a flowchart depicting a method for creating and generating a 3D scene for an interactive virtual tour, according to one embodiment of the present invention. The method of FIG. 4 can be performed by a system having the architecture shown in FIG. 7 or FIG. 8, or by a system having any other suitable architecture. The method of FIG. 4 can be used to construct a 3D scene as described above in connection with FIG. 2B.

The method begins 400. In step 401, a 3D pipe 103 is defined. As described above, 3D pipe 103 may be defined by three-dimensional spatial coordinates. Camera 302 movement is guided along a defined path between front portal 211 and rear portal 212 of 3D pipe 103. The pipe and path definitions can be stored, for instance, in an XML file in local storage 710 and/or server data store 822.

Images are associated with the pipe's front and rear gates, for example using pointers in a database. A determination is made 402 as to whether this is the first pair of images being associated with the 3D scene. If these images are the first pair, the first image is positioned 403 at a certain distance and rotation in 3D space, according to pipe's 103 front portal 211 location. The second image is positioned 404 at a certain distance and rotation in 3D space, according to pipe's 103 rear portal 212 location. Each of these distances and rotations may be defined by a translation and rotation matrix, for instance, or by any other suitable means.

If, in step 402, a new image being associated with the 3D scene is not part of the first pair, a new pipe 103 is constructed, with front portal 211 of pipe 103 being positioned relative to the camera 302 viewport of the most recently associated previous image. For ease of nomenclature, new pipe 103 is referred to as "pipe x" and the previous image is referred to as "image x−1", referring to the image most recently associated with the 3D scene. The image being newly associated with the 3D scene ("image x") is positioned 406 relative to rear portal 212 of 3D pipe 103. Thus, as each new image is associated with the 3D scene, a new pipe 103 is constructed, with its position being defined relative to a previous image, and the new image having a position defined relative to the new pipe 103.

If, in step 407, if there are more images to be associated with the 3D scene, the method returns to step 401. Otherwise, the generation of the 3D scene is complete. In one embodiment, the scene information, including image files, along with 3D data that describes the pipes geometry, guided camera 302 movement, and the relative position in the 3D space between all the components, are packed 408 into a single file. Any suitable data structure and format can be used for such a file; one example is provided below in connection with FIG. 5. The method then ends 499.

3D Scene File Format

Figure 5:
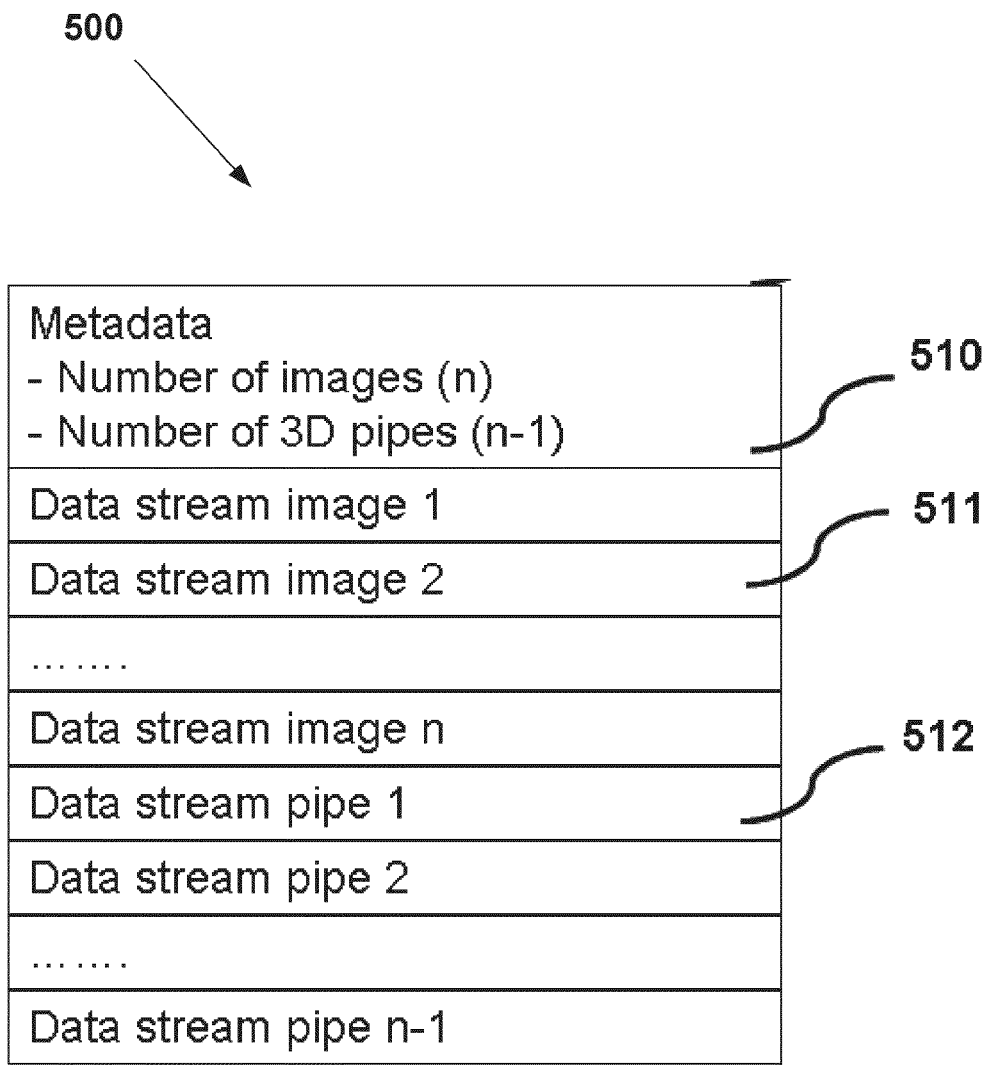
FIG. 5 depicts an example of a file format for describing a 3D scene, according to one embodiment of the present invention.

FIG. 5 depicts an example of a file format 500 for describing a 3D scene, as may be used in generating a file for the generation of an interactive virtual tour, according to one embodiment of the present invention. In the example, file format 501 includes header 510 with metadata; this metadata includes, for example, the number of images and 3D pipes and its size. Also included in file format 501 is data block 511, which provides a data stream of all the images of the scene arranged from 1 to n. The image data can be included in the file itself, or pointers can be included, to reference the locations of the images in some data storage device. Also included in file format 501 is data block 512, which provides a data stream describing each pipe's geometry, arranged from 1 to n−1.

One skilled in the art will recognize that the file format depicted in FIG. 5 is merely exemplary, and that other arrangements of the data can be used without departing from the essential characteristics of the present invention. In addition, any of the depicted elements can be omitted, and/or new elements added, without departing from the essential characteristics of the present invention.

Generating a 3D Interactive Virtual Tour

Figure 6:
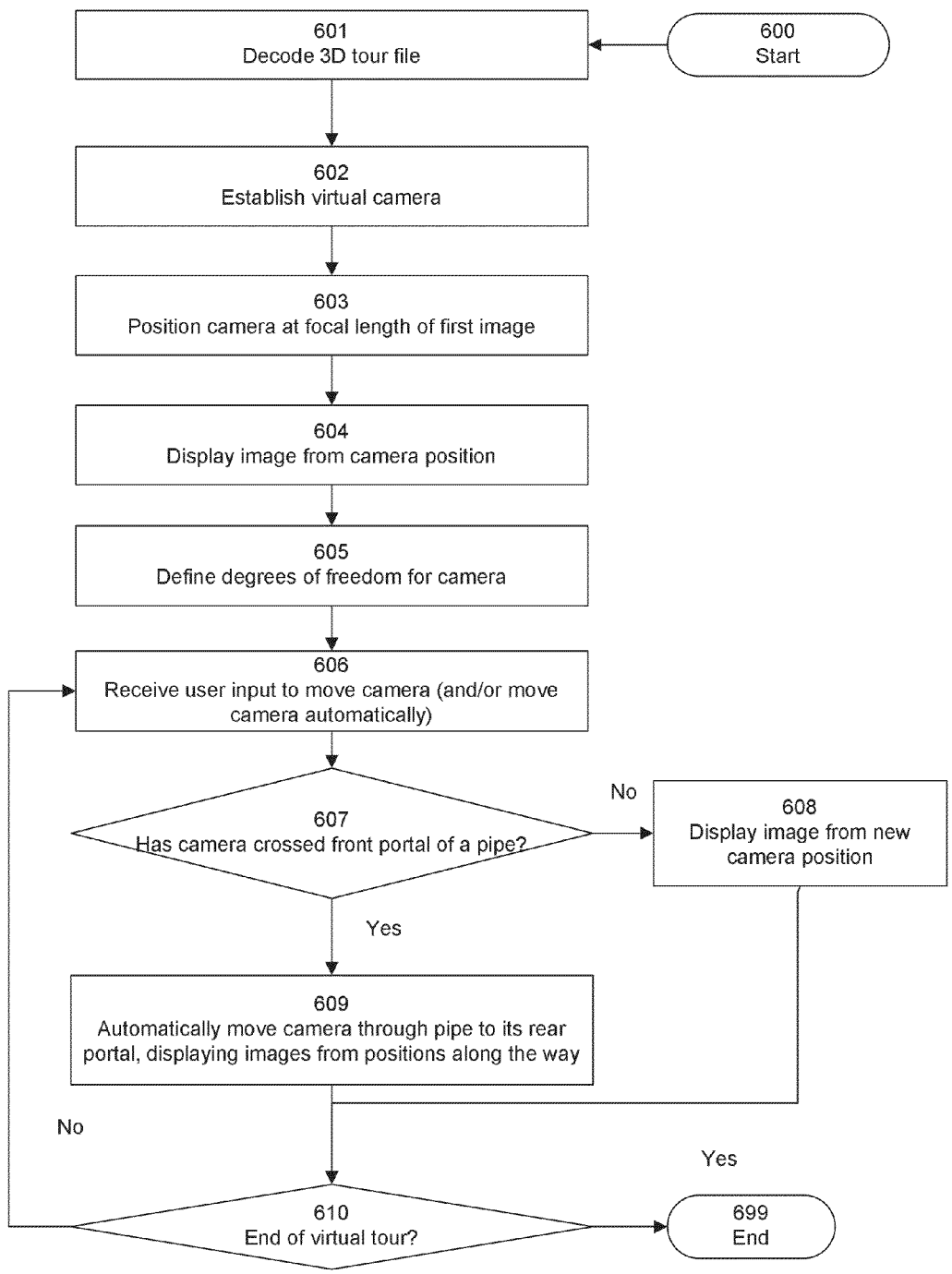
FIG. 6 is a flowchart depicting a method for generating a 3D interactive virtual tour from a 3D scene, according to one embodiment of the present invention.

FIG. 6 is a flowchart depicting a method for 600 generating a 3D interactive virtual tour from a 3D scene stored in a 3D scene file according to the format 501 described above in connection with FIG. 5.

The method begins 600. 3D virtual tour file 501 is decoded 601 to establish a 3D scene. Step 601 may include, for example decompressing images 101, 102, etc., positioning the images in 3D space, and/or establishing and linking 3D pipes 103 to the images' viewpoints.

Virtual camera 302 is established 602, with determined parameters such as a frame rate, viewport, and the like. In one embodiment, the viewport of virtual camera 302 is established to be equivalent to the focal length of camera 302 plus the CCD ratio that was used to take image 1 101. Its parameters can be defined, for instance, via an XML file.

In one embodiment, virtual camera 302 is positioned 603 in the 3D scene at the focal length 203 of first image 101 (also referred to as image 1) and perpendicular to its normal. This allows camera's 302 viewport to cover the entire first image 101. An image from virtual camera's 302 position is displayed 604, for example by outputting the contents of camera's 302 frame buffer on output device 805 for presentation to user 830. The result is a rendering of first image 101.

The camera's degrees of freedom are defined 605, along with the events that will cause movement along those degrees of freedom to take place. For example, in one embodiment, camera 302 can be configured to allow movement within a plane perpendicular to first image 101, while disallowing pitch and roll rotations. In other embodiments, other types of movement can be allowed or disallowed.

Camera movements, including position and rotation, can be controlled, for instance, by user 830 via input provided on input device 803; for example, user 830 can manipulate a pointing device such as a mouse or trackball, or press arrow keys, or touch a touch-sensitive screen or other surface, depending on the input mode provided by input device 803. Alternatively, in one embodiment, such navigation takes place automatically without user input.

User input is received 606 to move camera 302 (alternatively, such movement takes place automatically). In step 607, a determination is made as to whether camera 302 has crossed a front portal 211 of a pipe 103. In one embodiment, this causes camera 302 to automatically move 609 through the new pipe 103 to its rear portal 212. In one embodiment, this automatic movement is performed smoothly and without the need for any action by user 830. This technique is referred to as Navigation without Clicks (NWC)). In another embodiment, user 830 can control the movement through pipe 103.

If, in step 607, camera 302 has not crossed a front portal 211 of a pipe 103, camera 302 is moved to the new position defined by the user input (or by the automatic movement). An image from camera's 302 new position is displayed 608, for example by outputting the contents of camera's 302 frame buffer on output device 805 for presentation to user 830. In this manner, virtual camera 302 is made to appear to move through the virtual 3D scene.

If the virtual tour is over 610, the method ends 699. Otherwise, the method returns to step 606.

Example of Cages and Pipes

In one embodiment, a virtual "cage" is established, for constraining virtual camera 302 movement within a 3D scene. Referring now to FIGS. 9A through 9D, there is shown an example of a technique for creating and configuring cage 901 for controlling camera 302 movement and pipe 103 for guiding camera 302 from one image to the next, according to one embodiment of the present invention.

FIG. 9A depicts an initial setup, wherein camera 302 is placed at a distance from image (such as a photo) 102A equal to focal distance 903. Here, pipe 103 is shown as a construct having triangular cross-section (when viewed from above). Pipe 103 includes front portal 211 and rear portal 212. In the example, camera 302 can enter pipe 103 at any point along the horizontal line demarcating the front portal 211. Once camera 302 enters pipe 103, it is directed toward rear portal 212; such movement can take place automatically, in one embodiment, so as to carry the viewer smoothly from one image 102A to the next.

In one embodiment, the image shown on output device 805 (such as a display screen) is formed based on a virtual view of image 102A from the vantage point of camera 302. Thus, the image may be a distorted, skewed, zoomed-in, or otherwise modified version of image 102A. Mesh deformation and/or other transformative mechanisms can be used for distorting the presented image, as described in more detail below. In one embodiment, image 102A represents a 3D model, such as a computer-aided design (CAD) model having perspective generated and/or corrected using photogrammetric techniques. The CAD model can be generated from a photograph, for example, and can have rendered artificial textures and/or mapped textures extracted from the photograph.

Referring now to FIGS. 9B through 9D, there is shown an example of a technique for constructing cage 901 to constrain movement of camera 302 so that the viewing of image 102A will appear relatively consistent with three-dimensional movement through 3D space. Cage 901 ensures that user 830 does not cause camera 302 to move outside an area where a realistic rendition of image 102A can be generated. In one embodiment, camera movement is constrained by cage 901, while camera rotation is constrained by the border of image 102A (so that user 830 cannot cause camera 302 to pan to view unwanted areas that lie outside such borders).

In FIG. 9B, vertical walls 902A of cage 901 are defined by joining camera's 302 center point with the edges of image 102A, forming a triangle.

In FIG. 9C, cage 901 is further constrained so that camera 302 cannot pass beyond the line corresponding to front portal 211, unless the camera actually passes through front portal 211. In this manner, an additional constraint is imposed, so as to prevent movement that would bypass pipe 103. To accomplish this goal, new walls 902B, 902B for cage 901 are constructed by drawing a line between walls 902A and each of the two front corners of pipe 103 (i.e., the two ends of front portal 211); this also defines wall 902C corresponding to front portal 211.

In FIG. 9D, in one embodiment, the rearmost corner of cage 901 is also cut off, forming another wall 902D, so as to avoid floating point calculation problems that may occur if camera 302 is moved to the very back of the triangle defined in FIG. 9B.

The final result is cage 901 having a six-sided shape as shown in FIG. 9D. One side 902C abuts front portal 211 of pipe 103, and has width equal to the width of front portal 211. FIG. 9D also includes a detail view of the area around wall 902D, for clarity.

In one embodiment, the user can freely navigate camera 302 while viewing image 102A, within the bounds described by cage 901, until front portal 211 is crossed. As described above in connection with step 609 of FIG. 6, once front portal 211 is crossed, in one embodiment camera 302 automatically follows pipe 103 to rear portal 212, and camera 302 is directed to point to a new image (not shown).

One skilled in the art will recognize that the particular technique for defining cage 901 as depicted in FIGS. 9A through 9D is merely exemplary, and that other methods can be used for constraining camera 302 movement.

Referring now to FIGS. 10A through 10D, there is shown an example wherein two images (such as photographs) 102A, 102B are positioned in 3D space, and wherein cages 901A, 901B and pipes 103A have been established to control and/or constrain camera 302 movement. The example is presented for illustrative purposes, and depicts a simplified 3D scene containing two images, 102A, 102B so that the operation of the invention can be more easily understood. However, one skilled in the art will recognize that the depicted techniques can be extended to any 3D scene having any number of images, without departing from the essential characteristics of the present invention. For clarity, the actual content of images 102A, 102B is omitted from FIGS. 10A and 10B.

As shown in FIG. 10A, cage 901A constrains camera 302 movement while image 102A is being viewed. Viewing area 1001 shows the portion of the 3D scene that is currently being viewed by camera 302 based on its current position, zoom level, and the like. Once camera 302 has crossed front portal 211, pipe 103A controls camera 302 movement. At that point, camera 302 is directed smoothly along pipe 103A until it reemerges at rear portal 212 and is reoriented to point to image 102B. Then, cage 901B constrains camera 302 movement while image 102B is being viewed. Cage 901B functions to constrain movement of camera 302 in a similar manner as cage 901A.

Figure 10B:
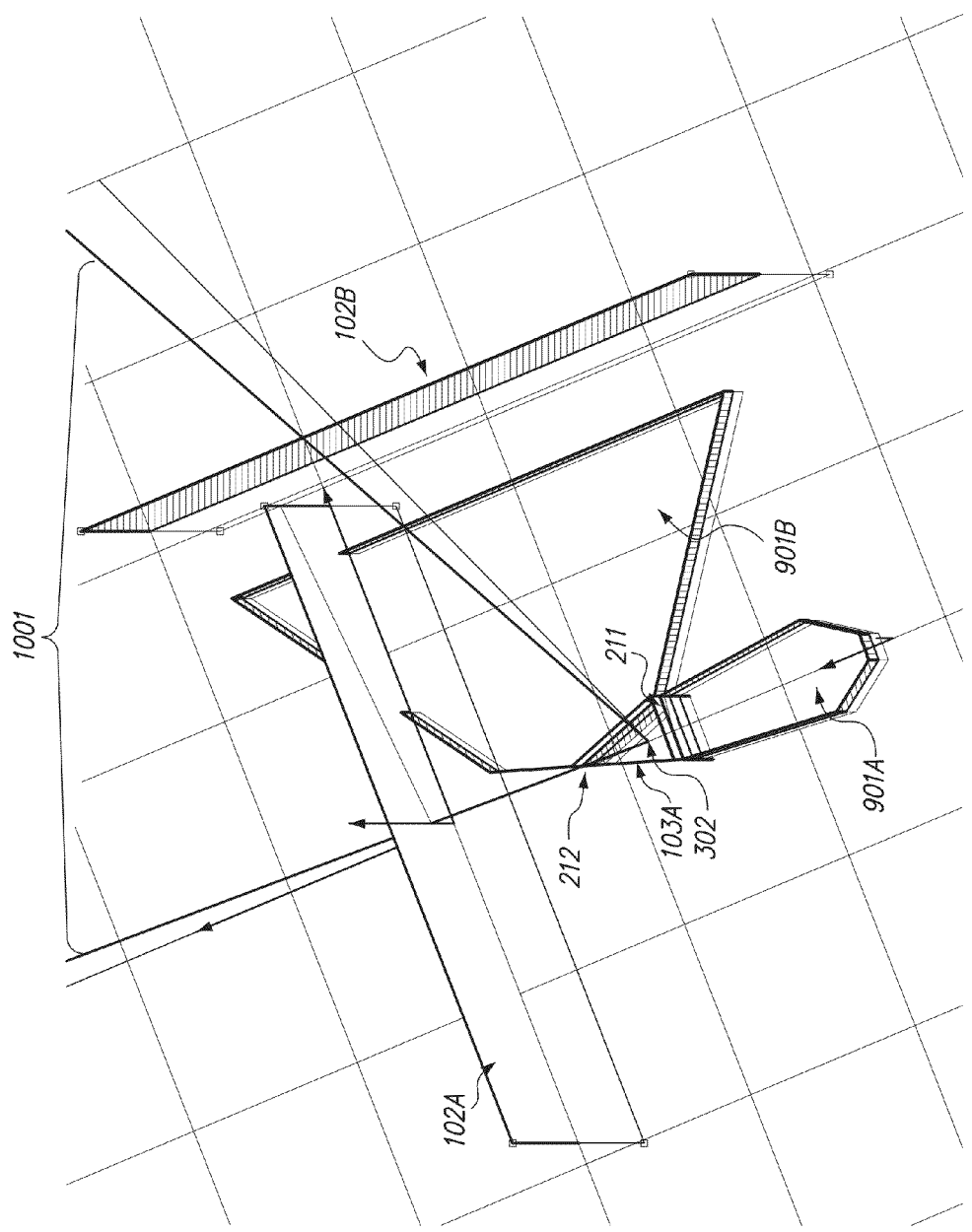

FIG. 10B depicts the same example as FIG. 10A, but from a different viewpoint. Here, camera 302 has moved through front portal 211 and is now within pipe 103A.

Figure 10C:
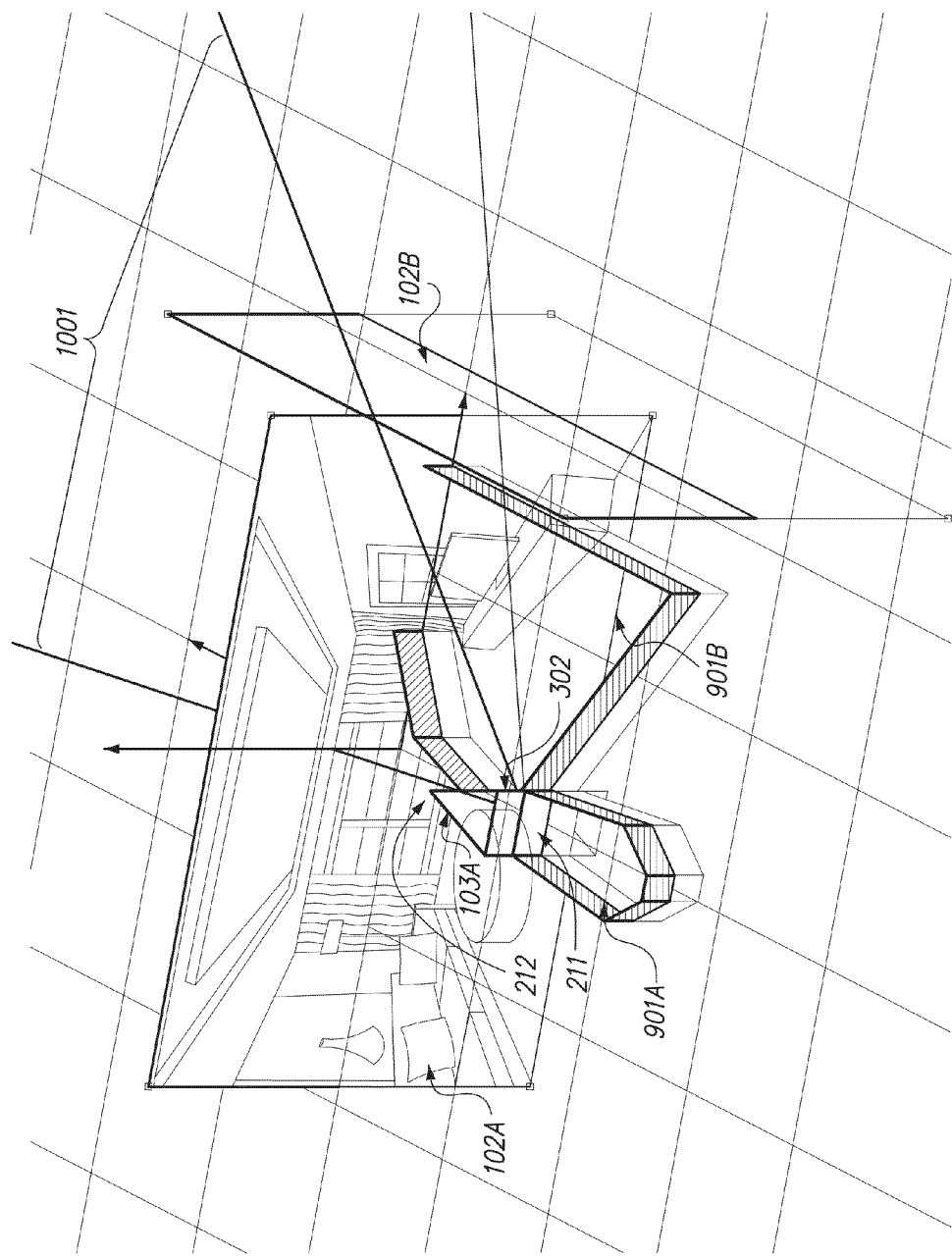

FIG. 10C depicts the same example as FIG. 10A, but also includes an example of a photograph for image 102A.

Figure 10D:
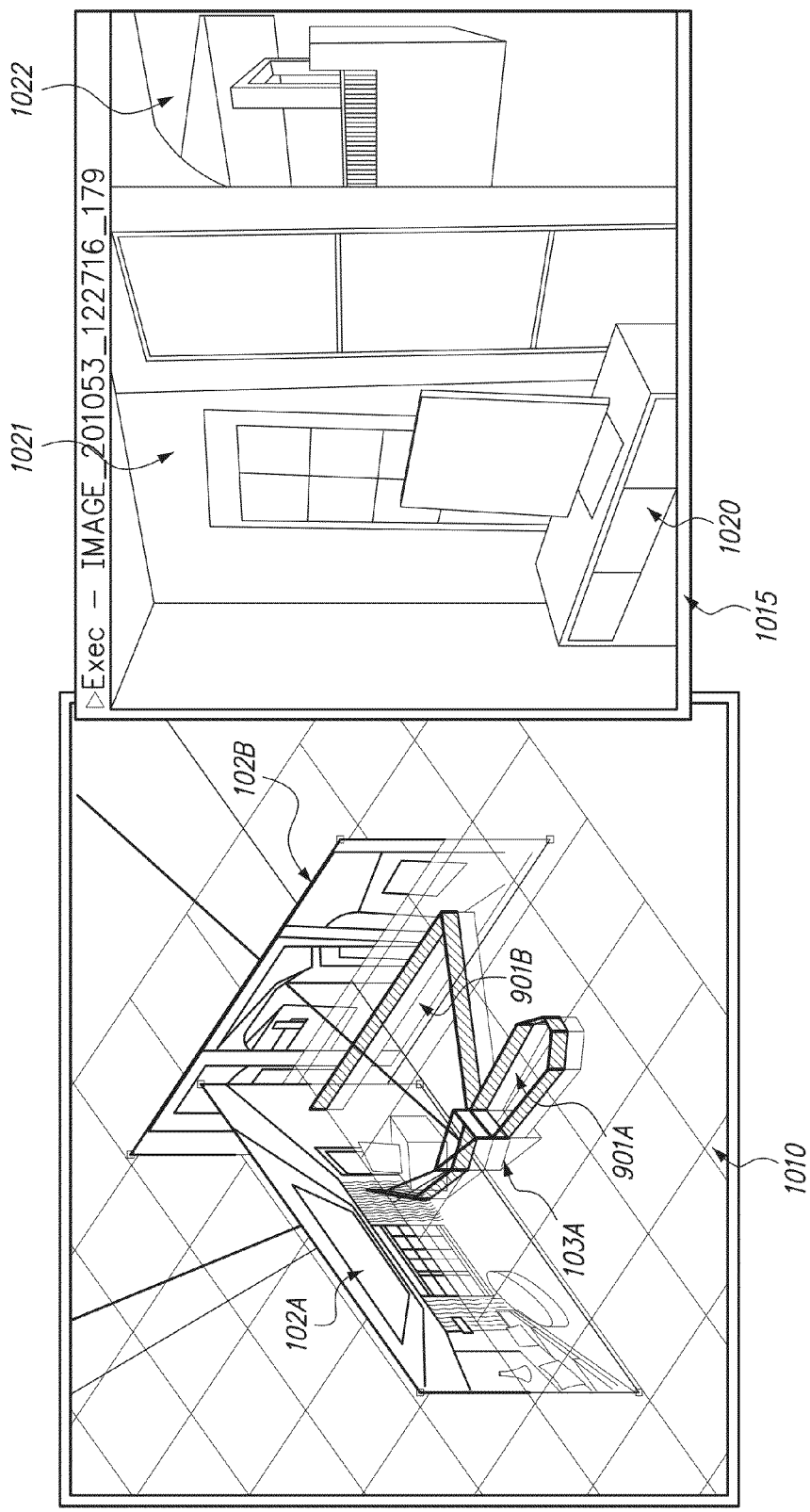

FIG. 10D depicts the same example as FIG. 10A, but also includes two windows 1010, 1015 as may be displayed on output device 805. Window 1010 shows the relationship between cages 901A, 901B, pipe 103A, and images 102A, 102B as depicted and described above in connection with FIGS. 10A through 10C. Window 1015 includes an example of a screen image 1020 that might be shown while camera viewpoint spans both images 102A and 102B. As can be seen in FIG. 10D, while camera 302 is moving along pipe 103A, screen image 1020 transitions from one image 102A to the next 102B. During this transition, portions of the two images 102A, 102B are combined to generate a transitory screen image 1020 containing elements of images 102A, 102B. In the example of FIG. 10D, the left side 1021 of screen image 1020 is taken from image 102A, while the right side 1022 is taken from image 102B. In one embodiment, as camera 302 moves along pipe 103, screen image 1020 changes smoothly, in a "wipe" fashion or using some other suitable transition effect, to remove image 102A from the screen and to introduce image 102B.

In one embodiment, images 102 are blended smoothly with one another during transitions, so as to simulate a rotation or other effect corresponding to the 3D relationship between the images 102, as defined by the pipe shape 103. For example, in one embodiment, alpha blending can be used to implement such transitions, providing a variable degree of transparency as the images are blended. Images 102 can be distorted as appropriate to reinforce the appearance of moving through 3D space.

Figure 11:
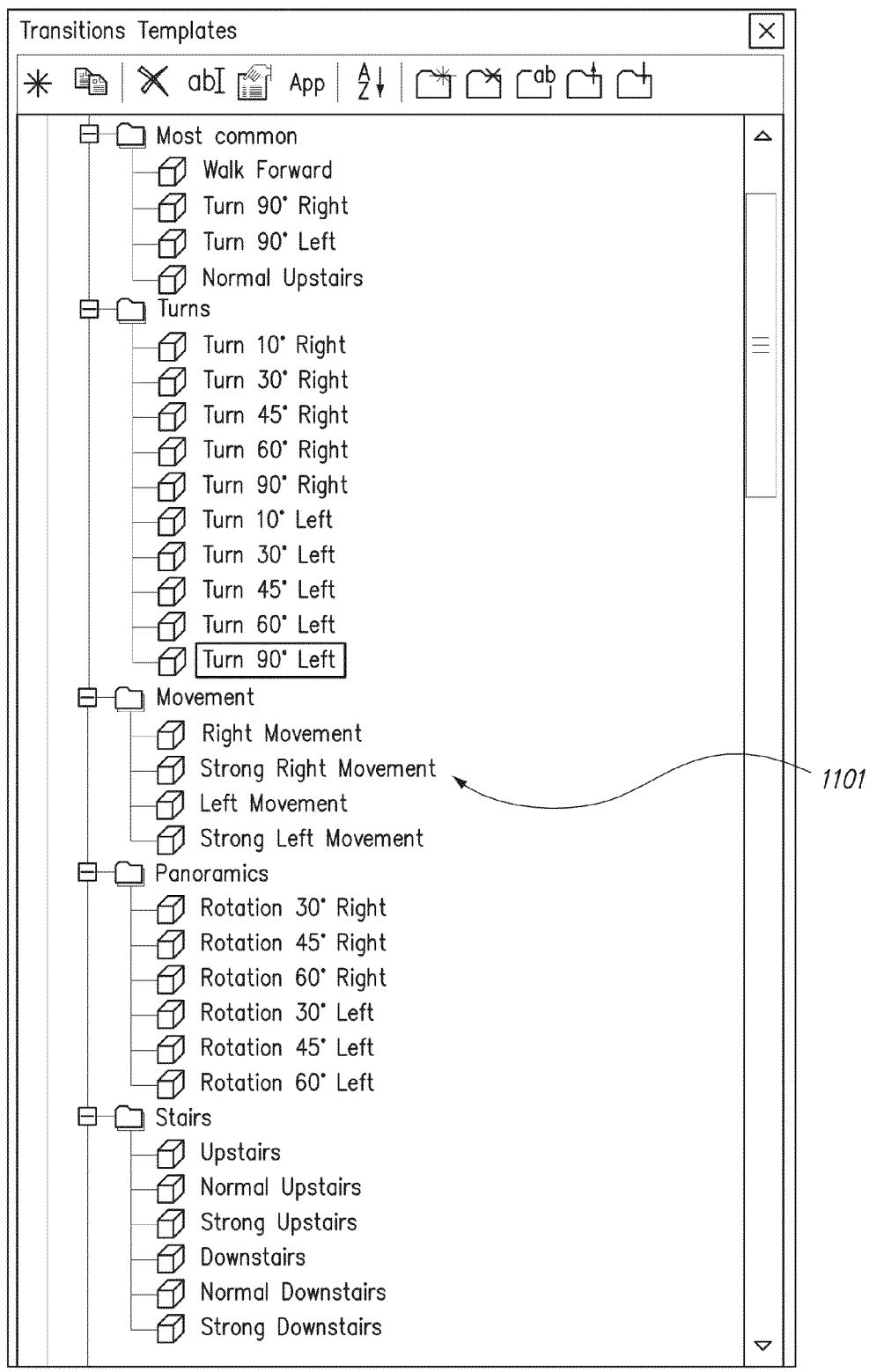
FIG. 11 depicts an example of a list of various types of pipes that can be provided according to one embodiment of the present invention.

In one embodiment, different pipes 103 can be established for different types of transitions from one image 102 to another. Referring now to FIG. 11, there is shown an example of a list 1101 of various types of pipes that can be provided according to one embodiment of the present invention.

Multiple Pipes

In one embodiment, multiple pipes 103 can be defined for a particular image 102. Referring now to FIGS. 12A through 12F, there are shown various examples of a 3D scene containing multiple pipes 103, according to one embodiment of the present invention.

Figure 12A:
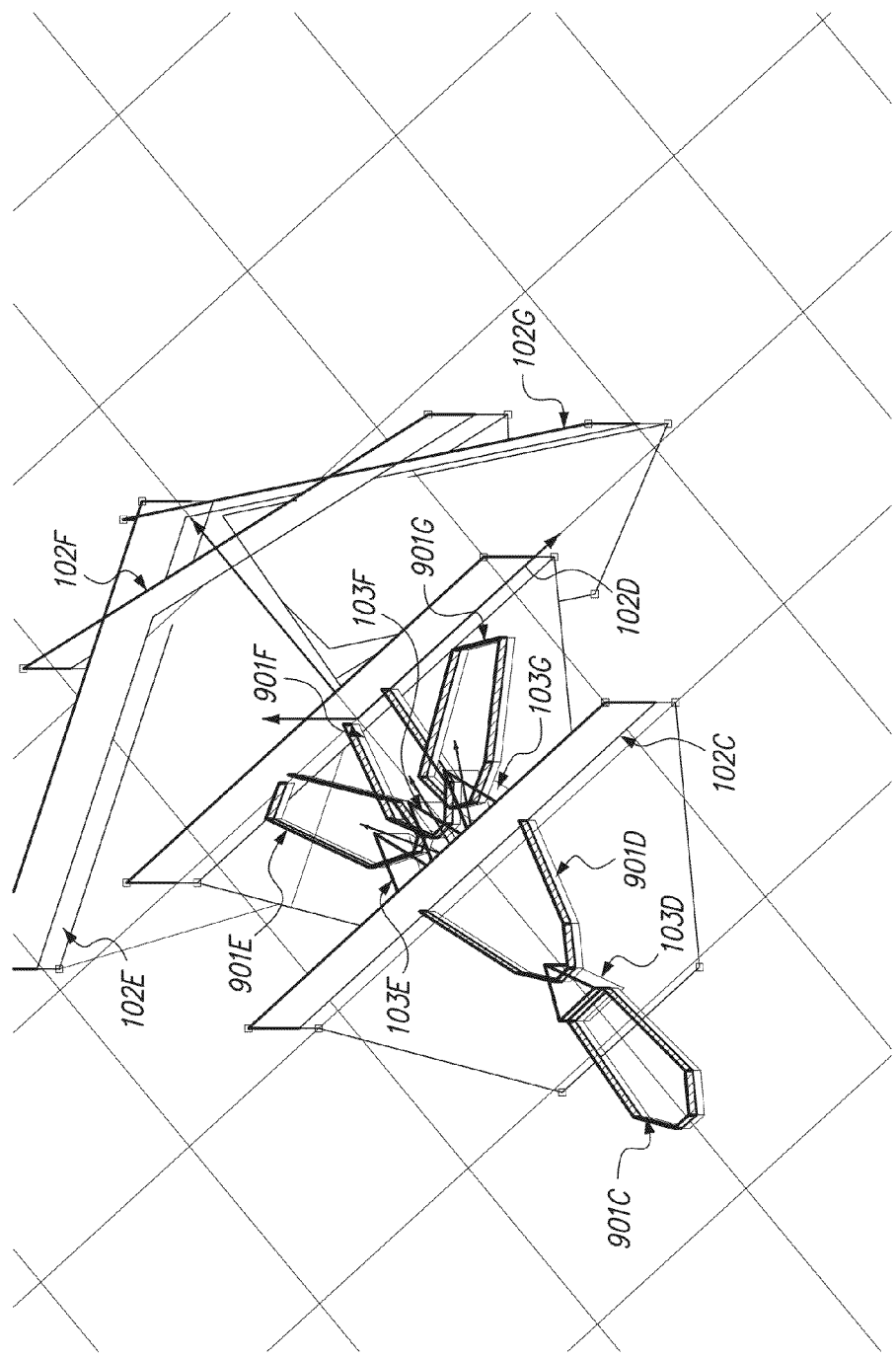
FIGS. 12A through 12F depict examples of a 3D scene containing multiple pipes, according to one embodiment of the present invention.

FIG. 12A depicts an example wherein a user can navigate from image 102C to image 102D (via pipe 103D), and then to any of images 102E, 102F, or 102G. Movement is initially constrained by cage 901C (while viewing image 102C), then by cage 901D (while viewing image 102D). The determination of which image 102E, 102F, or 102G is presented depends on which pipe 103E, 103F, or 103G is entered (by traversing its front portal). The entered pipe 103 then directs the camera to a corresponding image 102E, 102F, or 102G. Once pipe 103E, 103F, or 103G has been traversed, the user is free to move the camera within a cage 901E, 901F, or 901G corresponding to the image 102E, 102F, or 102G.

Figure 12B:
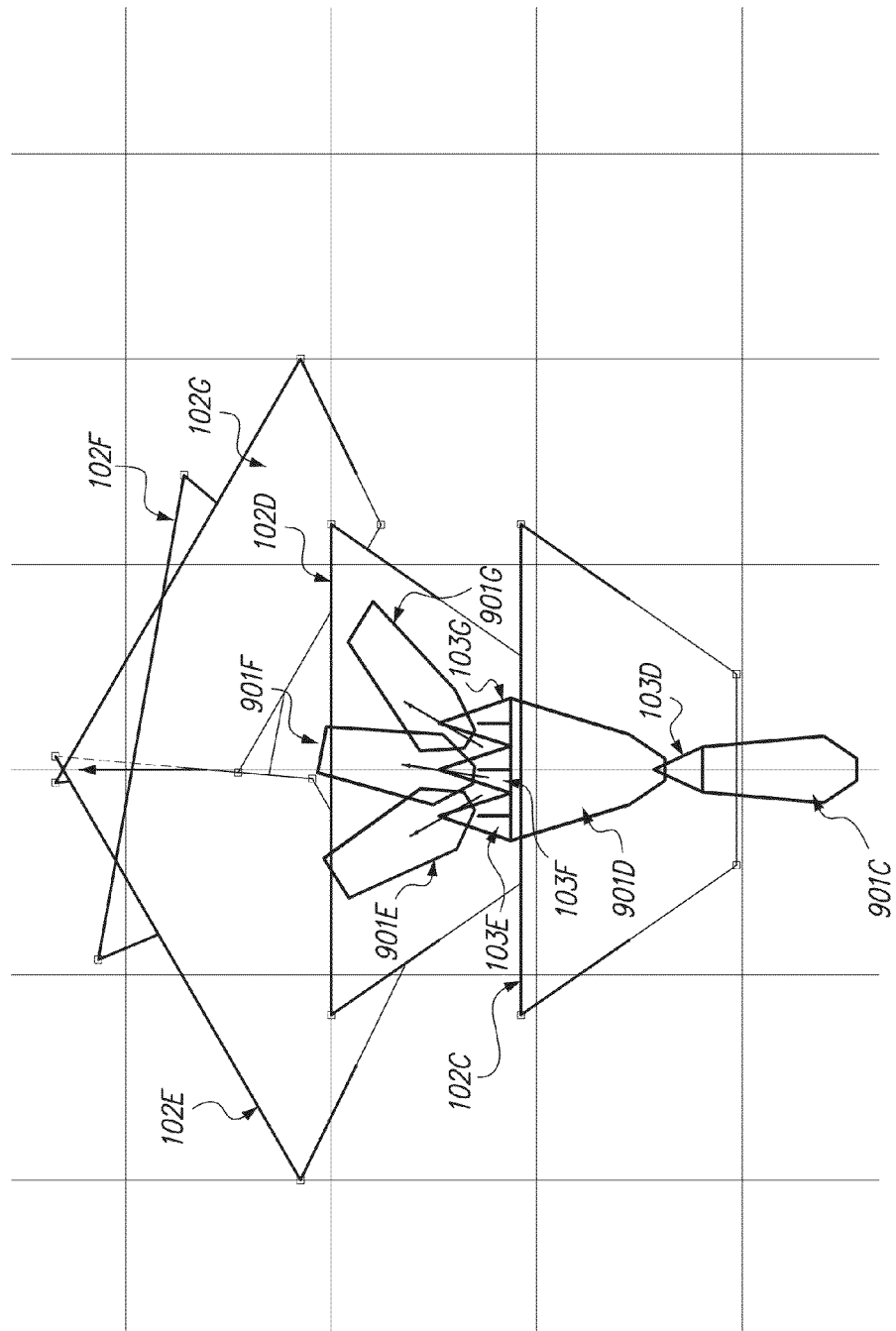
Figure 12C:
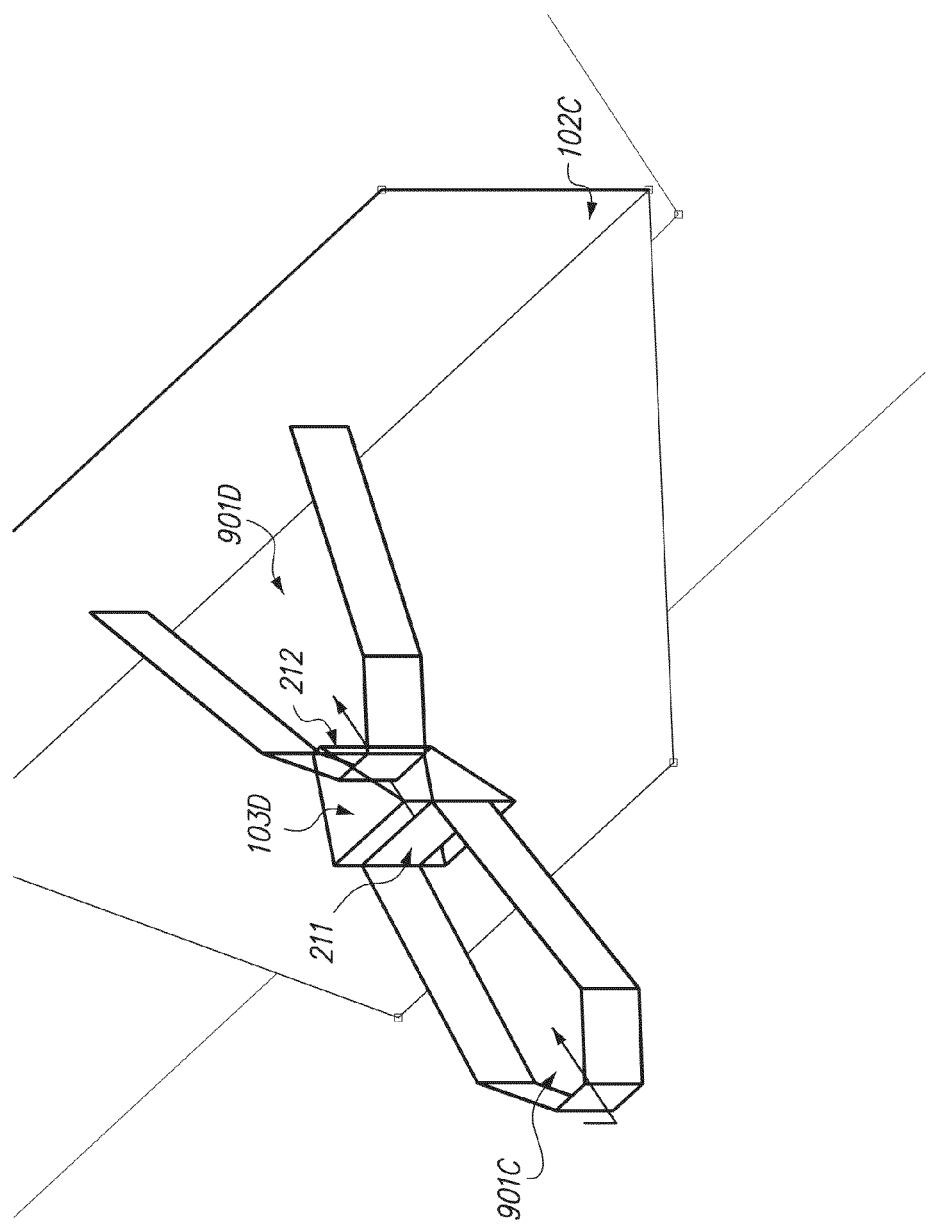
Figure 12D:
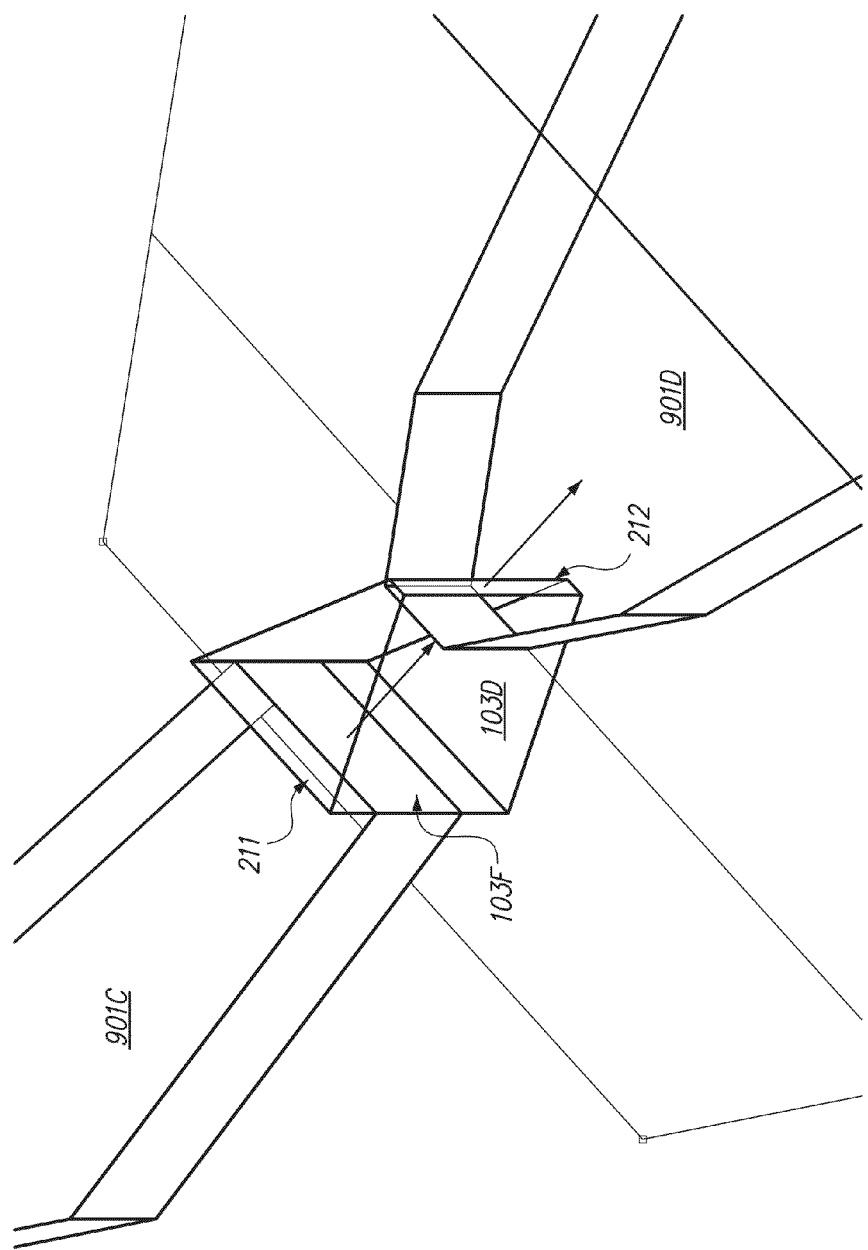
Figure 12E:
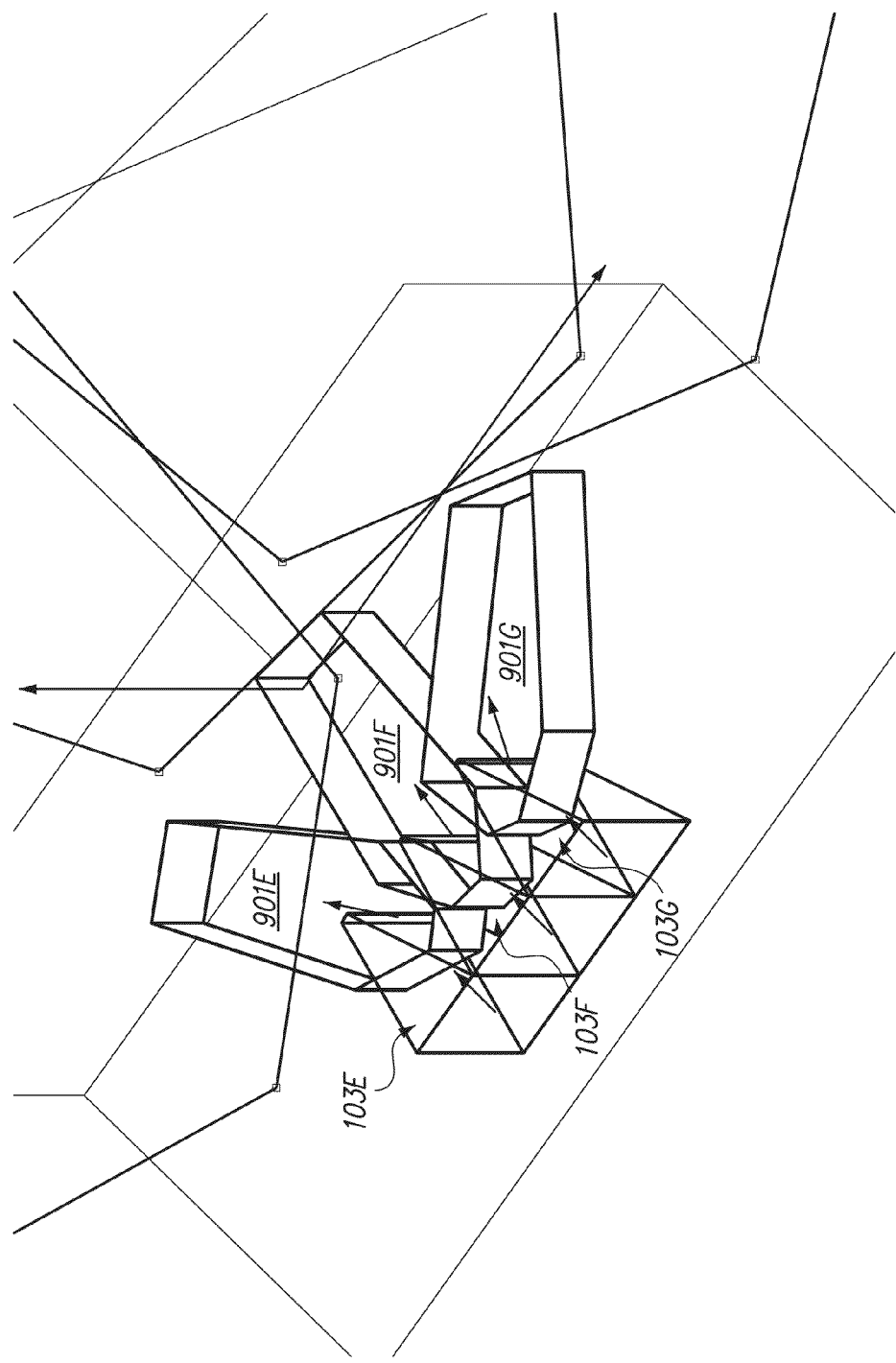
Figure 12F:
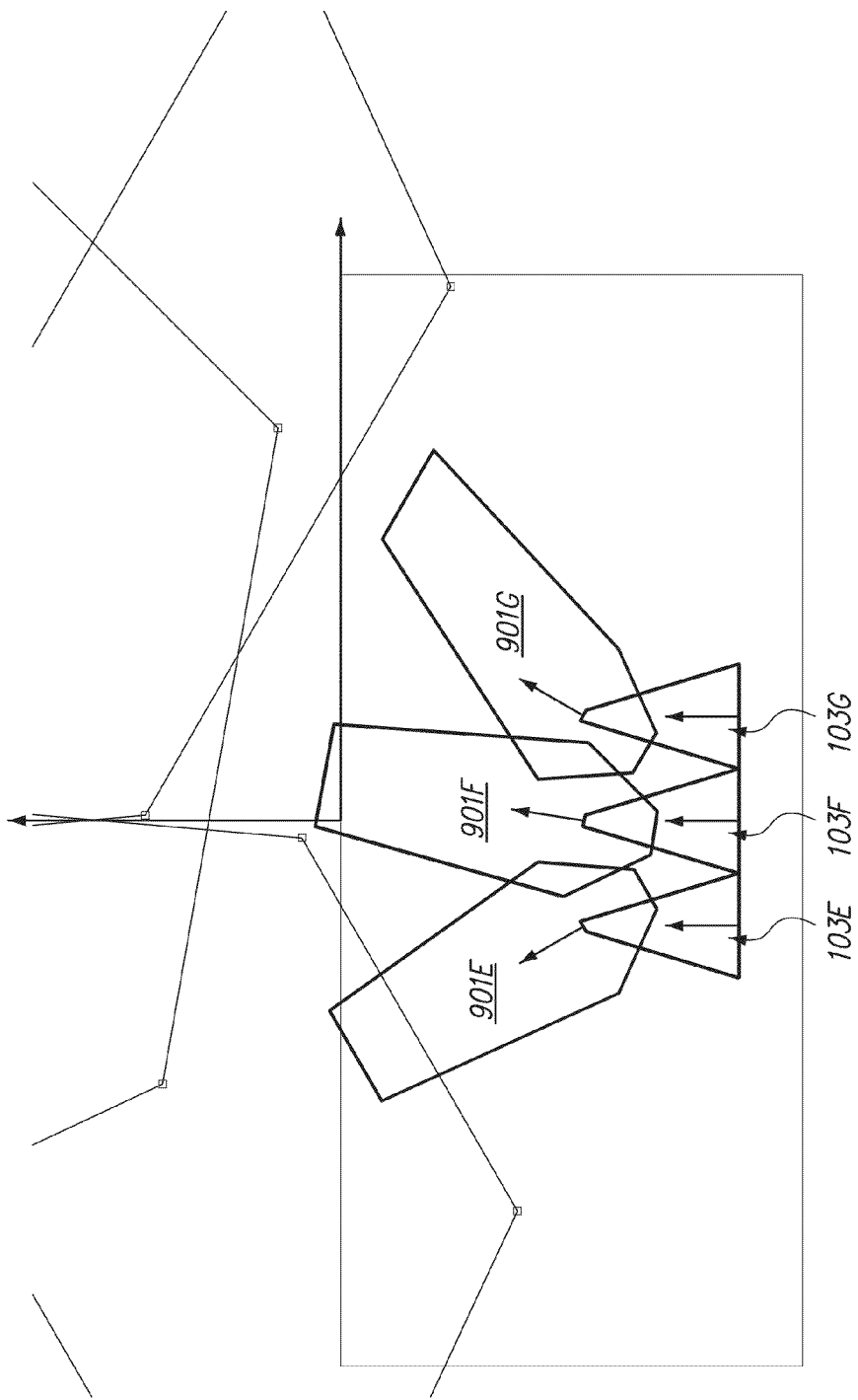

FIGS. 12A through 12F depict additional views and detail views of the arrangement shown in FIG. 12A. FIG. 12B depicts an overhead view. FIGS. 12C and 12D depict detail views of cages 901C, 901D and pipe 103D, including front portal 211 and rear portal 212 of pipe 103D. FIGS. 12E and 12F depict detail views of cages 901E, 901F, 901G and pipes 103E, 103F, 103G.

User Interface for Creating Virtual Tours

In one embodiment, the system and method of the present invention provide a user interface for generating 3D virtual tours from 2D images. In one embodiment, such a user interface also provides functionality for editing the 2D images, for example by adjusting exposure levels, cropping, rotating, and the like.

Figure 13A:
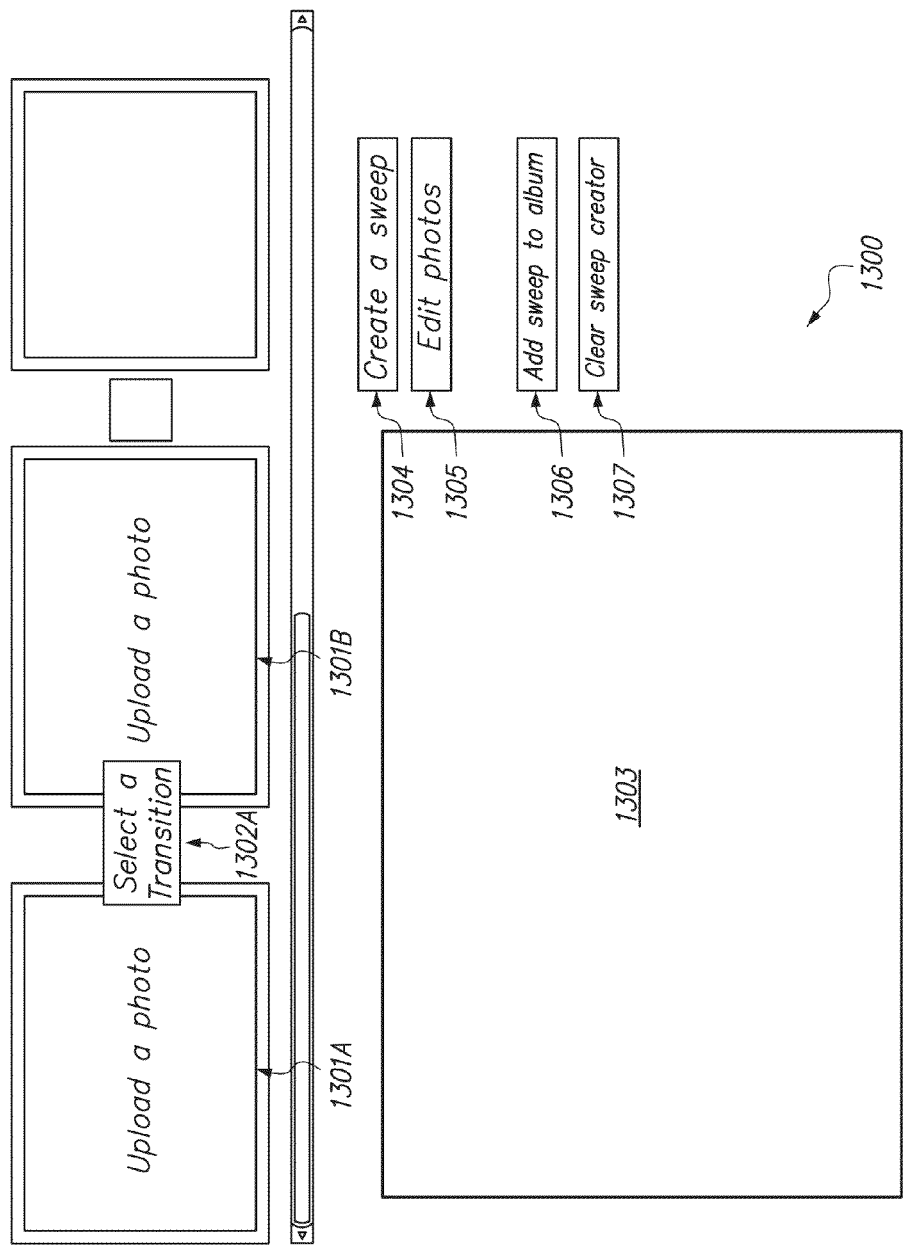
FIGS. 13A through 13N depict a series of screen shots for a user interface for creating a 3D interactive virtual tour, according to one embodiment of the present invention.
Figure 13B:
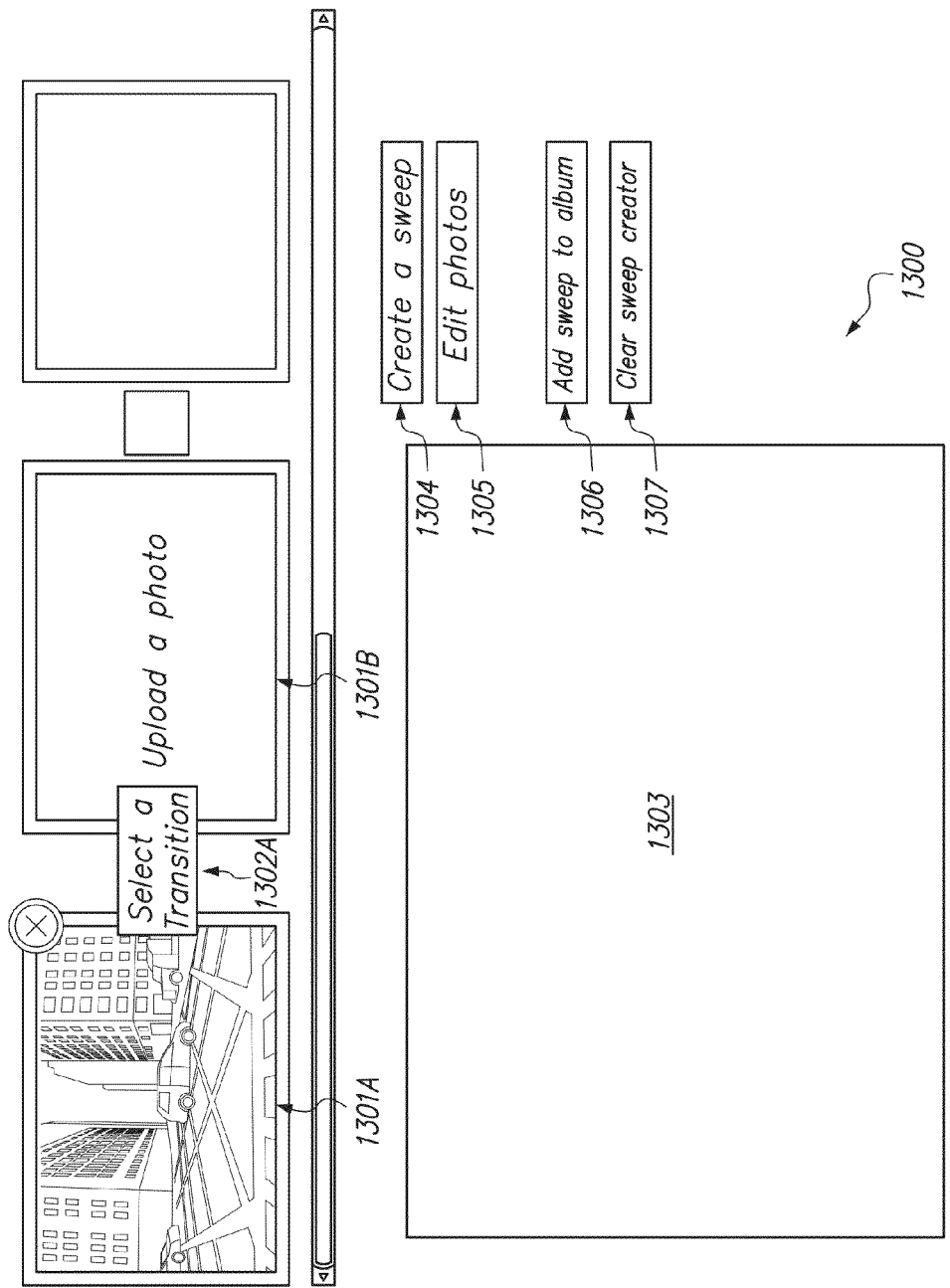
Figure 13C:
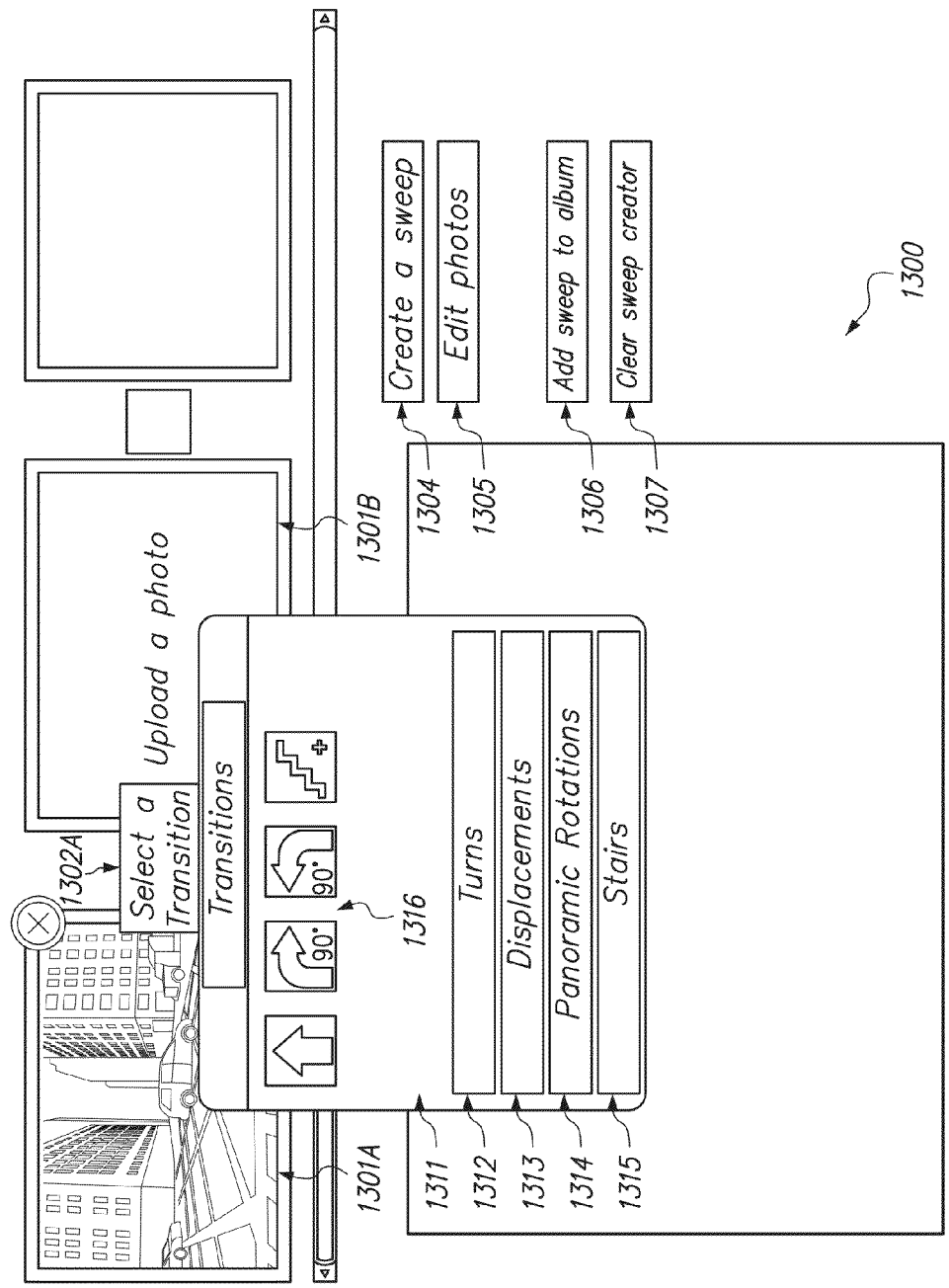
Figure 13D:
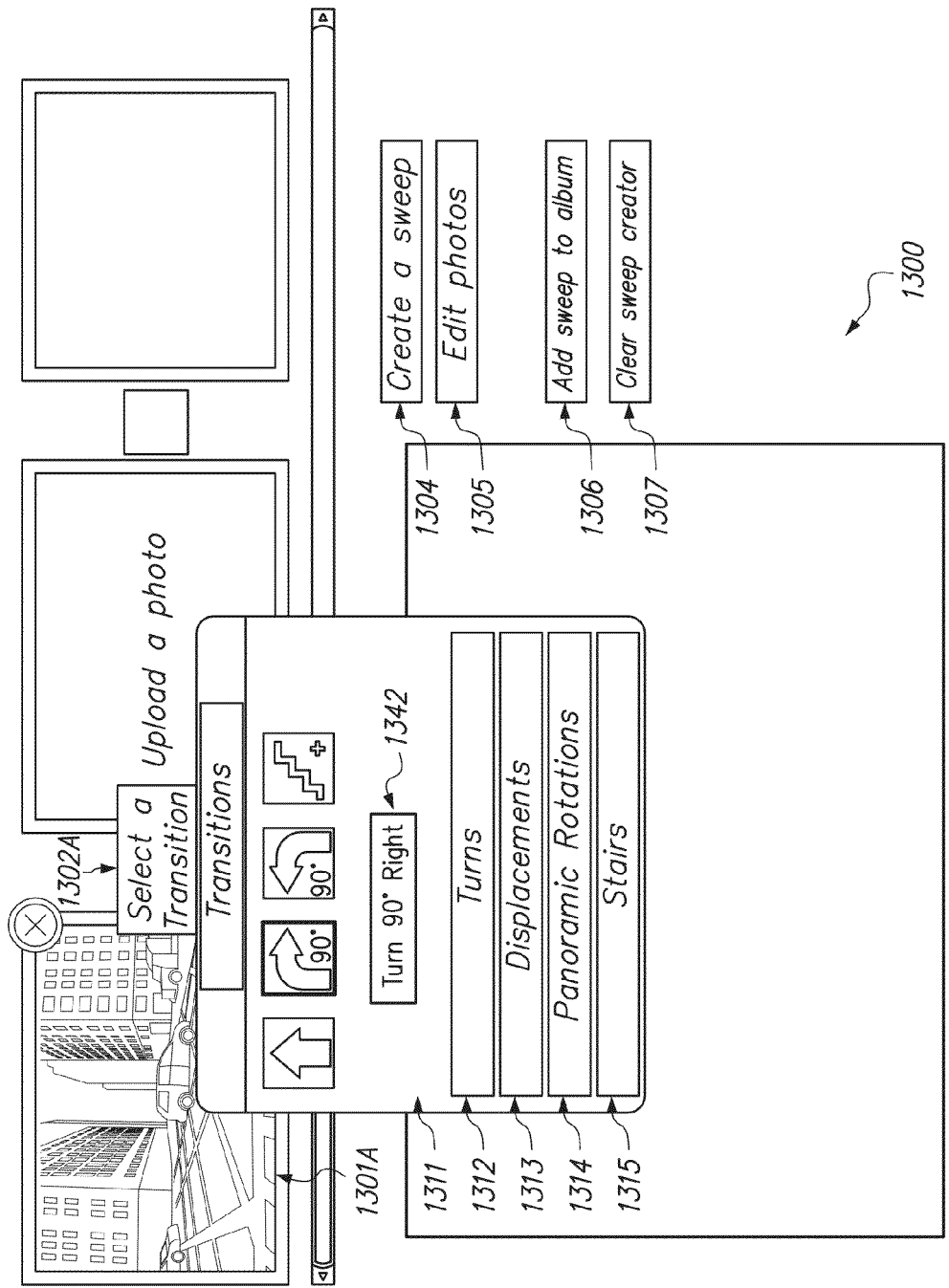
Figure 13E:
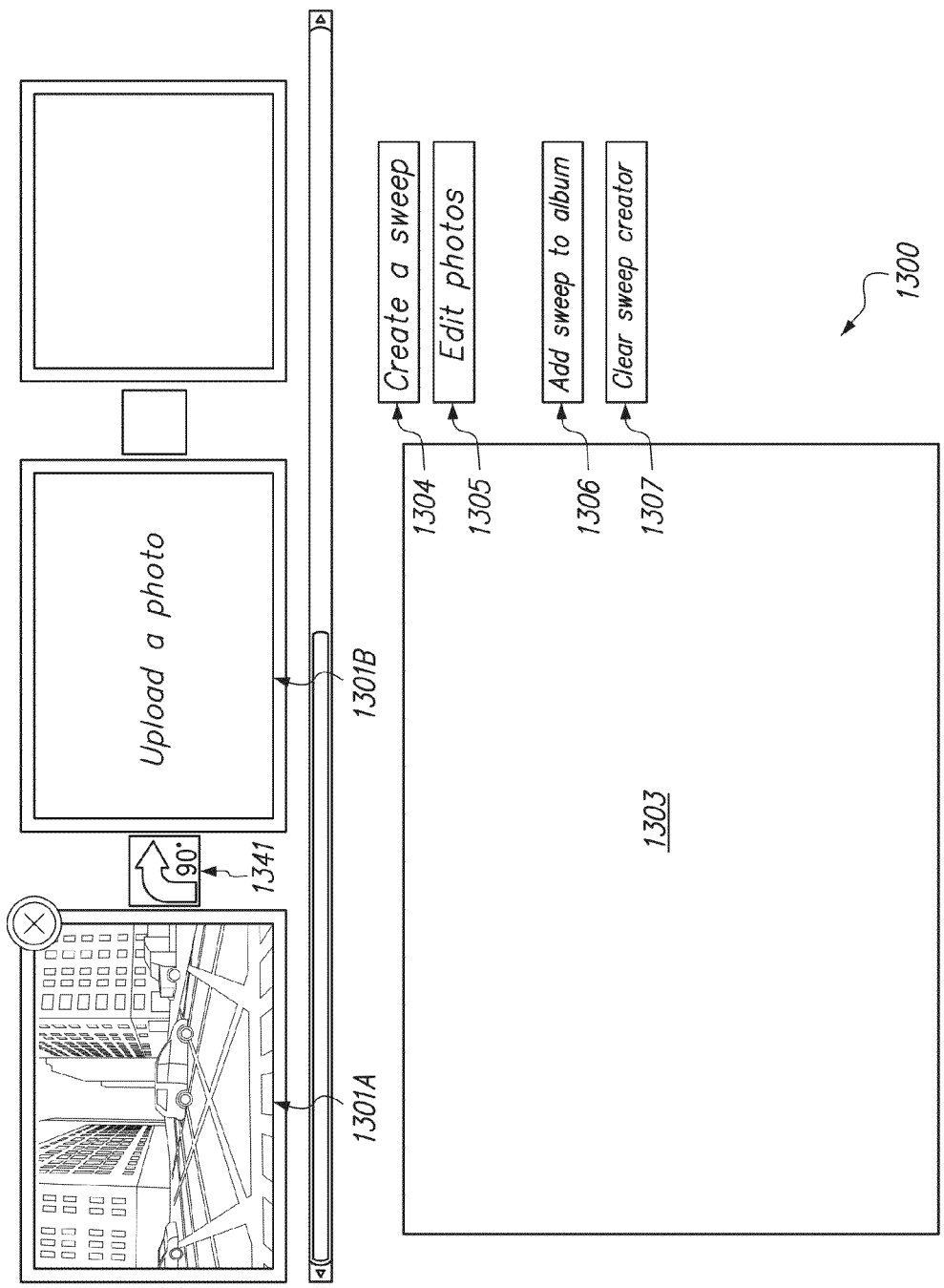
Figure 13F:
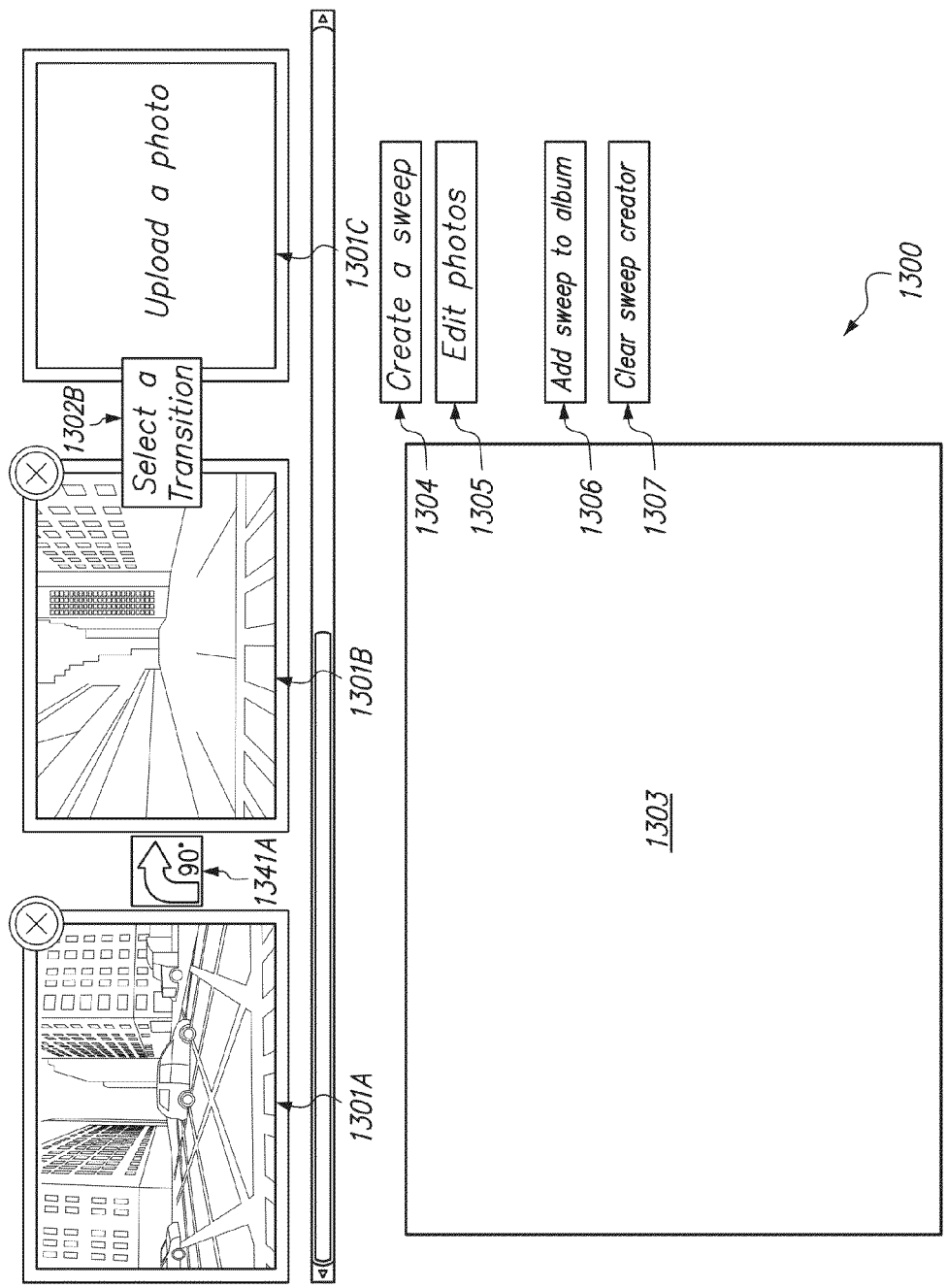
Figure 13G:
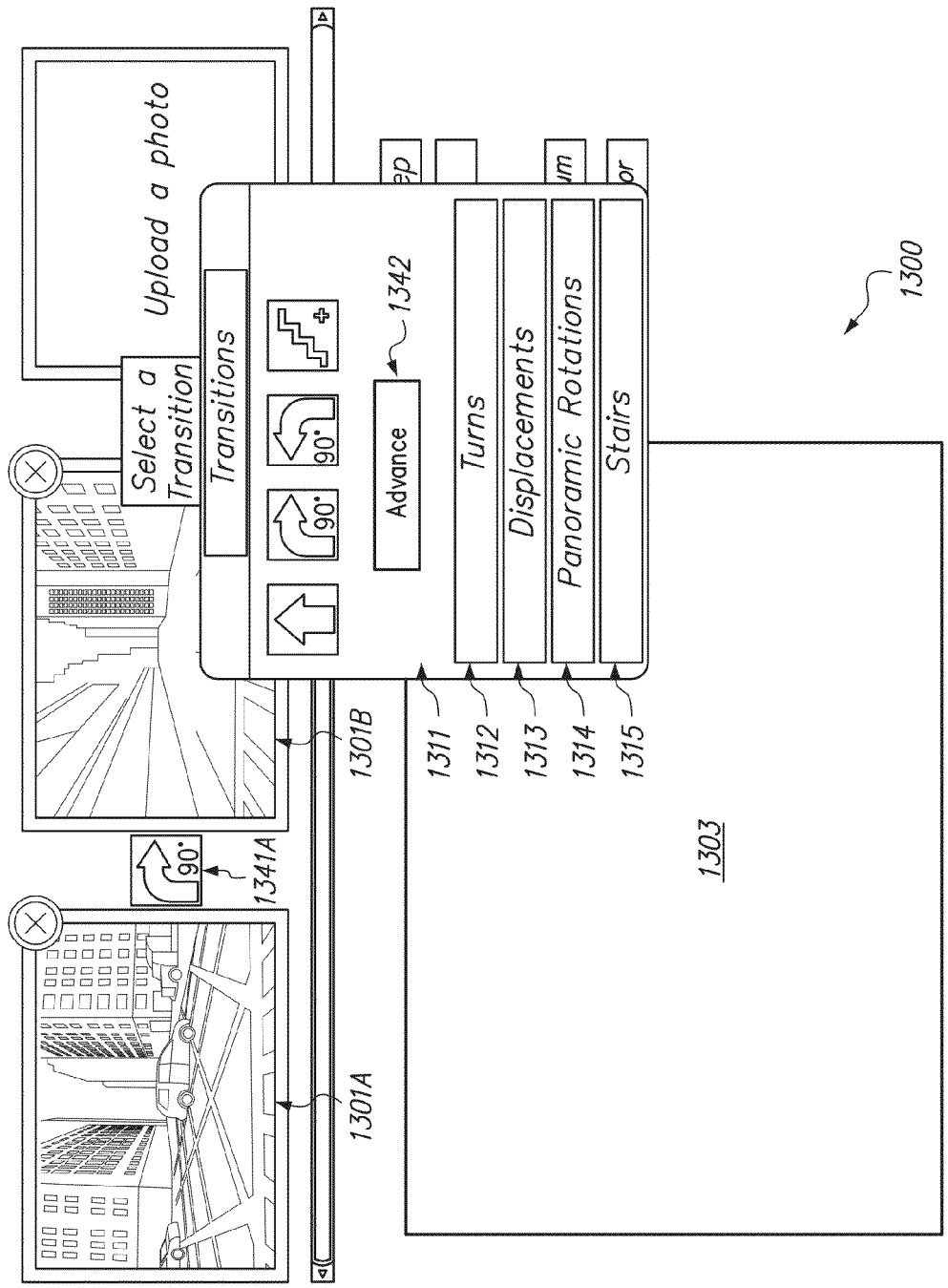
Figure 13H:
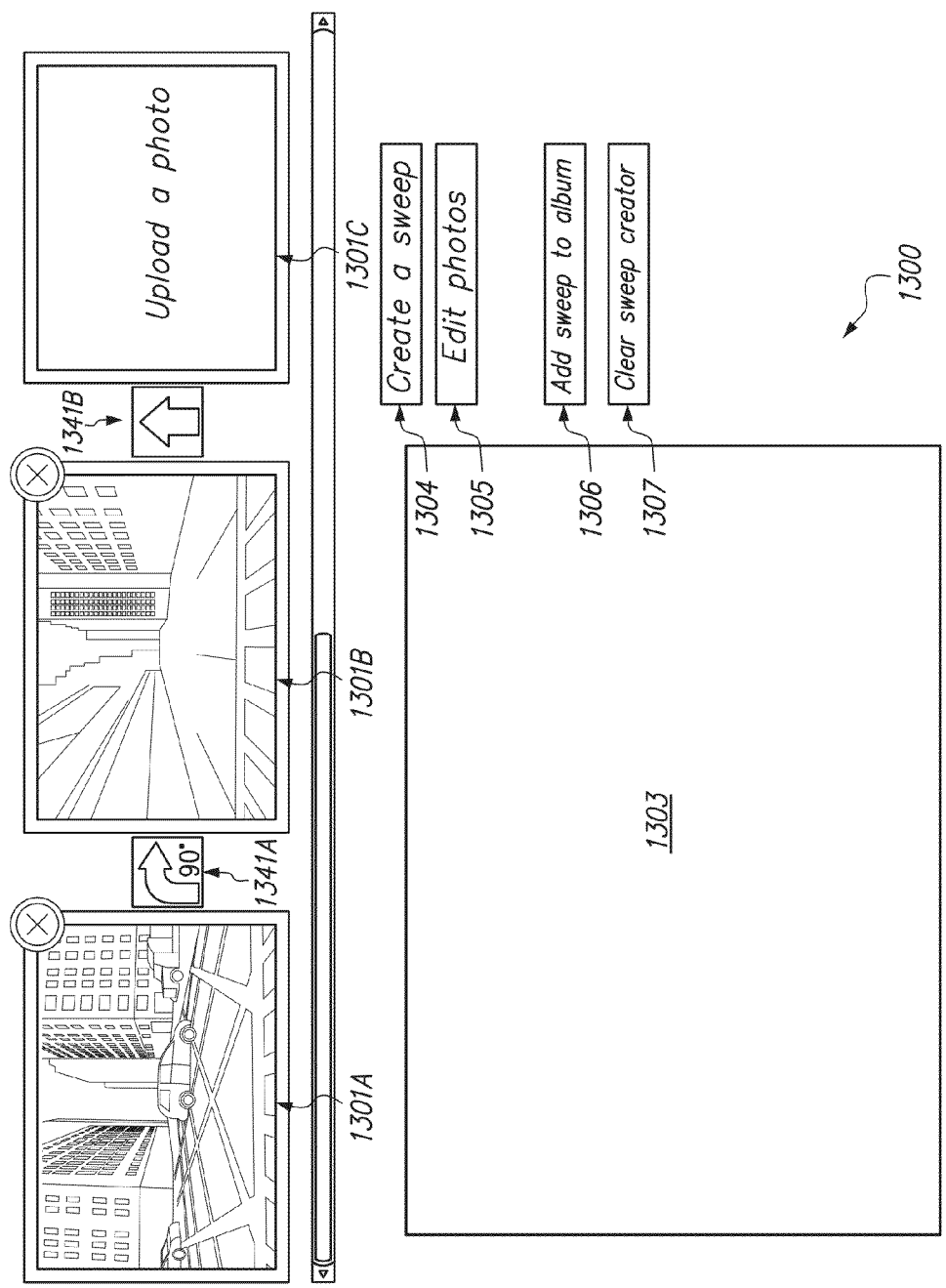
Figure 13I:
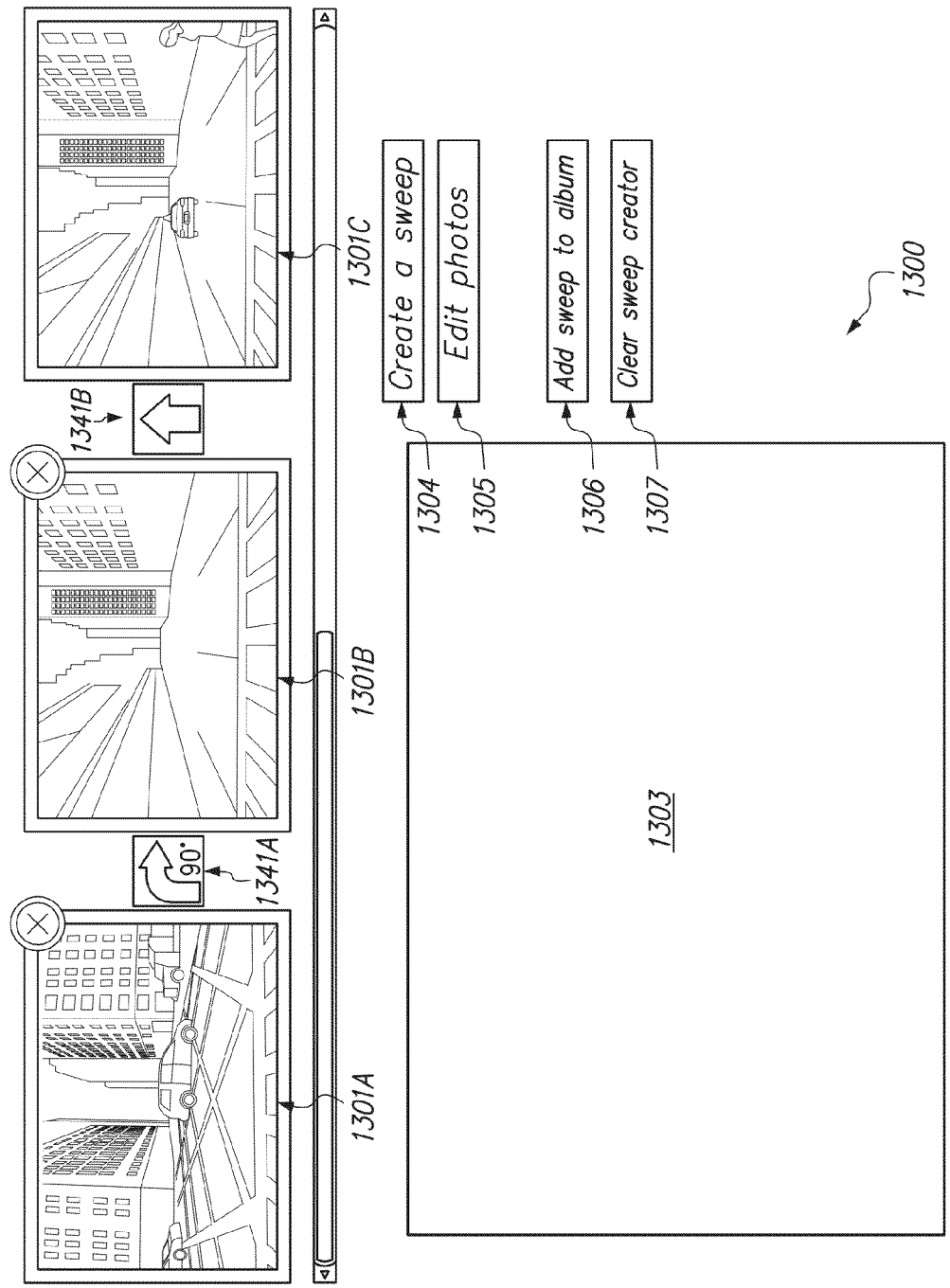
Figure 13M:
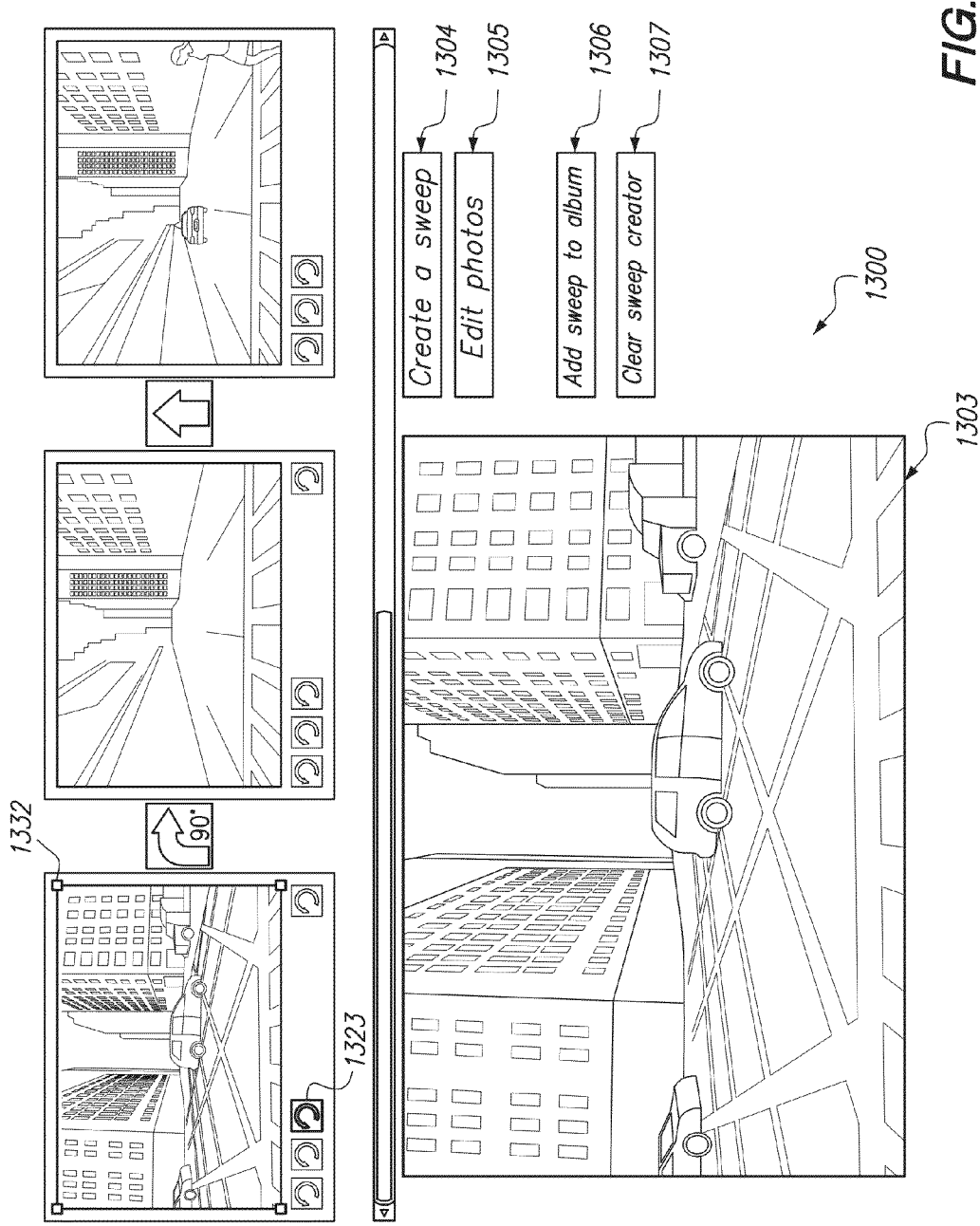
Figure 13N:
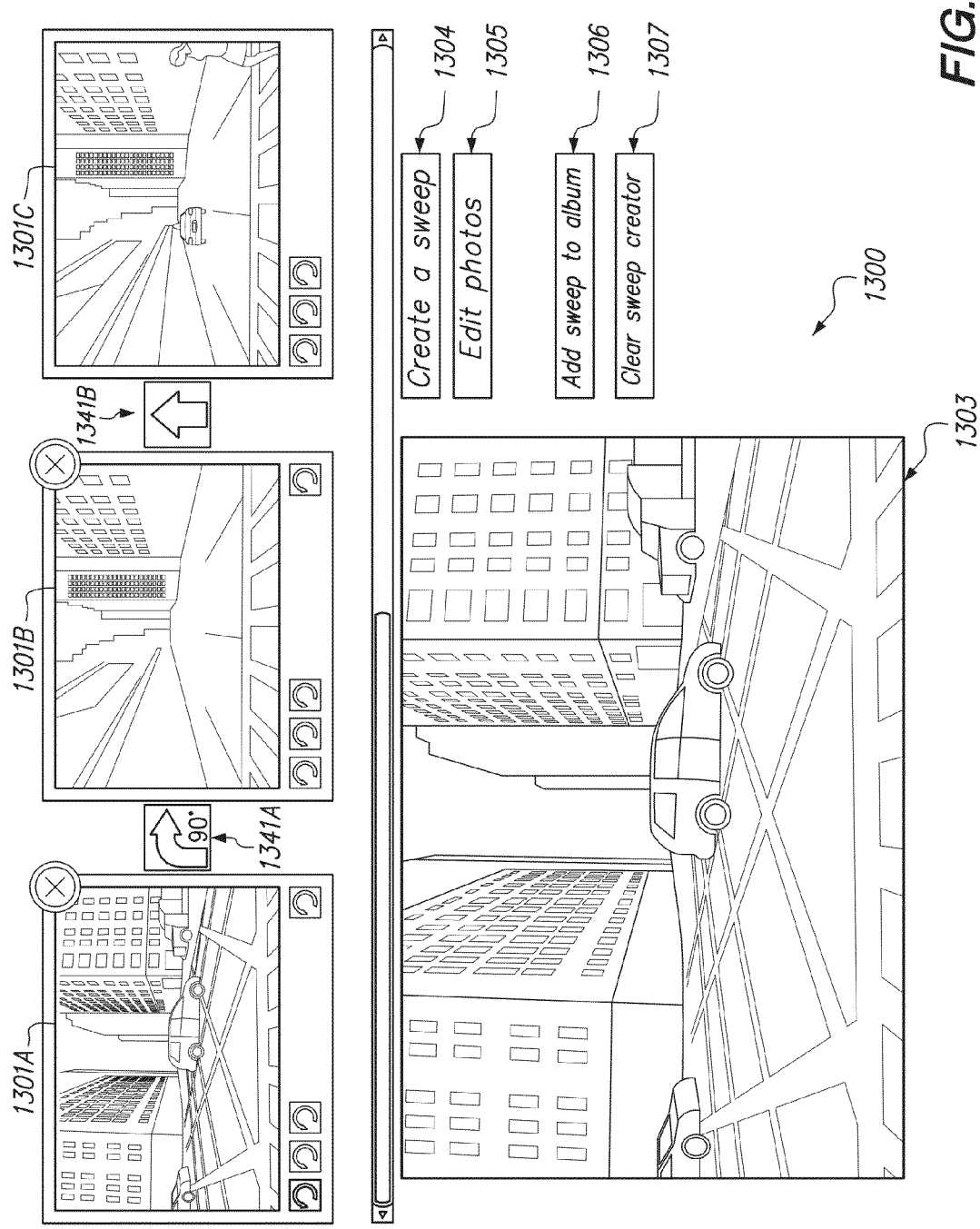

Referring now to FIGS. 13A through 13N, there is shown a series of screen shots for such a user interface according to one embodiment of the present invention.

FIG. 13A depicts an example of a screen shot 1300 in which the user is presented with input areas 1301A, 1301B that can be clicked to upload images from a hard drive or other source, and button 1302A to select a transition between images uploaded to input areas 1301A, 1301B. The user can click on input area 1301A or 1301B, navigate to the desired image(s) (for example on a local or remote hard drive), and select it/them for uploading. Any number of successive images and transitions can be uploaded and specified. Preview pane 1303 is also included for viewing the tour as it is being created. Button 1304 is provided for creating a 3D tour or portion thereof from the uploaded images and selected transition; the tour is referred to as a "sweep." In one embodiment, button 1304 is only active at least two images have been uploaded or selected in input areas 1301A, 1301B, and at least one transition has been selected via button 1302A. Button 1305 is provided for opening image editing tools, such as exposure control, cropping, and horizon positioning. Button 1306 is provided for adding a 3D tour or portion thereof to an album. Button 1307 clears the 3D tour creator, including uploaded images and transitions.

FIG. 13B depicts an example of a screen shot 1300 in which a first image has been uploaded to input area 1301A.

FIG. 13C depicts an example of a screen shot 1300 in which button 1302A has been clicked, and the user can select a transition via dialog box 1311. In one embodiment, several types of transitions are available, including turns 1312, displacements 1313, panoramic rotations 1314, stairs 1315, and the like. A list 1316 of most common transitions is also provided; in the example, these are depicted as a series of icons. One skilled in the art will recognize that any of the transitions can be depicted as text boxes, icons, and/or any combination thereof, and/or any other suitable visual elements. The user clicks on the button for the desired transition.

FIG. 13D depicts an example of a screen shot 1300 in which the 90-degree turn has been selected as the transition. Dialog box 1311 shows confirmation text 1342 to indicate the selection.

FIG. 13E depicts an example of a screen shot 1300 after the 90-degree turn has been selected and dialog box 1311 has been dismissed. Transition indicator 1341 replaces previously shown transition button 1302A. In one embodiment, the user can change the transition by clicking on transition indicator 1341 to invoke dialog box 1311.

Once two images have been uploaded and selected, button 1302B and input area 1301C becomes available for use, to select a transition and another image, respectively. FIG. 13F depicts an example of a screen shot 1300 after two images have been uploaded; the user can now select a transition between the second and third images by clicking on transition button 1302B, and can upload a third image by clicking on input area 1301C.

FIGS. 13G and 13H depict an example of a set of screen shots 1300 for selecting a transition to be applied between the second and third images. In this example, a straight-ahead transition is selected and applied.

FIG. 13I depicts an example of a screen shot 1300 after the user has selected a third image by clicking on input area 1301C. As described above in connection with input area 1301A, the user can navigate to the desired image (for example on a local or remote hard drive), and select it for uploading.

FIG. 13J depicts an example of a screen shot 1300 after the user has created the 3D tour or portion thereof by clicking on button 1304. Preview pane 1303 shows the 3D tour or portion thereof; the user can click on it to view it.

In one embodiment, image editing functionality is also provided. FIG. 13K depicts an example of a screen shot 1300 after the user has initiated the image editor, by clicking on button 1305. Controls for adjusting exposure level 1321, horizon 1322, and cropping 1323 are presented for each image, along with reset buttons 1324. One skilled in the art will recognize that any image editing controls can be provided: additional examples include sharpness adjustment, color correction, blurring, distortion, and the like.

In one embodiment, clicking on exposure level control 1321 instantiates a slider 1331 as shown in FIG. 13L. The user can adjust the specified parameter by moving slider 1331 to the desired position. In the example, the user is editing the brightness, or exposure level, of the image.

In one embodiment, clicking on crop control 1323 instantiates a crop rectangle 1332 as shown in FIG. 13M. The user can crop the image by moving corners of crop rectangle 1332 to the desired positions.

In one embodiment, clicking on horizon adjustment control 1322 causes a horizon line to be displayed. The user can move the horizon line to adjust the position of the horizon within the image.

In one embodiment, the user can exit the image editor by clicking on button 1305. FIG. 13N depicts an example of a screen shot 1300 after the controls have been dismissed. Here, the user has darkened the first image using exposure level control 1321 and has dismissed the control. The user can then create a new virtual tour or portion thereof by clicking on button 1304. Preview pane 1303 shows the virtual tour or portion thereof; the user can click on it to view it.

Presentation and Navigation through Virtual Tours

As discussed herein, the techniques of the present invention can be used to construct and present virtual tours, which can be generated on the fly in response to a user request, or can be stored at local storage and/or in a web server. In one embodiment, once a virtual tour has been created, it can be stored at a server or other suitable location. Users can access the virtual tour, for example, by clicking on a link on a web page. In one embodiment, a plug-in can be installed on a user's browser to enable him or her to experience the virtual tour, either interactively or as a passive observer.

In one embodiment, the user controls the tour and navigates through the 3D scene by providing input via a pointing device, touchscreen, keyboard, and/or any other appropriate input device. In another embodiment, an interface can be provided wherein navigation through the scene takes place automatically without requiring user interaction.

In one embodiment, virtual tours can be generated on the fly from 2D images. Thus, if a 2D image is updated, any virtual tour that incorporates that image will use the newly updated image. In another embodiment, the virtual tour can be generated and stored (locally or in a server) in advance of presentation to a user; the tour file, which can be stored in any appropriate format, can then be quickly retrieved and played on demand. Such an approach may improve performance and reduce latency in certain situations. In either technique, changes to a virtual tour can be easily made, since a 2D image can be replaced by a new image, and a new virtual tour can then be generated using the new image.

In one embodiment, as mentioned above, a user can click on a link to cause a tour to be loaded and played. In another embodiment, any number of links to a particular tour can be provided. Links may be provided to cause a tour to start at some intermediate point other than the beginning of the tour. A web page may thus provide a list of links, such as a table of contents, each of which references the same tour but causes the tour to begin at a different point (either the beginning or some intermediate point).

For example, a virtual tour of several rooms of a house may be provided; a table of contents lists several links to the tour, with each link corresponding to a different room. The user can begin the tour in any desired room by clicking on the appropriate link. In one embodiment, the tour may continue from the specified point to the end (unless stopped by the user). In another embodiment, a tour that is activated at an intermediate point may stop when the camera leaves the location corresponding to the intermediate point; for example, starting a tour in a particular room may cause the tour to end when the camera leaves the kitchen. In yet another embodiment, the user viewing the tour can specify whether the tour should continue after the camera leaves the location corresponding to the intermediate point.

Movement Mapping

In one embodiment, some or all of the 2D images can be selectively distorted or otherwise transformed, in order to reinforce the impression that the user is touring a three-dimensional space. Such distortion can take place dynamically in response to the user's position and movement within the 3D environment; for purposes of this description, such distortion is referred to as "movement mapping." For example, as a user moves forward in 3D space, the viewed 2D image becomes closer, an operation similar to zooming on the 2D image; movement mapping can be implemented to cause the areas near the edges of the image to zoom more rapidly than the area near the center of the image. This makes the center portion of the image appear to be farther away than the edges, and can serve to make the transition from one image to the next less jarring. In various embodiments, different mapping curves can be used for movement mapping, depending on the particular characteristics of the image sequence, environment being simulated, user preferences, and the like.

In one embodiment, movement mapping is performed by mapping the pixel positions of a source 2D image to new locations via a mapping curve. The mapping curve thus defines a transformation in pixel positions. For example, in a 2D image wherein coordinates can be expressed in terms of an X axis and a Y axis, a remapping curve can be provided for each axis. In one embodiment, the mapping curve is a function of the distance from the virtual camera, so that an illusion of 3D space can be enhanced. Thus, the input to the transformation is the x or y pixel coordinate along with a z value representing camera distance from the 2D image; the output is a transformed x or y pixel coordinate. The pixel value that would be drawn at the original coordinate location is then drawn at the transformed coordinate location.

In one embodiment, the system of the present invention performs movement mapping by applying mesh deformation to the 2D images. The parameters of the mesh deformation are determined based on the distance between the virtual camera and the 2D image in 3D space.

Figure 14:
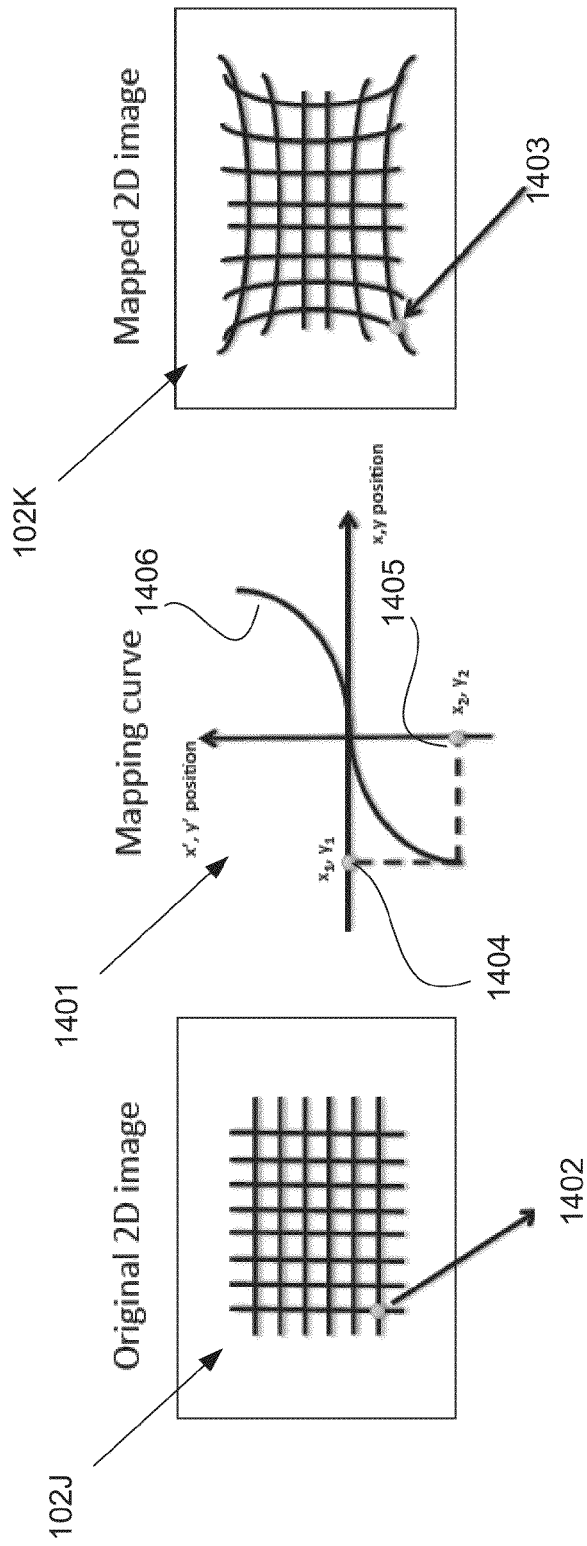
FIG. 14 depicts an example of movement mapping according to one embodiment of the present invention.
Figure 16C:
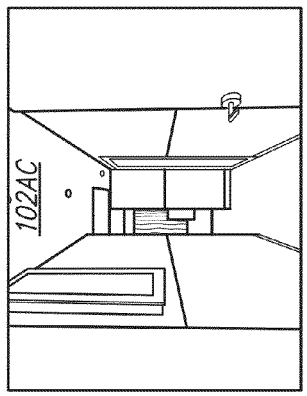
Figure 16F:
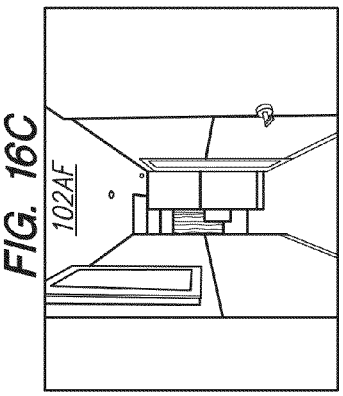
Figure 16I:
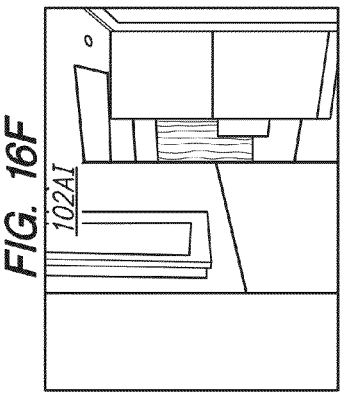
Figure 16B:
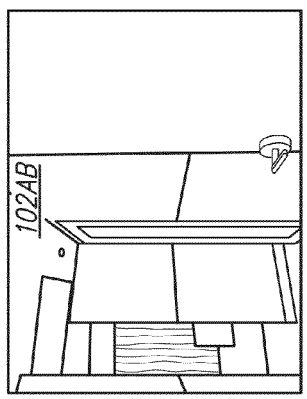
Figure 16E:
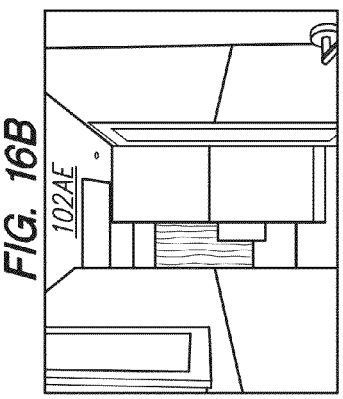
Figure 16H:
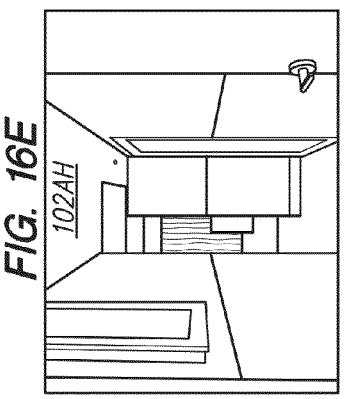
Figure 16A:
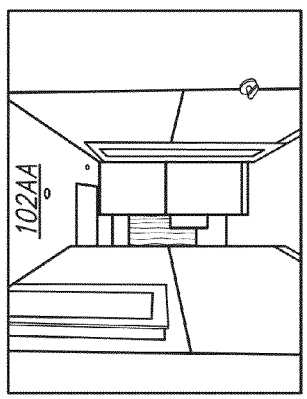
Figure 16D:
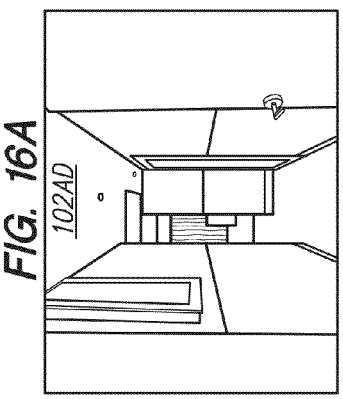
Figure 16G:
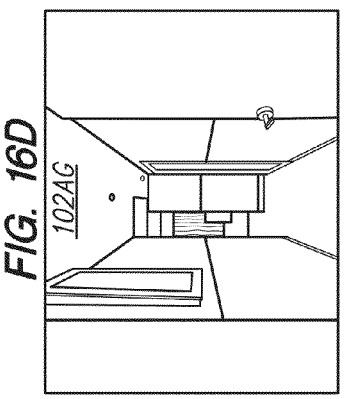
Figure 18C:
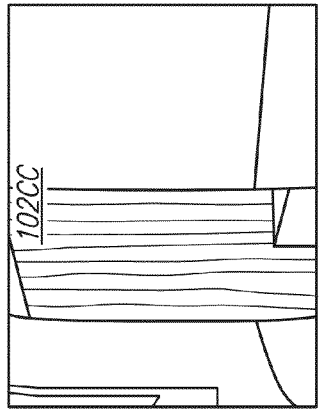
Figure 18F:
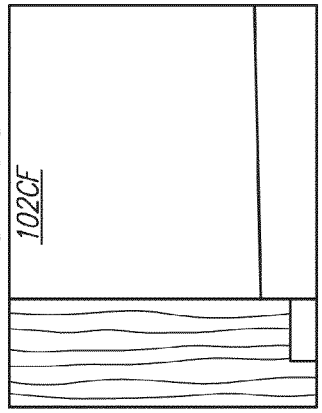
Figure 18I:
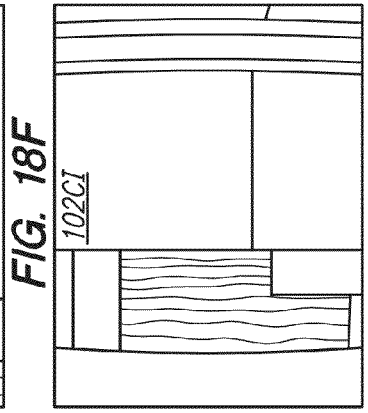
Figure 18B:
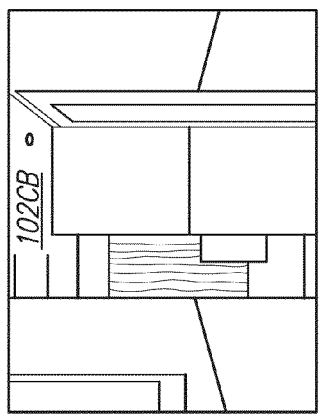
Figure 18E:
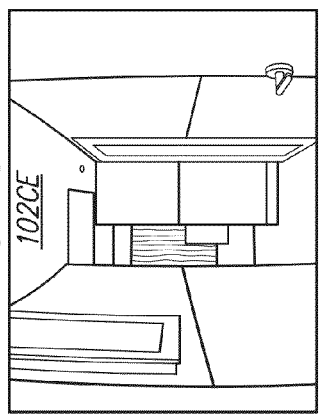
Figure 18H:
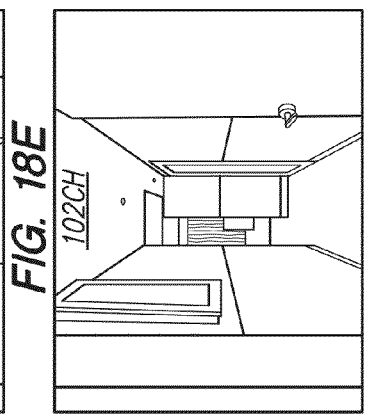
Figure 18A:
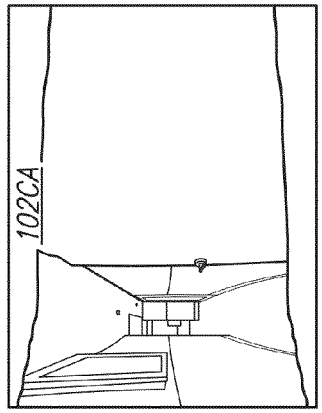
Figure 18D:
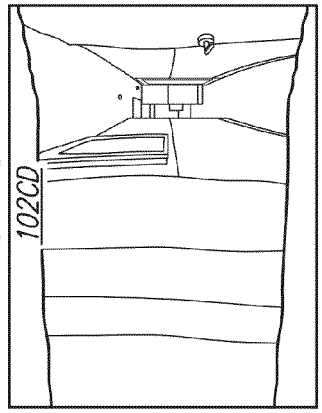
Figure 18G:
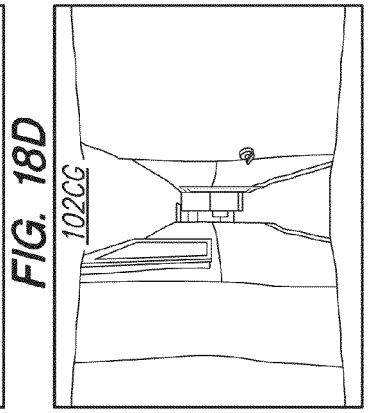
Figure 20B:
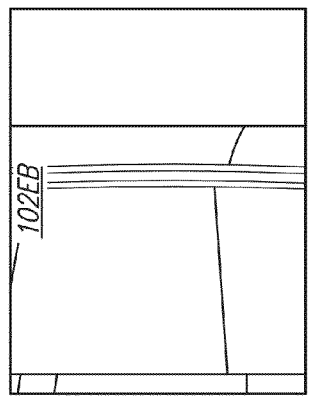
Figure 20D:
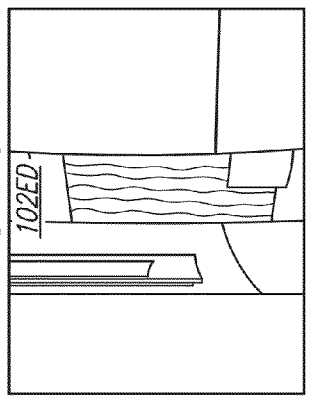
Figure 20F:
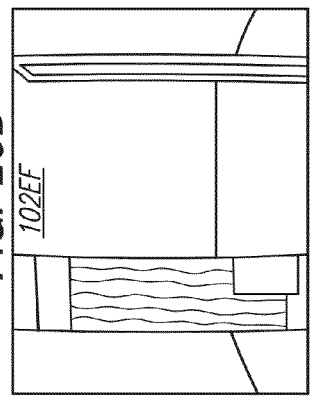
Figure 20A:
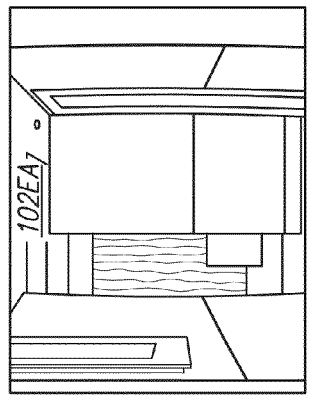
Figure 20C:
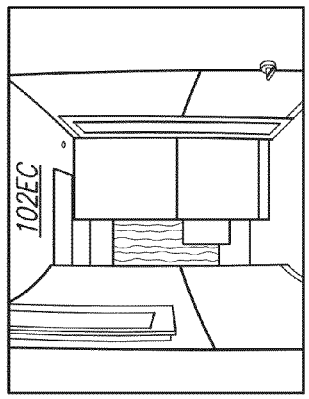
Figure 20E:
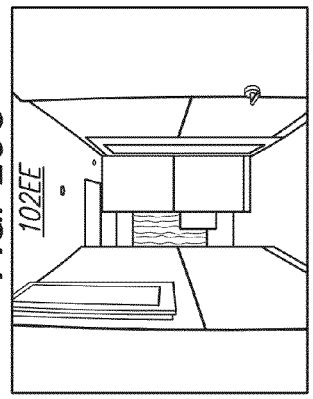

Referring now to FIG. 14, there is shown an example of movement mapping according to one embodiment of the present invention. Graph 1401 depicts mapping curve 1406, which defines a relationship between x,y positions in an original 2D image and x', y' positions in a mapped 2D image. For example, mapping curve 1406 specifies the relationship between pixel positions in original 2D image 102J and corresponding pixel positions in mapped 2D image 102K. For illustrative purposes, the original position of pixel 1402 of original 2D image 102J is shown at coordinates $(x_1, y_1)$. Based on mapping curve 1406, pixel 1402 is mapped to pixel 1403 of mapped 2D image 102K, located at position $(x_2, y_2)$.

In this manner, a distorted version of original 2D image 102J can be generated and displayed in the course of presenting the virtual tour. As discussed above, mapping curve 1406 can vary depending on the distance between the virtual camera and image 102J.

One skilled in the art will recognize that the particular mapping curve 1406 depicted in FIG. 14 is merely exemplary, and that other mapping curves can be used.

Referring now to FIG. 15A, there is shown an example of a graph 1401A including parameterized deformation curve 1406A for movement mapping according to one embodiment of the present invention. Here, the relationship between x and x' is defined by a spline, module and angle of linear portion 1501 and linear portion 1502. In one embodiment, the same relationship is defined between y and y'. In another embodiment, deformation is only applied to one axis (such as the x axis), and the other axis (such as the y axis) is not deformed.

Referring now to FIGS. 15B through 15G, there are shown additional examples of graphs 1401B through 1401G including deformation curves 1406B through 1406G for movement mapping according to one embodiment of the present invention. In one embodiment, these curves 1401B through 1401G are generated by applying different parameters to the parameterized deformation curve 1406A depicted in FIG. 15A. Module and angle values corresponding to curves 1401B through 1401G are shown in the respective Figures, for illustrative purposes.

By selectively deforming images using deformation curves as described herein, an impression of movement through a 3D virtual space can be reinforced. Successive deformations of a single image 102 can be used to simulate movement and/or rotation in virtual space. Such a mechanism also improves transitions from one image 102 to the next.

Referring now to FIGS. 16A through 16I, 17A through 17I, 18A through 18I, 19A through 19I, and 20A through 20F, there are shown various examples of images that have been deformed using deformation curves having different parameters. All of the images 102 depicted in these figures have the same source image. Five different deformation curves, corresponding to those depicted in FIGS. 15B through 15G, have been applied, and the camera is shown at six different positions for each deformation curve. In addition, in some images 102 the camera has been rotated. For illustrative purposes, the deformation curves are applied in a manner that is symmetrical with respect to the center of image 102, and is applied only to the x axis. Thus, in these examples, the y axis is not deformed. In the examples, the applied deformation curves are constant with respect to the camera distance to the photo, and are generated using a spline.

Table 1 sets forth the parameters used for each image 102 in FIGS. 16A through 16I, 17A through 17I, 18A through 18I, 19A through 19I, and 20A through 20F. Camera position is indicated from 0 to 4, with 0 being the origin point and higher numbers indicating a camera position that is closer to image 102. Deformation curves 0, 1, 2, 3, 4, and 5 correspond to the curves shown in FIGS. 15B, 15C, 15D, 15E, 15F, and 15G, respectively. Rotation indicates whether the camera is pointed directly at image 102 ("NONE"), angled at 45 degrees to the left ("LEFT"), or angled at 45 degrees to the right ("RIGHT"). One skilled in the art will recognize that these are merely examples; other angles, curves, and camera positions can be used.

TABLE 1

| FIG. | Image | Deformation Curve | Camera position | Rotation |
|---|---|---|---|---|
| 16A | 102AA | 0 | 0 | NONE |
| 16B | 102AB | 0 | 4 | LEFT |
| 16C | 102AC | 1 | 1 | NONE |
| 16D | 102AD | 1 | 0 | NONE |
| 16E | 102AE | 0 | 4 | NONE |
| 16F | 102AF | 1 | 0 | NONE |
| 16G | 102AG | 0 | 0 | NONE |
| 16H | 102AH | 0 | 3 | NONE |
| 16I | 102AI | 0 | 4 | RIGHT |
| 17A | 102BA | 1 | 4 | NONE |
| 17B | 102BB | 2 | 0 | NONE |
| 17C | 102BC | 2 | 3 | NONE |
| 17D | 102BD | 1 | 3 | NONE |
| 17E | 102BE | 1 | 4 | RIGHT |
| 17F | 102BF | 2 | 2 | NONE |
| 17G | 102BG | 1 | 2 | NONE |
| 17H | 102BH | 1 | 4 | LEFT |
| 17I | 102BI | 2 | 1 | NONE |
| 18A | 102CA | 2 | 4 | RIGHT |
| 18B | 102CB | 3 | 2 | NONE |
| 18C | 102CC | 3 | 4 | LEFT |
| 18D | 102CD | 2 | 4 | LEFT |
| 18E | 102CE | 3 | 1 | NONE |
| 18F | 102CF | 3 | 4 | NONE |
| 18G | 102CG | 2 | 4 | NONE |
| 18H | 102CH | 3 | 0 | NONE |
| 18I | 102CI | 3 | 3 | NONE |
| 19A | 102DA | 4 | 1 | NONE |
| 19B | 102DB | 4 | 4 | NONE |
| 19C | 102DC | 5 | 0 | NONE |
| 19D | 102DD | 4 | 0 | NONE |
| 19E | 102DE | 4 | 3 | NONE |
| 19F | 102DF | 4 | 4 | RIGHT |
| 19G | 102DG | 3 | 4 | RIGHT |
| 19H | 102DH | 4 | 2 | NONE |
| 19I | 102DI | 4 | 4 | LEFT |
| 20A | 102EA | 5 | 3 | NONE |
| 20B | 102EB | 5 | 4 | RIGHT |
| 20C | 102EC | 5 | 2 | NONE |
| 20D | 102ED | 5 | 4 | LEFT |
| 20E | 102EE | 5 | 1 | NONE |
| 20F | 102EF | 5 | 4 | NONE |

Virtual Tour to Represent Changes in State

In some embodiments, successive frames of the virtual tour may represent different states of a machine or environment. Thus, in some cases, the virtual camera may not necessarily change position from one frame to the next; rather it remains stationary and illustrates successive steps in operating a machine, or some other change to the user's environment. For example, successive steps in operating a kiosk can be represented by successive frames of the virtual tour. As another example, a virtual tour may represent a change to a location or environment with time; for example a virtual tour may depict a time-lapse representation of crowds in a museum, using a relatively stationary virtual camera. In another embodiment, such state changes can be depicted in combination with camera movement.

On-the-Fly Creation of Virtual Tour

In one embodiment, successive images can be added incrementally, and a new virtual tour generated each time a new image is added. Such an application can be particularly effective in an environment wherein computing device 701 of the present invention is a mobile device such as a smartphone; an example is an iPhone, available from Apple Inc. of Cupertino, Calif., although one skilled in the art will recognize that such on-the-fly creation of a virtual tour can be implemented on any suitable platform, computing machine, or other electronic device.

Referring now to FIG. 21, there is shown a flowchart depicting a method for on-the-fly generation of a 3D interactive virtual tour from successively captured images, according to one embodiment of the present invention. One skilled in the art will recognize that the method depicted in FIG. 21 can be implemented using a mobile device such as a smartphone equipped with a built-in camera and accelerometer, although the depicted method can also be practiced using any suitable electronic device. Referring now also to FIGS. 22A through 22E, there is shown a series of screen shots for on-the-fly creation of a 3D interactive virtual tour on a smartphone, according to one embodiment of the present invention As shown in screenshot 2201 of FIG. 22A, camera viewfinder 2206 is presented 2101 to the user. The user aims the device in the desired direction, and taps 2102 button 2207 to capture an image. Screenshot 2201 also includes preferences buttons 2208, which provides access to various options that can be set for capturing the image.

Figure 22A:
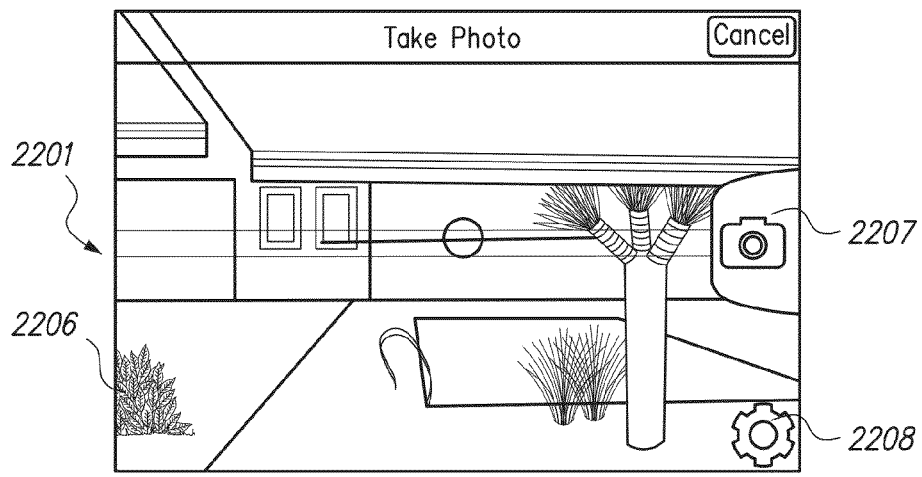
Figure 22B:
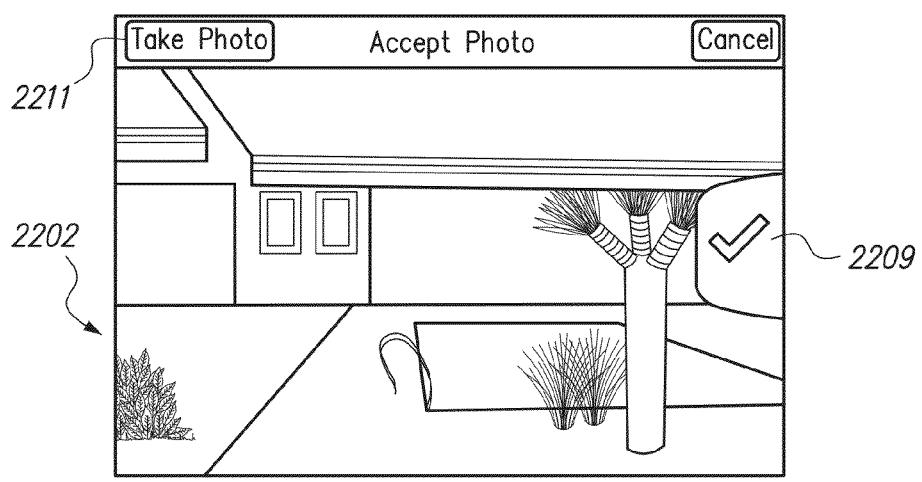

As shown in screenshot 2202 of FIG. 22B, the image is captured 2103 using the device's optics and sensor(s). The user is prompted to accept by tapping on button 2209 or reject the image and retake the image by tapping on button 2211. If, in step 2104, the user rejects the image, the method returns to step 2101.

If, in step 2104, the user accepts the image, a determination is made 2109 as to whether the image is the first captured image for the virtual tour. If so, a new virtual tour is established 2110 containing the captured image. Otherwise, the image is added 2105 to the existing virtual tour, using the transition selected in step 2107 (as described below).

Figure 22C:
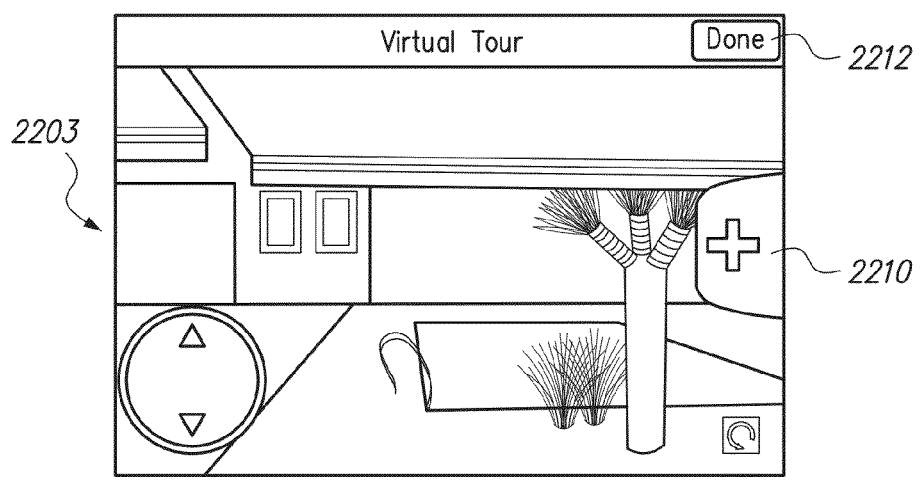
Figure 22D:
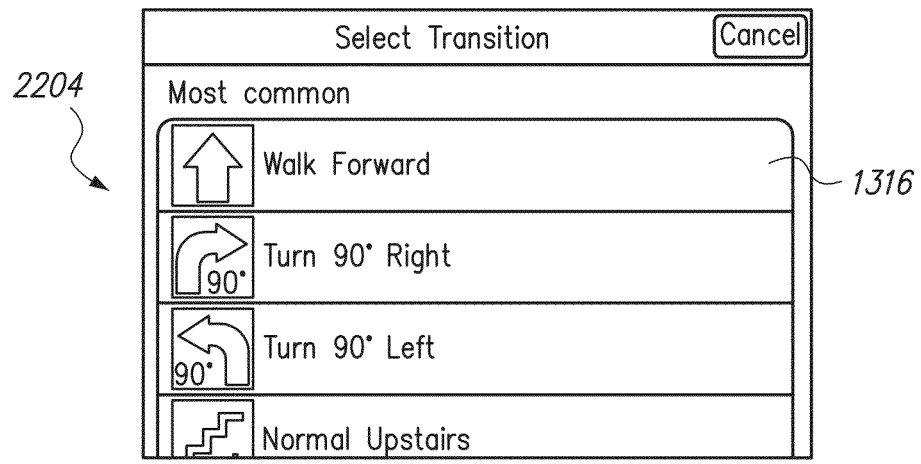
Figure 22E:
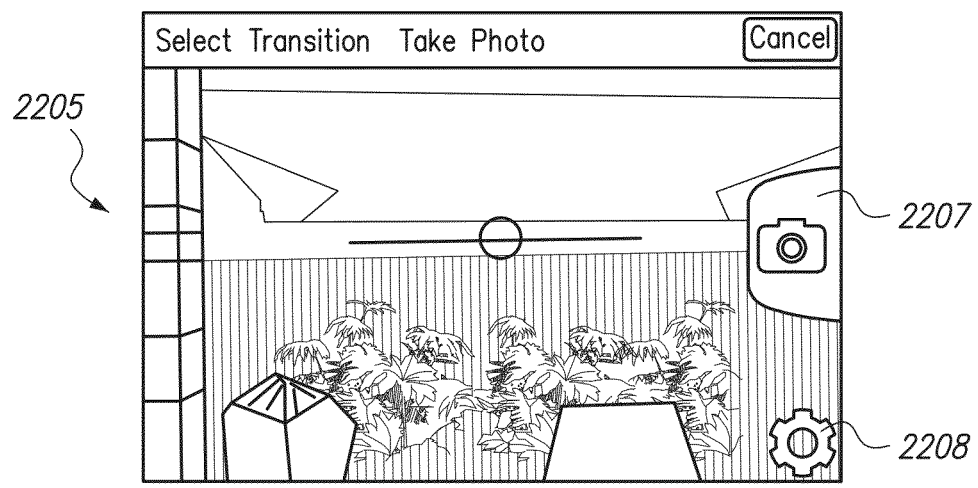

As shown in screenshot 2210 of FIG. 22C, the user is given an opportunity to add another image to the virtual tour by tapping on button 2210. If the user indicates 2106 that another image should be added to the virtual tour, a transition is selected 2107. As shown in screenshot 2204 of FIG. 22D, the transition can be selected 2107 from a list 1316 based on explicit input provided by the user. Alternatively, the device can detect, via its accelerometer, how the user moved the device between capturing the previous image and the current one. In one embodiment, the automatically detected transition is automatically selected; alternatively, it can be presented as a default which the user can override, if desired. Once a transition has been selected 2107, the method returns to step 2101 for capture of another image, as shown in screenshot 2205 of FIG. 22E.

If, in step 2106, the user indicates that no other images are to be added, for example by tapping on Done button 2212 of FIG. 22C, the virtual tour file is stored 2108 and/or output, as appropriate, and the method ends 2199.

This on-the-fly mechanism for generating a virtual tour allows a tour to be incrementally generated using successively captured images, which can make it easier for a user to generate a tour in certain situations.

Examples of Applications

One skilled in the art will recognize that the techniques of the present invention can be used in any context or environment where it is useful to provide a 3D virtual tour from one or more 2D images. The following is a list of examples that is intended to illustrate some possible applications of the present invention; however, the list is not intended to limit the invention in any way to these particular examples.

- Stores (e.g., to find particular items within a large store);
- Homes for sale (e.g., exterior and interior tour of rooms and other areas);
- Apartments for rent (e.g., exterior and interior tour of rooms and other areas);
- Hotel rooms (e.g., tours of rooms and/or public areas);
- Cruise ships (e.g., tours of staterooms and/or public areas);
- Virtual training for particular equipment and/or particular scenarios (e.g., to show a power plant operator what to do in the event of an emergency);
- Concert and other event venues;
- Tutorial on how to use a kiosk or public terminal (e.g. to show a tourist how to buy a ticket from a ticket machine at a train station);
- Museums;
- Universities and Business schools campuses;
- And the like.

The present invention has been described in particular detail with respect to possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention and/or its features may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

In various embodiments, the present invention can be implemented as a system or a method for performing the above-described techniques, either singly or in any combination. In another embodiment, the present invention can be implemented as a computer program product comprising a nontransitory computer-readable storage medium and computer program code, encoded on the medium, for causing a processor in a computing device or other electronic device to perform the above-described techniques.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware and/or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

Accordingly, in various embodiments, the present invention can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the invention include: a mobile phone, personal digital assistant, smartphone, kiosk, server computer, enterprise computing device, desktop computer, laptop computer, tablet computer, consumer electronic device, television, set-top box, or the like. An electronic device for implementing the present invention may use any operating system such as, for example: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

In various embodiments, the present invention can be implemented in a distributed processing environment, networked computing environment, or web-based computing environment. Elements of the invention can be implemented on client computing devices, servers, routers, and/or other network or non-network components. In some embodiments, the present invention is implemented using a client/server architecture, wherein some components are implemented on one or more client computing devices and other components are implemented on one or more servers. In one embodiment, in the course of implementing the techniques of the present invention, client(s) request content from server(s), and server(s) return content in response to the requests. A browser may be installed at the client computing device for enabling such requests and responses, and for providing a user interface by which the user can initiate and control such interactions and view the presented content.

Any or all of the network components for implementing the present invention may, in some embodiments, be communicatively coupled with one another using any suitable electronic network, whether wired or wireless or any combination thereof, and using any suitable protocols for enabling such communication. One example of such a network is the Internet, although the invention can be implemented using other networks as well.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A computer-implemented method for generating a virtual tour from at least one two-dimensional image, comprising:
    at a processor, establishing a position and orientation for the at least one two-dimensional image in virtual three-dimensional space;
    at the processor, establishing an initial position, orientation, and zoom level for a virtual camera in the virtual three-dimensional space;
    at the processor, defining a range of permissible movement of the virtual camera in the virtual three-dimensional space by defining a virtual cage comprising constraints for at least one of the position and orientation of the virtual camera, wherein the initial position of the virtual camera is within the defined virtual cage;
    at the processor, defining a location of an exit portal of the virtual cage;
    at the processor, defining a pipe for automated movement of the virtual camera from the exit portal, the pipe having a beginning and an end;
    at a frame buffer, generating an initial camera view of the at least one two-dimensional image, based on the position and orientation of the at least one two-dimensional image and further based on the initial position, orientation, and zoom level for the virtual camera;
    outputting the initial camera view at an output device;
    at the processor, changing at least one of the position, orientation, and zoom level of the virtual camera in the virtual three-dimensional space while ensuring that the virtual camera remains within the defined virtual cage;
    at the frame buffer, generating a changed camera view of the at least one two-dimensional image, based on the position and orientation of the at least one two-dimensional image and further based on the changed at least one position, orientation, and zoom level for the virtual camera;

outputting the changed camera view at the output device;

at the processor, determining whether the position of the virtual camera corresponds to the defined location of the exit portal; and responsive to the position of the virtual camera corresponding to the defined location of the exit portal:

at the processor, automatically causing the virtual camera to move from the beginning to the end of the pipe;

at the frame buffer, generating at least one additional camera view, based on the position and orientation of the at least one two-dimensional image and further based on at least one position, orientation, and zoom level for the virtual camera as it moves through the pipe; and outputting the at least one additional camera view at the output device.

2. The computer-implemented method of claim 1, wherein establishing an initial position, orientation, and zoom level for a virtual camera comprises establishing an initial position at a distance from at least one two-dimensional image, wherein the distance is equal to a focal length of the virtual camera.

3. The computer-implemented method of claim 1, wherein each two-dimensional image comprises a view of a physical location.

4. The computer-implemented method of claim 1, further comprising:

at an input device, receiving user input to control at least one of the position, orientation, and zoom level of the virtual camera;

wherein changing at least one of the position, orientation, and zoom level of the virtual camera is performed responsive to the received user input.

5. The computer-implemented method of claim 1, wherein defining the virtual cage comprises:

defining at least two side walls of the virtual cage by joining a virtual camera location with two edges of at least one two-dimensional image;

defining a location of an exit portal of the virtual cage, the exit portal having at least two edges; and defining at least two additional walls of the virtual cage by joining the two side walls with two edges of the exit portal.

6. The computer-implemented method of claim 1, wherein:

generating at least one additional camera view comprises generating a series of additional camera views as the virtual camera moves through the pipe; and outputting the at least one additional camera view at the output device comprises outputting successive ones of the additional camera views.

7. The computer-implemented method of claim 1, wherein:

establishing a position and orientation for the at least one two-dimensional image in virtual three-dimensional space comprises establishing positions and orientations for at least a first two-dimensional image and a second two-dimensional image;

the initial camera view comprises at least a portion of the first two-dimensional image; and the changed camera view comprises at least a portion of the second two-dimensional image.

8. The computer-implemented method of claim 7, further comprising automatically outputting, at the output device, a transition between the initial camera view and the changed camera view in the absence of input by the user.

9. The computer-implemented method of claim 7, wherein at least one of the initial camera view and the changed camera view comprises a combination of at least a portion of the first and at least a portion of the second two-dimensional image.

10. The computer-implemented method of claim 1, further comprising:

at a storage device, storing a series of frames representing camera views.

11. The computer-implemented method of claim 10, wherein storing a series of frames representing camera views comprises storing a video file.

12. The computer-implemented method of claim 11, further comprising transmitting the stored video file across an electronic network.

13. The computer-implemented method of claim 1, wherein generating an initial camera view of the at least one two-dimensional image comprises applying a transformation to the at least one two-dimensional image.

14. The computer-implemented method of claim 13, wherein applying a transformation comprises applying a transformation based on at least one of the position, orientation, and zoom level of the virtual camera with respect to the at least one two-dimensional image.

15. The computer-implemented method of claim 14, wherein applying a transformation comprises applying a mesh deformation.

16. The computer-implemented method of claim 1, wherein at least one of the steps is performed at a client device and at least one of the steps is performed at a server located remotely with respect to the client device.

17. A computer-implemented method for generating a virtual tour from at least two two-dimensional images, comprising:

at a processor, establishing a position and orientation for each of the at least two two-dimensional images in virtual three-dimensional space;

at the processor, establishing an initial position, orientation, and zoom level for a virtual camera in the virtual three-dimensional space;

at the processor, defining a range of permissible movement of the virtual camera in the virtual three-dimensional space by:

defining a first virtual cage comprising constraints for at least one of the position and orientation of the virtual camera with respect to a first two-dimensional image, wherein the initial position of the virtual camera is within the defined first virtual cage;

defining a location of a first exit portal of the first virtual cage;

defining a second virtual cage comprising constraints for at least one of the position and orientation of the virtual camera with respect to a second two-dimensional image; and defining a location of an entrance portal of the second virtual cage;

at the processor, defining a pipe for automated movement of the virtual camera from the first exit portal of the first virtual cage to the entrance portal of the second virtual cage, the pipe having a beginning corresponding to the first exit portal of the first virtual cage and an end corresponding to the entrance portal of the second virtual cage;

at a frame buffer, generating an initial camera view of at least one of the two-dimensional images, based on the position and orientation of at least one of the two-dimensional images and further based on the initial position, orientation, and zoom level for the virtual camera;

outputting the initial camera view at an output device;
at the processor, changing at least one of the position, orientation, and zoom level of the virtual camera in the virtual three-dimensional space by moving the virtual camera within the defined first virtual cage and subsequently moving the virtual camera within the defined second virtual cage;
at the frame buffer, generating a changed camera view of at least one of the two-dimensional images, based on the position and orientation of at least one of the two-dimensional images and further based on the changed at least one position, orientation, and zoom level for the virtual camera;
outputting the changed camera view at the output device;
at the processor, determining whether the position of the virtual camera corresponds to the defined location of the first exit portal of the first virtual cage; and
responsive to the position of the virtual camera corresponding to the defined location of the first exit portal of the first virtual cage:
  at the processor, automatically causing the virtual camera to move from the beginning to the end of the pipe;
  at the frame buffer, generating at least one additional camera view, based on at least one position, orientation, and zoom level for the virtual camera as it moves through the pipe;
  outputting the at least one additional camera view at the output device; and
  establishing a position for the virtual camera at the defined location of the entrance portal of the second virtual cage.

18. The computer-implemented method of claim 17, wherein:
  generating at least one additional camera view comprises generating a series of additional camera views as the virtual camera moves through the pipe; and
  outputting the at least one additional camera view at the output device comprises outputting successive ones of the additional camera views.

19. The computer-implemented method of claim 17, further comprising:
  at the processor, defining a location of a second exit portal of the first virtual cage;
  at the processor, defining a third virtual cage comprising constraints for at least one of the position and orientation of the virtual camera with respect to a third two-dimensional image;
  at the processor, defining a location of an entrance portal of the third virtual cage;
  at the processor, defining a first pipe for automated movement of the virtual camera from the first exit portal of the first virtual cage to the entrance portal of the second virtual cage, the first pipe having a beginning corresponding to the first exit portal of the first virtual cage and an end corresponding to the entrance portal of the second virtual cage;
  at the processor, defining a second pipe for automated movement of the virtual camera from the second exit portal of the first virtual cage to the entrance portal of the third virtual cage, the second pipe having a beginning corresponding to the second exit portal of the first virtual cage and an end corresponding to the entrance portal of the third virtual cage;
  at the processor, determining whether the position of the virtual camera corresponds to one the defined locations of an exit portal of the first virtual cage; and
  responsive to the position of the virtual camera corresponding to the defined location of the first exit portal of the first virtual cage:
    at the processor, automatically causing the virtual camera to move from the beginning to the end of the first pipe;
    at the frame buffer, generating at least one additional camera view, based on the position and orientation of the at least one two-dimensional image and further based on at least one position, orientation, and zoom level for the virtual camera as it moves through the first pipe;
    outputting the at least one additional camera view at the output device; and
    establishing a position for the virtual camera at the defined location of the entrance portal of the second virtual cage; and
  responsive to the position of the virtual camera corresponding to the defined location of the second exit portal of the first virtual cage:
    at the processor, automatically causing the virtual camera to move from the beginning to the end of the second pipe;
    at the frame buffer, generating at least one additional camera view, based on the position and orientation of the at least one two-dimensional image and further based on at least one position, orientation, and zoom level for the virtual camera as it moves through the second pipe;
    outputting the at least one additional camera view at the output device; and
    establishing a position for the virtual camera at the defined location of the entrance portal of the third virtual cage.

20. The computer-implemented method of claim 19, wherein:
  generating at least one additional camera view comprises generating a series of additional camera views as the virtual camera moves through the pipe; and
  outputting the at least one additional camera view at the output device comprises outputting successive ones of the additional camera views.

21. The computer-implemented method of claim 1, wherein changing at least one of the position, orientation, and zoom level of the virtual camera is performed automatically.

22. The computer-implemented method of claim 21, further comprising:
  defining a location of an entrance portal of the virtual cage;
  and wherein changing at least one of the position, orientation, and zoom level of the virtual camera comprises automatically moving the virtual camera from the entrance portal to the exit portal;
  the method further comprising:
  at the frame buffer, generating at least one additional camera view, based on the position and orientation of the at least one two-dimensional image and further based on at least one position, orientation, and zoom level for the virtual camera as it moves from the entrance portal to the exit portal; and
  outputting the at least one additional camera view at the output device.

23. The computer-implemented method of claim 22, wherein:
  generating at least one additional camera view comprises generating a series of additional camera views as the virtual camera moves from the entrance portal to the exit portal; and outputting the at least one additional camera view at the output device comprises outputting successive ones of the additional camera views.

24. The computer-implemented method of claim 1, further comprising:

at a server, receiving a request from a client machine for a web page comprising a virtual tour; and responsive to the received request, transmitting a web page comprising a virtual tour to the client machine, the virtual tour comprising at least the initial camera view and the changed camera view.

25. A system for generating a virtual tour from at least one two-dimensional image, comprising:

a processor configured to:
establish a position and orientation for the at least one two-dimensional image in virtual three-dimensional space;
establish an initial position, orientation, and zoom level for a virtual camera in the virtual three-dimensional space;
define a range of permissible movement of the virtual camera in the virtual three-dimensional space by defining a virtual cage comprising constraints for at least one of the position and orientation of the virtual camera, wherein the initial position of the virtual camera is within the defined virtual cage;
define a location of an exit portal of the virtual cage;
define a pipe for automated movement of the virtual camera from the exit portal, the pipe having a beginning and an end; and
change at least one of the position, orientation, and zoom level of the virtual camera in the virtual three-dimensional space while ensuring that the virtual camera remains within the defined virtual cage;

a frame buffer, communicatively coupled to the processor, configured to:
generate an initial camera view of the at least one two-dimensional image, based on the position and orientation of the at least one two-dimensional image and further based on the initial position, orientation, and zoom level for the virtual camera;
generate a changed camera view of the at least one two-dimensional image, based on the position and orientation of the at least one two-dimensional image and further based on the changed at least one position, orientation, and zoom level for the virtual camera; and an output device, communicatively coupled to the frame buffer, configured to:
output the initial camera view; and
output the changed camera view, wherein:
the processor is further configured to:
determine whether the position of the virtual camera corresponds to the defined location of the exit portal; and
responsive to the position of the virtual camera corresponding to the defined location of the exit portal, automatically cause the virtual camera to move from the beginning to the end of the pipe;
the frame buffer is further configured to, responsive to the position of the virtual camera corresponding to the defined location of the exit portal, generate at least one additional camera view, based on the position and orientation of the at least one two-dimensional image and further based on at least one position, orientation, and zoom level for the virtual camera as it moves through the pipe; and the output device is further configured to output the at least one additional camera view.

26. The system of claim 25, wherein the processor is further configured to establish an initial position, orientation, and zoom level for a virtual camera by establishing an initial position at a distance from at least one two-dimensional image, wherein the distance is equal to a focal length of the virtual camera.

27. The system of claim 25, wherein each two-dimensional image comprises a view of a physical location.

28. The system of claim 25, further comprising:
an input device communicatively coupled to the processor, configured to receive user input to control at least one of the position, orientation, and zoom level of the virtual camera;
wherein the processor is further configured to change at least one of the position, orientation, and zoom level of the virtual camera responsive to the received user input.

29. The system of claim 25, wherein the processor is further configured to change at least one of the position, orientation, and zoom level of the virtual camera automatically.

30. The system of claim 29, wherein:
the processor is further configured to define a location of an entrance portal of the virtual cage; and
change at least one of the position, orientation, and zoom level of the virtual camera by automatically moving the virtual camera from the entrance portal to the exit portal;
the frame buffer is further configured to generate at least one additional camera view, based on the position and orientation of the at least one two-dimensional image and further based on at least one position, orientation, and zoom level for the virtual camera as it moves from the entrance portal to the exit portal; and
the output device is further configured to output the at least one additional camera view.

31. The system of claim 25, wherein:
the processor is further configured to establish a position and orientation for the at least one two-dimensional image in virtual three-dimensional space by establishing positions and orientations for at least a first two-dimensional image and a second two-dimensional image;
the initial camera view comprises at least a portion of the first two-dimensional image; and
the changed camera view comprises at least a portion of the second two-dimensional image.

32. The system of claim 31, wherein the output device is further configured to automatically output a transition between the initial camera view and the changed camera view in the absence of input by the user.

33. The system of claim 31, wherein at least one of the initial camera view and the changed camera view comprises a combination of at least a portion of the first and at least a portion of the second two-dimensional image.

34. The system of claim 25, further comprising:
a storage device, communicatively coupled to the processor, configured to store a series of frames representing camera views.

35. The system of claim 25, wherein the frame buffer is further configured to generate an initial camera view of the at least one two-dimensional image by applying a transformation to the at least one two-dimensional image.

36. A system for generating a virtual tour from at least two two-dimensional images, comprising:
- a processor configured to:
  - establish a position and orientation for each of the at least two two-dimensional images in virtual three-dimensional space;
  - establish an initial position, orientation, and zoom level for a virtual camera in the virtual three-dimensional space;
  - define a range of permissible movement of the virtual camera in the virtual three-dimensional space by:
    - defining a first virtual cage comprising constraints for at least one of the position and orientation of the virtual camera with respect to a first two-dimensional image, wherein the initial position of the virtual camera is within the defined first virtual cage;
    - define a location of an exit portal of the first virtual cage;
    - defining a second virtual cage comprising constraints for at least one of the position and orientation of the virtual camera with respect to a second two-dimensional image; and
    - defining a location of an entrance portal of the second virtual cage;
  - define a pipe for automated movement of the virtual camera from the first exit portal of the first virtual cage to the entrance portal of the second virtual cage, the pipe having a beginning corresponding to the first exit portal of the first virtual cage and an end corresponding to the entrance portal of the second virtual cage; and
  - change at least one of the position, orientation, and zoom level of the virtual camera in the virtual three-dimensional space while ensuring that the virtual camera remains within the defined virtual cage;
- a frame buffer, communicatively coupled to the processor, configured to:
  - generate an initial camera view of at least one of the two-dimensional images, based on the position and orientation of at least one of the two-dimensional images and further based on the initial position, orientation, and zoom level for the virtual camera; and
  - generate a changed camera view of at least one of the two-dimensional images, based on the position and orientation of at least one of the two-dimensional images and further based on the changed at least one position, orientation, and zoom level for the virtual camera; and
- an output device, communicatively coupled to the frame buffer, configured to:
  - output the initial camera view; and
  - output the changed camera view.

wherein:
the processor is further configured to:
determine whether the position of the virtual camera corresponds to the defined location of the exit portal of the first virtual cage; and
responsive to the position of the virtual camera corresponding to the defined location of the exit portal of the first virtual cage:
  automatically cause the virtual camera to move from the beginning to the end of the pipe; and
  establish a position for the virtual camera at the defined location of the entrance portal of the second virtual cage;

and wherein the frame buffer is further configured to, responsive to the position of the virtual camera corresponding to the defined location of the exit portal of the first virtual cage, generate at least one additional camera view, based on at least one position, orientation, and zoom level for the virtual camera as it moves through the pipe;
and wherein the output device is further configured to output the at least one additional camera view.

37. A computer program product for generating a virtual tour from at least one two-dimensional image, comprising:
- a nontransitory computer-readable storage medium; and
- computer program code, encoded on the medium, configured to cause at least one processor to perform the steps of:
  - establishing a position and orientation for the at least one two-dimensional image in virtual three-dimensional space;
  - establishing an initial position, orientation, and zoom level for a virtual camera in the virtual three-dimensional space;
  - defining a range of permissible movement of the virtual camera in the virtual three-dimensional space by defining a virtual cage comprising constraints for at least one of the position and orientation of the virtual camera, wherein the initial position of the virtual camera is within the defined virtual cage;
  - defining a location of an exit portal of the virtual cage;
  - defining a pipe for automated movement of the virtual camera from the exit portal, the pipe having a beginning and an end;
  - generating an initial camera view of the at least one two-dimensional image, based on the position and orientation of the at least one two-dimensional image and further based on the initial position, orientation, and zoom level for the virtual camera;
  - causing an output device to output the initial camera view;
  - changing at least one of the position, orientation, and zoom level of the virtual camera in the virtual three-dimensional space; and
  - generating a changed camera view of the at least one two-dimensional image, based on the position and orientation of the at least one two-dimensional image and further based on the changed at least one position, orientation, and zoom level for the virtual camera; and
- computer program code, encoded on the medium, configured to cause an output device to output the changed camera view;
- computer program code configured to cause at least one processor to determine whether the position of the virtual camera corresponds to the defined location of the exit portal; and
- computer program code configured to cause at least one processor to, responsive to the position of the virtual camera corresponding to the defined location of the exit portal:
  - automatically cause the virtual camera to move from the beginning to the end of the pipe; and
  - generate at least one additional camera view, based on the position and orientation of the at least one two-dimensional image and further based on at least one position, orientation, and zoom level for the virtual camera as it moves through the pipe; and
- computer program code configured to cause the output device to output the at least one additional camera view.

38. The computer program product of claim 37, wherein the computer program code configured to cause at least one processor to establish an initial position, orientation, and zoom level for a virtual camera comprises computer program code configured to cause at least one processor to establish an initial position at a distance from at least one two-dimensional image, wherein the distance is equal to a focal length of the virtual camera.

39. The computer program product of claim 37, wherein each two-dimensional image comprises a view of a physical location.

40. The computer program product of claim 37, further comprising:
the computer program code configured to cause an input device to receive user input to control at least one of the position, orientation, and zoom level of the virtual camera;
wherein the computer program code configured to cause at least one processor to change at least one of the position, orientation, and zoom level of the virtual camera operates responsive to the received user input.

41. The computer program product of claim 37, wherein the computer program code configured to cause at least one processor to change at least one of the position, orientation, and zoom level of the virtual camera operates automatically.

42. The computer program product of claim 41, further comprising:
computer program code configured to cause at least one processor to define a location of an entrance portal of the virtual cage;
and wherein the computer program code configured to cause at least one processor to change at least one of the position, orientation, and zoom level of the virtual camera comprises computer program code configured to cause at least one processor to automatically move the virtual camera from the entrance portal to the exit portal;
the computer program product further comprising:
computer program code configured to cause at least one processor to generate at least one additional camera view, based on the position and orientation of the at least one two-dimensional image and further based on at least one position, orientation, and zoom level for the virtual camera as it moves from the entrance portal to the exit portal; and
computer program code configured to cause the output device to output the at least one additional camera view.

43. The computer program product of claim 37, wherein:
the computer program code configured to cause at least one processor to establish a position and orientation for the at least one two-dimensional image in virtual three-dimensional space comprises computer program code configured to cause at least one processor to establish positions and orientations for at least a first two-dimensional image and a second two-dimensional image;
the initial camera view comprises at least a portion of the first two-dimensional image; and
the changed camera view comprises at least a portion of the second two-dimensional image.

44. The computer program product of claim 43, further comprising computer program code configured to cause the output device to automatically output a transition between the initial camera view and the changed camera view in the absence of input by the user.

45. The computer program product of claim 43, wherein at least one of the initial camera view and the changed camera view comprises a combination of at least a portion of the first and at least a portion of the second two-dimensional image.

46. The computer program product of claim 37, further comprising:
computer program code configured to cause a storage device to store a series of frames representing camera views.

47. The computer program product of claim 37, wherein the computer program code configured to cause at least one processor to generate an initial camera view of the at least one two-dimensional image comprises computer program code configured to cause at least one processor to apply a transformation to the at least one two-dimensional image.

48. A computer program product for generating a virtual tour from at least two two-dimensional images, comprising:
a nontransitory computer-readable storage medium; and
computer program code, encoded on the medium, configured to cause at least one processor to perform the steps of:
establishing a position and orientation for each of the at least two two-dimensional images in virtual three-dimensional space;
establishing an initial position, orientation, and zoom level for a virtual camera in the virtual three-dimensional space;
defining a range of permissible movement of the virtual camera in the virtual three-dimensional space by:
defining a first virtual cage comprising constraints for at least one of the position and orientation of the virtual camera with respect to a first two-dimensional image, wherein the initial position of the virtual camera is within the defined first virtual cage;
defining a location of a first exit portal of the first virtual cage;
defining a second virtual cage further comprises comprising constraints for at least one of the position and orientation of the virtual camera with respect to a second two-dimensional image; and
defining a location of an entrance portal of the second virtual cage;
defining a pipe for automated movement of the virtual camera from the exit portal of the first virtual cage to the entrance portal of the second virtual cage, the pipe having a beginning corresponding to the exit portal of the first virtual cage and an end corresponding to the entrance portal of the second virtual cage;
generating an initial camera view of at least one of the two-dimensional images, based on the position and orientation of at least one of the two-dimensional images and further based on the initial position, orientation, and zoom level for the virtual camera;
causing an output device to output the initial camera view;
changing at least one of the position, orientation, and zoom level of the virtual camera in the virtual three-dimensional space by moving the virtual camera within the defined first virtual cage and subsequently moving the virtual camera within the defined second virtual cage;
generating a changed camera view of at least one of the two-dimensional images, based on the position and orientation of at least one of the two-dimensional images and further based on the changed at least one position, orientation, and zoom level for the virtual camera; and
causing an output device to output the changed camera view;

determining whether the position of the virtual camera corresponds to the defined location of the first exit portal of the first virtual cage; and responsive to the position of the virtual camera corresponding to the defined location of the exit portal of the first virtual cage:

automatically cause causing the virtual camera to move from the beginning to the end of the pipe;

generating at least one additional camera view, based on at least one position, orientation, and zoom level for the virtual camera as it moves through the pipe; and establishing a position for the virtual camera at the defined location of the entrance portal of the second virtual cage; and computer program code configured to cause the output device to output the at least one additional camera view.

* * * * *